(12) United States Patent
Kawai et al.

(10) Patent No.: US 9,635,240 B2
(45) Date of Patent: Apr. 25, 2017

(54) IMAGE PROCESSING DEVICE, IMAGING DEVICE, IMAGE PROCESSING METHOD, AND COMPUTER READABLE MEDIUM

(71) Applicant: FUJIFILM Corporation, Tokyo (JP)

(72) Inventors: Tomoyuki Kawai, Saitama (JP); Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 77 days.

(21) Appl. No.: 14/709,034

(22) Filed: May 11, 2015

(65) Prior Publication Data

US 2015/0244925 A1 Aug. 27, 2015

Related U.S. Application Data

(63) Continuation of application No. PCT/JP2013/077667, filed on Oct. 10, 2013.

(30) Foreign Application Priority Data

Nov. 14, 2012 (JP) .................................. 2012-250293

(51) Int. Cl.
*H04N 5/232* (2006.01)
*G02B 7/34* (2006.01)
(Continued)

(52) U.S. Cl.
CPC ........... *H04N 5/23212* (2013.01); *G02B 7/34* (2013.01); *G03B 17/18* (2013.01);
(Continued)

(58) Field of Classification Search
CPC ........... H04N 5/23212; H04N 5/23293; H04N 5/3696; G02B 7/34; G03B 17/18; G03B 13/36
See application file for complete search history.

(56) References Cited

U.S. PATENT DOCUMENTS 8,085,337 B2* 12/2011 Onuki ................ H04N 5/23212
348/222.1
9,204,067 B2* 12/2015 Onuki ................ H04N 5/23212
(Continued)

FOREIGN PATENT DOCUMENTS

JP 2001-309210 A 11/2001
JP 2004-40740 A 2/2004
(Continued)

OTHER PUBLICATIONS

Chinese Office Action, dated for Chinese Patent Application No. 201380057355.8 with machine translation.
(Continued)

*Primary Examiner* — Luong T Nguyen
(74) *Attorney, Agent, or Firm* — Birch, Stewart, Kolasch & Birch, LLP

(57) ABSTRACT

The image acquisition section acquires a first image and a second image output from an image pick-up device. A parallax computation section computes parallax indicating the amount of displacement between each of the pixels in the first image and corresponding pixels in the second image acquired by the image acquisition section. The generation section generates a first display image based on a third image output from the image pick-up device, and generates a second display image for use in focus verification based on the first and second images acquired by the image acquisition section. The change section changes the resolution of at least the second display image from out of the first display image and the second display image generated by the generation section according to the parallax computed by the parallax computation section.

22 Claims, 35 Drawing Sheets

(51) Int. Cl.
*H04N 5/369* (2011.01)
*G03B 17/18* (2006.01)
*G03B 13/36* (2006.01)

(52) U.S. Cl.
CPC ....... *H04N 5/23293* (2013.01); *H04N 5/3696* (2013.01); *G03B 13/36* (2013.01)

(56) References Cited

U.S. PATENT DOCUMENTS

| | | |
|---|---|---|
| 2005/0191047 A1 | 9/2005 | Toji |
| 2007/0154197 A1 | 7/2007 | Saijo et al. |
| 2009/0153693 A1 | 6/2009 | Onuki et al. |
| 2010/0321470 A1* | 12/2010 | Oshima .................. G03B 17/18 348/36 |
| 2011/0234861 A1* | 9/2011 | Endo .................... H04N 5/3572 348/243 |
| 2012/0194721 A1* | 8/2012 | Sakaida ............. H04N 5/23212 348/302 |

FOREIGN PATENT DOCUMENTS

| | | |
|---|---|---|
| JP | 2009-147665 A | 7/2009 |
| JP | 2009-163220 A | 7/2009 |
| WO | WO 2006/030488 A1 | 3/2006 |

OTHER PUBLICATIONS

International Search Report, issued in PCT/JP2013/077667, dated Jan. 21, 2014.
Written Opinion of the International Searching Authority, issued in PCT/JP2013/077667, dated Jan. 21, 2014.

\* cited by examiner

SPLIT-IMAGE

SPLIT-IMAGE

IMAGE PROCESSING DEVICE, IMAGING DEVICE, IMAGE PROCESSING METHOD, AND COMPUTER READABLE MEDIUM

CROSS-REFERENCE TO RELATED APPLICATIONS

This application is a continuation application of International Application No. PCT/JP2013/077667, filed Oct. 10, 2013, the disclosure of which is incorporated herein by reference in its entirety. Further, this application claims priority from Japanese Patent Application No. 2012-250293, filed Nov. 14, 2012, the disclosure of which is incorporated herein by reference in its entirety.

BACKGROUND

Technical Field

The present invention relates to an image processing device, an imaging device, an image processing method, and a computer readable medium.

Background Art

Digital cameras are widely known that are provided with autofocus, in which phase difference detection methods and contrast detection methods are employed, and also what is referred to as a manual focus mode, in which a user can manually perform focus adjustment.

Digital cameras including a manual focus mode are known in which a reflex mirror is provided to enable focus adjustment while checking an imaging subject, and a method is utilized in which a split microprism screen is employed to display the phase difference visually. Utilization of a method in which contrast is checked visually is also known.

However, in digital cameras with the reflex mirror omitted that have become prevalent in recent years, since there is no reflex mirror, there is no method to check the subject-image while displaying the phase difference, and contrast detection methods have had to be relied on. However, in such cases, contrast cannot be displayed at a resolution greater than that of a display device, such as a Liquid Crystal Display (LCD), requiring adoption of methods such as enlarging a portion for display.

In recent years, therefore, a split-image is displayed within a live-view image (also referred to as a through image), so as to make the work of focusing on the imaging subject easier for an operator when in manual focus mode. Split-image used herein refers to a divided image in which a display region has been divided into plural sections, for example (such as each image divided in the up-down direction) in which displacement is imparted in the parallax generation direction (such as the left-right direction) according to focus misalignment, and is a divided image in which the displacement in the parallax generation direction disappears in an in-focus state. The operator (such a photographer) operates a manual focus ring to match the focus so that displacement of the split-image (such as each image divided in the up-down direction) is removed.

A manual focus device described in Japanese Patent Application Laid-Open (JP-A) No. 2004-40740 (hereafter referred to as Patent Document 1) includes an aperture movement means that moves an aperture opening on an imaging subject optical path along a plane perpendicular to the optical axis, and a storage means that stores two subject-images respectively imaged at two range positions to which the aperture opening is moved. A split-image combining the two subject-images is output, and a display means, also included, displays the suitability of focused state.

In the imaging device described in JP-A No. 2009-147665 (hereafter referred to as Patent Document 2), out of light rays from an imaging optical system, a first subject-image and a second subject-image formed by light rays divided by a pupil divider are each photoelectrically converted to generate a first image and a second image. The first and the second images are employed to generate a split-image, and a third subject-image formed by the light rays not divided by the pupil divider is photoelectrically converted to generate a third image. The third image is displayed on a display and the generated split-image is displayed inside the third image, and color data extracted from the third image is applied to the split-image. By applying color data extracted from the third image to the split-image in this way, excellent visibility of the split-image can be achieved.

An imaging device described in JP-A No. 2009-163220 (hereafter referred to as Patent Document 3) includes a processing means that displays on a display means a superimposed image in which a first image and a second image obtained by division using a pupil dividing means are superimposed.

A digital camera described in JP-A No. 2001-309210 (hereafter referred to as Patent Document 4) includes a display change means that detects a misalignment amount between a focus position and an imaging subject position, and changes a display content of a split-image according to the misalignment amount.

An image processing device described in WO06/030488 (hereafter referred to as Patent Document 5) includes a configuration in which, during focus operation of an optical system using a focus controller, a false image is formed with an exaggerated amount of change in resolution of an image obtained from an image pick-up device.

Technical Problem

However, an issue arises in all the technology in Patent Documents 1 to 5, in that cases sometimes occur in which an image is displayed at a resolution exceeding a resolution at which visual checking of the focus displacement amount is possible, and cases sometimes occur in which in which an image is displayed at a resolution lower than a resolution at which visual checking of the focus displacement amount is not possible.

SUMMARY

In consideration of the above circumstances, an object of the present invention is to provide an image processing device, an imaging device, an image processing method, and a computer readable medium capable of setting a processing speed and a resolution according to a degree of focus.

Solution to Problem

In order to achieve the above object, an image processing device of a first aspect of the present invention includes: an image acquisition section that acquires first and second images based on first and second image signals output from an image pick-up device including first and second pixel groups that output the first and second image signals from respective images formed by a pupil-divided subject-image that has passed through first and second regions of an imaging lens; a parallax computation section that computes parallax indicating an amount of displacement between each of the pixels of the first image and corresponding pixels in the second image acquired by the image acquisition section; a generation section that generates a first display image based on an image signal output from the image pick-up device, and that, based on the first and second images, generates a second display image that is used in focus verification; a change section that, among the first display image and the second display image generated by the generation section, changes the resolution of at least the second display image in accordance with the parallax computed by the parallax computation section; a display section that displays images; and a display controller that controls the display section so as to display the first display image generated by the generation section, and to display the second display image generated by the generation section within a display region of the first display image.

In order to achieve the above object, an image processing device of a second aspect of the present invention includes: an image acquisition section that acquires first and second images based on first and second image signals output from an image pick-up device including first and second pixel groups that output the first and second image signals from respective images formed by a pupil-divided subject-image that has passed through first and second regions of an imaging lens; a parallax computation section that computes parallax indicating an amount of displacement between each of the pixels of the first image and corresponding pixels in the second image acquired by the image acquisition section; a generation section that generates a first display image based on an image signal output from the image pick-up device, and that, based on the first and second images, generates a second display image that is used in focus verification; a change section that, among the first display image and the second display image generated by the generation section, changes the resolution of at least the second display image in accordance with the parallax computed by the parallax computation section; a display section that displays images; and a display controller that effect controls so as to suppress display by the display section of the first display image generated by the generation section, and controls the display section so as to display the second display image generated by the generation section. This enables the processing speed and the resolution to be set according to the degree of focus, more so than in cases lacking the present configuration. This enables the processing speed and the resolution to be set according to the degree of focus, more so than in cases lacking the present configuration.

In a third aspect of the present invention, the first aspect or the second aspect of the present invention may be configured such that the change section enhances the resolution as the parallax decreases. This enables a faster processing speed to be achieved as the degree of focus falls, and enables an enhanced resolution to be achieved as the degree of focus rises, more so than in cases lacking the present configuration.

In a fourth aspect of the present invention, any one of the first aspect or the second aspect of the present invention may be configured such that the change section changes the resolution by changing a number of output pixels of the image pick-up device by changing a method of driving the image pick-up device. This enables the resolution to be changed using simpler control than in cases lacking the present configuration.

In a fifth aspect of the present invention, the fourth aspect may be configured such that the pixels included in the image pick-up device are arrayed in a matrix formation; the output pixels of the image pick-up device are variable in units of row of the pixels; and the change section changes the resolution by changing the output pixels in units of rows. This enables the resolution to be changed using simpler control than in cases lacking the present configuration.

In a sixth aspect of the present invention, the fifth aspect may be configured such that the output pixels of the image pick-up device are further variable in units of columns of pixels; and the change section further changes the resolution by changing the output pixels in units of columns. This enables the output pixels to be varied using simpler control than in cases lacking the present configuration.

In a seventh aspect of the present invention, the fourth aspect of the present invention may be configured such that the pixels included in the image pick-up device are arrayed in a matrix formation; the output pixels of the image pick-up device are variable in units of columns of the pixels; and the change section changes the resolution by changing the output pixels in units of columns. This enables the output pixels to be varied using simpler control than in cases lacking the present configuration.

In an eighth aspect of the present invention, any one of the fourth aspect to the seventh aspect of the present invention may be configured such that the change section changes the number of output pixels by changing the density of the output pixels of the first and second pixel groups in the output pixels included in the image pick-up device. This enables the processing speed and the resolution of the second display image to be set according to the degree of focus, using a simpler configuration than in cases lacking the present configuration.

In a ninth aspect of the present invention, the eighth aspect of the present invention may be configured such that the change section changes the number of output pixels by, in a case in which the parallax computed by the parallax computation section is a threshold value or lower, making the density higher than the density in a case in which the parallax computed by the parallax computation section exceeds the threshold value. This enables a state in which the resolution of the second display image is insufficient to be suppressed from occurring when the parallax is the threshold value or lower, more so than in cases lacking the present configuration.

In a tenth aspect of the present invention, the ninth aspect of the present invention may be configured such that the change section changes the number of output pixels by, in a case in which the parallax computed by the parallax computation section is a threshold value or lower, making the density higher than the density in a case in which the parallax computed by the parallax computation section exceeds the threshold value, and by making the density higher in accordance with a decrease in parallax. This enables a state in which the resolution of the second display image is insufficient to be suppressed from occurring when the parallax is the threshold value or lower, more precisely than in cases lacking the present configuration.

In an eleventh aspect of the present invention, any one of the eighth aspect to the tenth aspect of the present invention may be configured such that the change section changes the number of output pixels by, in a case in which the parallax computed by the parallax computation section exceeds a threshold value, making the density lower than the density in a case in which the parallax computed by the parallax computation section is the threshold value or lower. This enables a state in which the resolution of the second display image is excessive to be suppressed from occurring when the parallax exceeds the threshold value, more so than in cases lacking the present configuration.

In a twelfth aspect of the present invention, the eleventh aspect of the present invention may be configured such that the change section changes the number of output pixels by, in a case in which the parallax computed by the parallax computation section exceeds a threshold value, making the density lower than the density in a case in which the parallax computed by the parallax computation section is the threshold value or lower, and by making the density lower in accordance with an increase in parallax. This enables a state in which the resolution of the second display image is excessive to be suppressed from occurring when the parallax exceeds the threshold value, more precisely than in cases lacking the present configuration.

In a thirteenth aspect of the present invention, any one of the first aspect to the twelfth aspect of the present invention, wherein, in a case in which the resolution has been enhanced by the change section so as to exceed a specific value, the display controller further effects control to expand a display region of the second display image on the display section to wider than normal. This enables visibility of the second display image to be increased, more so than in cases lacking the present configuration.

In a fourteenth aspect of the present invention, the thirteenth aspect of the present invention may be configured such that in cases in which the resolution has been degraded to the specific value or lower by the change section in an expanded state of the display region, the display controller further controls to return the display region to the normal size. This enables a reduction in the visibility of the second display image to be suppressed, more so than in cases lacking the present configuration.

In a fifteenth aspect of the present invention, any one of the first aspect to the fourteenth aspect of the present invention may be configured such that the change section further changes a frame rate of an image subject for display on the display section in accordance with the parallax computed by the parallax computation section. This enables the frame rate to be set according to the degree of focus, more so than in cases lacking the present configuration.

In a sixteenth aspect of the present invention, any one of the first aspect to the fifteenth aspect of the present invention may be configured such that the change section further changes a computation frequency by the parallax computation section in accordance with the parallax computed by the parallax computation section. This enables the computation frequency to be set according to the degree of focus, more so than in cases lacking the present configuration.

In a seventeenth aspect of the present invention, any one of the first aspect to the sixteenth aspect of the present invention may be configured such that the change section further changes a driving frequency of the image pick-up device in accordance with the parallax computed by the parallax computation section. This enables the driving frequency to be set according to the degree of focus, more so than in cases lacking the present configuration.

In an eighteenth aspect of the present invention, any one of the first aspect to the seventeenth aspect of the present invention, wherein the image pick-up device further includes a third image group that outputs a third image formed without pupil-dividing a subject-image that has passed through the imaging lens; and the generation section generates the first display image based on the third image output from the third pixel group. This enables the image quality of the first display image to be improved, using a simpler configuration than in cases lacking the present configuration.

In order to achieve the above object, an imaging device of a nineteenth aspect of the present invention includes the image processing device of any one of the first aspect to the eighteenth aspect of the present invention, an image pick-up device including first and second pixel groups; and a storage section that stores an image generated based on an image signal output from the image pick-up device. This enables the processing speed and the resolution to be set according to the degree of focus, more so than in cases lacking the present configuration.

In order to achieve the above object, an image processing method of a twentieth aspect of the present invention includes: acquiring first and second images based on first and second image signals output from an image pick-up device including first and second pixel groups that output the first and second image signals from respective images formed by a pupil-divided subject-image that has passed through first and second regions of an imaging lens; computing parallax indicating an amount of displacement between each of the pixels of the acquired first image and corresponding pixels in the acquired second image; generating a first display image based on an image signal output from the image pick-up device; generating a second display image that is used in focus verification, based on the first and second images; changing the resolution of at least the second display image among the generated first display image and the generated second display image in accordance with the computed parallax; and controlling a display section that displays images so as to display the generated first display image, and to display the generated second display image within a display region of the first display image. This enables the processing speed and the resolution to be set according to the degree of focus, more so than in cases lacking the present configuration.

In order to achieve the above object, an image processing method of a twenty-first aspect of the present invention includes: acquiring first and second images based on first and second image signals output from an image pick-up device including first and second pixel groups that output the first and second image signals from respective images formed by a pupil-divided subject-image that has passed through first and second regions of an imaging lens; computing parallax indicating an amount of displacement between each of the pixels of the acquired first image and the corresponding pixels in the acquired second image; generating a first display image based on an image signal output from the image pick-up device; generating a second display image that is used in focus verification, based on the first and second images; changing the resolution of at least the second display image among the generated first display image and the second display image, in accordance with the computed parallax; and effecting control so as to suppress display by a display section of the generated first display image, and controlling the display section so as to display the generated second display image. This enables the processing speed and the resolution to be set according to the degree of focus, more so than in cases lacking the present configuration.

In order to achieve the above object, A non-transitory computer-readable storage medium storing a program for causing a computer to function as; the image acquisition section, the parallax computation section, the generation section, the change section, and the display controller of the image processing device of any one of the first aspect to the eighteenth aspect of the present invention. This enables the processing speed and the resolution to be set according to the degree of focus, more so than in cases lacking the present configuration.

Advantageous Effects of Invention

The present invention achieves an advantageous effect of enabling a processing speed and a resolution to be set according to a degree of focus.

DESCRIPTION OF EMBODIMENTS

Explanation follows regarding an example of an exemplary embodiment of an imaging device according to the present invention, with reference to the drawings.

First Exemplary Embodiment

Figure 1:
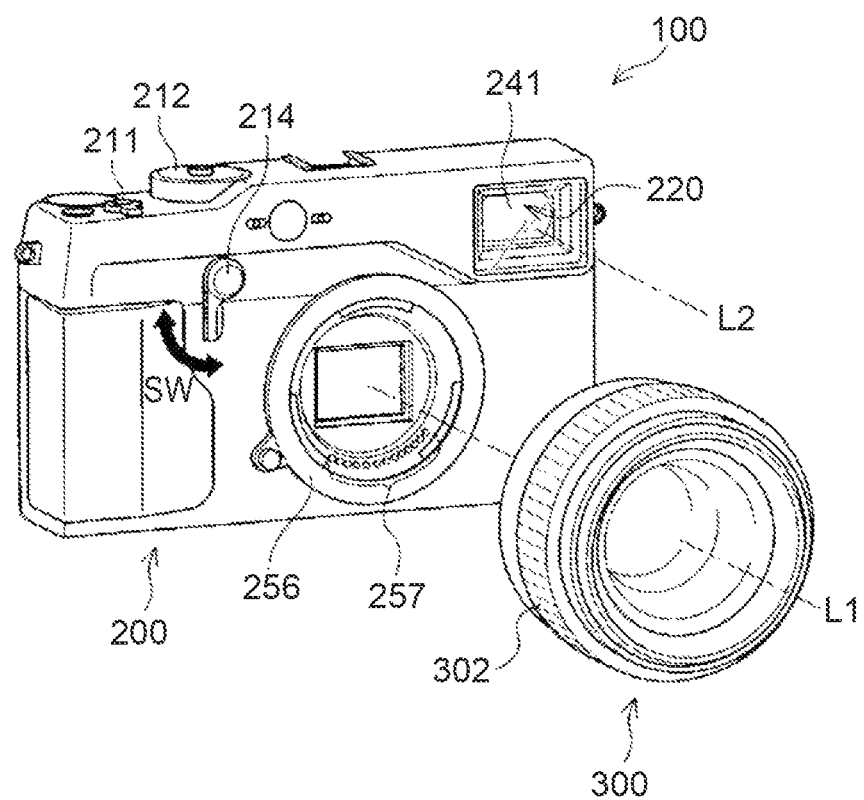
FIG. 1 is a perspective view illustrating an example of an external appearance of an interchangeable lens camera that is an imaging device according to a first exemplary embodiment.
Figure 2:
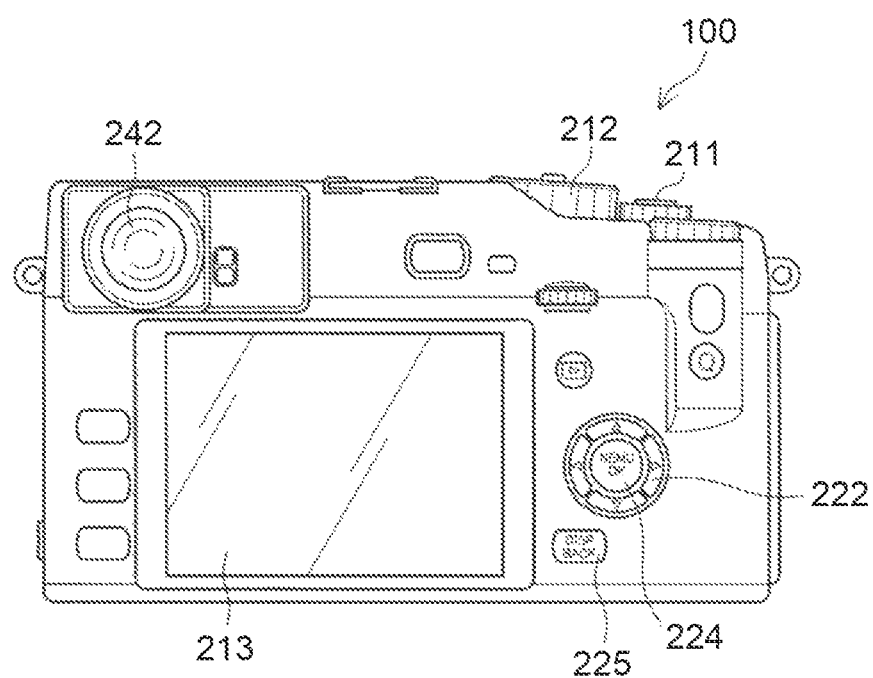
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera, and is a digital camera with a camera body 200 and an interchangeable lens 300 (imaging lens, focusing lens 302) that is interchangeably mounted to the camera body 200, and without a reflex mirror. A HYBRID FINDER (registered trademark) 220 is also provided to the camera body 200. The HYBRID FINDER 220 indicates, for example, a finder selectively employed as an optical viewfinder (referred to as "OVF" below), or as an electronic viewfinder (referred to as "EVF" below).

The interchangeable lens 300 is mounted interchangeably to the camera body 200 by coupling a mount 256 provided to the camera body 200 together with a mount 346 (see FIG. 3) provided on the interchangeable lens 300 side to correspond to the mount 256. A focus ring is provided to a mirror cylinder of the interchangeable lens 300, and the focusing lens 302 is moved in the optical axis direction according to rotational operation of the focus ring, enabling imaging subject light to be focused on an image pick-up device 20 (see FIG. 3), described below, at a focal position according to distance from the imaging subject.

An OVF finder window 241 included in the HYBRID FINDER 220 is provided on the front face of the camera body 200. A finder switching lever (finder switching section) 214 is provided on the front face of the camera body 200. Switching is performed (described below) between an optical image visible with the OVF and an electronic image visible with the EVF (live-view image) by turning the finder switching lever 214 in the directions of the arrows SW. The optical axis L2 of the OVF is different from the optical axis L1 of the interchangeable lens 300. The top face of the camera body 200 is mainly provided with a release switch 211 and a dial 212 to set imaging mode, replay mode, and the like.

The release switch 211 is configured capable of detecting a two stage press-operation, a state pressed from a standby position to an intermediate position (half pressed position), or a state pressed to a final pressed position past the intermediate position (fully pressed position). In the following a "state pressed from the standby position to an intermediate position" is referred to as a "half pressed state", and "a state pressed from the standby position to the fully pressed position" is referred to as the "fully pressed state".

In the imaging device 100 of the first exemplary embodiment, adjustment of the imaging conditions is performed by placing the release switch 211 in the half pressed state, and exposure (imaging) is performed by then placing the release switch 211 in the fully pressed state. "Imaging conditions" means, for example, at least one of an exposure state or a focusing state. In the imaging device 100 of the first exemplary embodiment, adjustment is performed of the exposure state and the focusing state. Namely, an Automatic Exposure (AE) function operates by placing the release switch 211 in the half pressed state, and then an AF function operates to control focus after the exposure state (the shutter speed and aperture state) has been set.

The back face of the camera body 200 is provided with an OVF finder eyepiece 242, a display section 213, a cross-key 222, a MENU/OK key 224, and a BACK/DISP button 225.

The cross-key 222 functions as a multifunction key to output various instruction signals, such as menu selection, zoom, and frame advance. The MENU/OK key 224 is an operation key that functions as a menu button to instruct display of a menu on the screen of the display section 213, and also doubles as an OK button function to confirm selected content, to instruct execution, or the like. The BACK/DISP button 225 is used to erase a desired object, such as a selected item, erase specified content, or return to the one-previous operation state, and so on.

The display section 213 is implemented for example by an LCD, and is employed to display a live-view image (through image) that is an example of successive frame images obtained by imaging successive frames during an imaging mode. The display section 213 is also employed to display a still image that is an example of a single frame image obtained by imaging a single frame in cases in which an instruction for still image capture has been given. Moreover, the display section 213 may be employed to display a reproduced image in a reproduction mode, and to display menu screens and the like.

Figure 3:
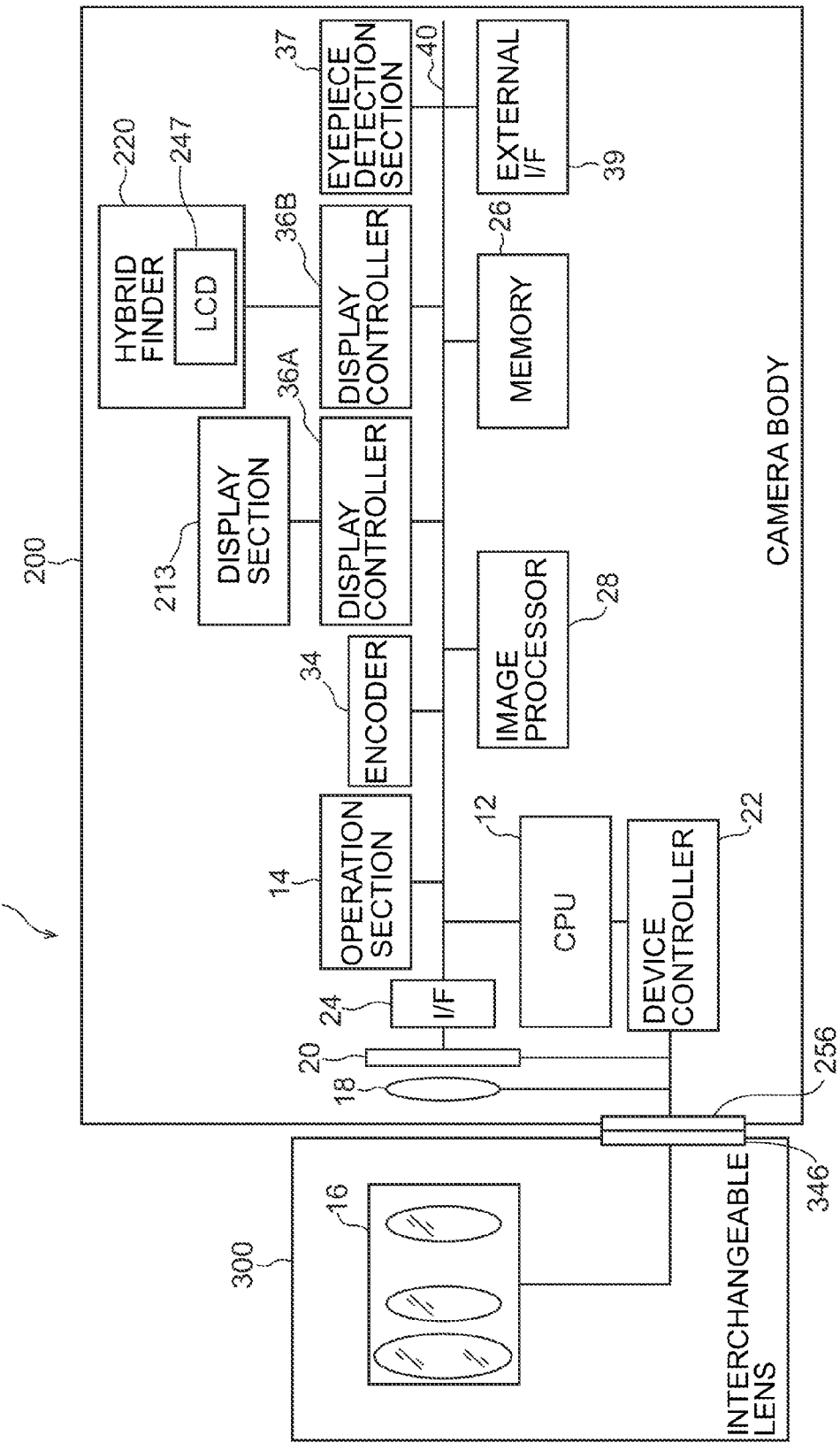
FIG. 3 is a block diagram illustrating an example of a configuration of an electrical system of an imaging device according to the first exemplary embodiment.

FIG. 3 is a block diagram illustrating an example of a configuration (internal configuration) of an electrical system of the imaging device 100 according to the first exemplary embodiment.

The imaging device 100 is a digital camera that records captured still images and video images, and the overall operation of the camera is integrally controlled by a Central Processing Unit (CPU) 12. The imaging device 100 includes the CPU 12, an operation section 14, an interface section 24, memory 26, and an encoder 34. The imaging device 100 includes display controllers 36A, 36B serving as examples of a display controller according to the present invention. The imaging device 100 includes an eyepiece detection section 37. The imaging device 100 also includes an image processor 28 serving as an example of an image acquisition section, a parallax computation section, a generation section, and a change section according to the present invention. In the following, the display controllers 36A, 36B are referred to as display controller 36 when not required to differentiate between them in the explanation. Moreover, although in the first exemplary embodiment the display controller 36 is provided as a hardware configuration separate to the image processor 28, there is no limitation thereto. The image processor 28 may include a similar function to the display controller 36, and in such cases the display controller 36 is not required.

The CPU 12, the operation section 14, the interface section 24, memory 26 that is an example of a storage section, the image processor 28, the encoder 34, the display controllers 36A, 36B, the eyepiece detection section 37, and an external interface (I/F) 39 are connected together through a bus 40. The memory 26 includes a non-volatile storage region (for example EEPROM or the like) stored with parameters, programs, and the like, and a volatile storage region (for example SDRAM or the like) temporarily stored with various data related to images and the like.

In the imaging device 100 according to the first exemplary embodiment, the CPU 12 performs focusing control by controlling the driving of a focus adjustment motor such that the contrast value of the image obtained by imaging is as a maximum. The CPU 12 computes AE data that is physical data indicating the brightness of the image obtained by imaging. When the release switch 211 is in the half pressed state, the CPU 12 derives the shutter speed and the F number according to the brightness of the image indicated by the AE data. The exposure state is then set by controlling the relevant sections such that the derived shutter speed and F number are achieved.

The operation section 14 is a user interface operated by an operator when giving various instructions to the imaging device 100. Various instructions received by the operation section 14 are output to the CPU 12 as operation signals, and the CPU 12 executes processing according to the operation signals input from the operation section 14.

The operation section 14 includes the release switch 211, the dial (focus mode switching section) 212 to select the imaging mode and the like, the display section 213, the finder switching lever 214, the cross-key 222, the MENU/OK key 224, and the BACK/DISP button 225. The operation section 14 also includes a touch panel to receive various data. The touch panel, for example, overlays the display screen of the display section 213.

When the imaging mode has been set, image light from an imaging subject is formed as an image on a light receiving face of a color image pick-up device (for example a CMOS sensor) 20 through imaging lenses 16 that include a focusing lens that is movable by manual operation and a shutter 18.

The signal charges accumulated in the image pick-up device 20 are read in sequence as digital signals according to the signal charges (voltage) by a read signal applied from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a CMOS image sensor, however there is no limitation thereto, and a CDD image sensor may be employed.

Figure 4:
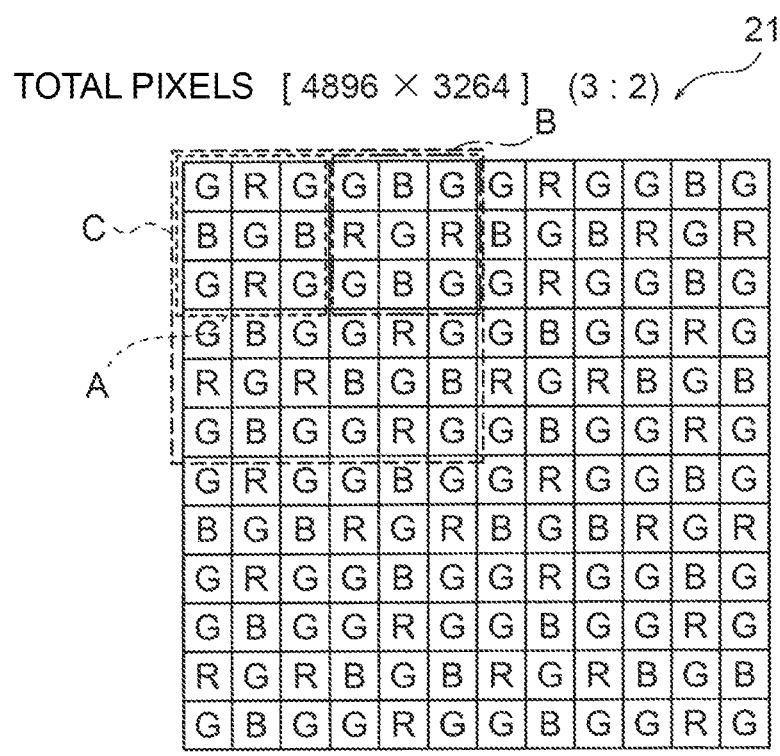
FIG. 4 is a schematic layout diagram illustrating an example of an array of a color filter provided to the image pick-up device included in an imaging device according to the first exemplary embodiment.

A color filter 21, which is illustrated in FIG. 4 as an example, is provided at the image pick up device 20. FIG. 4 schematically illustrates an example of an array of the color filter 21. In the example illustrated in FIG. 4, (4896×3264) pixels are employed as an example of the number of pixels, and 3:2 is applied as the aspect ratio; however, the number of pixels and the aspect ratio are not limited thereto. As in the example of FIG. 4, the color filter 21 includes a first filter G corresponding to green (G) that contributes most to obtaining the brightness signal, a second filter R corresponding to red (R), and a third filter B corresponding to blue (B). The array pattern of the first filter G (referred to below as G filter), the second filter R (referred to below as R filter), and the third filter B (referred to below as B filter) is classified into a first array pattern A and a second array pattern B.

In the first array pattern A, the G filter is placed on the 4 corner pixels and center pixel of a 3×3 pixel square array. In the first array pattern A, the R filter is placed in the vertical line at the row direction (for example the horizontal direction) center of the square array. In the first array pattern A, the B filter is placed in the horizontal line at the column direction (for example the vertical direction) center of the square array. In the second array pattern B, the placement of the filter G is the same as that of the first basic array pattern A, and the placement of the filter R and the placement of the B filter are in a swapped over pattern thereto. The color filter 21 includes a basic array pattern C formed from a square array pattern corresponding to 6×6 pixels. The basic array pattern C is a 6×6 pixel pattern disposed with the first array pattern A and the second array pattern B so as to have point symmetry, with the basic array pattern C disposed repeating in both the row direction and the column direction. Namely, in the color filter 21 each of the color filters R, G, B (the R filter, G filter, B filter) is arrayed with a specific periodicity. This thereby enables processing to be performed according to a repeating pattern during performing synchronization (interpolation) processing and the like on the R, G, B signals read from the color image pick-up device.

Moreover, when images are reduced by thinning processing in basic array pattern C units, the color filter array of the thinning processed reduced image can be made similar to the color filter array prior to thinning processing, enabling a common processing circuit to be employed.

The color filter 21 has the G filter corresponding to the color contributing the most to obtaining a brightness signal (the color G in the first exemplary embodiment), placed in each line in the row direction, column direction and diagonal directions of the color filter array. This thereby enables the reproduction precision of synchronization processing to be raised in the high frequency region, irrespective of the high frequency direction.

In the color filter 21, the R filter and the B filter corresponding to the two or more other colors other than the G color (the R and B colors in the first exemplary embodiment) are placed in each line in the row direction and column direction of the color filter array. This thereby enables color moiré (false color) generation to be suppressed, thereby enabling an optical low pass filter for suppressing false color generation to be omitted from placement on the optical path of the optical system from the incident face to the imaging plane. Moreover, even in cases in which an optical low pass filter is employed, one can be employed that has a weak action to cut the high frequency components to prevent false color generation, enabling deterioration of resolution to be avoided.

The basic array pattern C can be considered as an array of alternate first array pattern A and second array pattern B in the row direction and column direction, wherein the first array pattern A is the 3×3 pixels surrounded by the frame of the intermittent line, and the second array pattern B is the 3×3 pixels surrounded by the frame of the single dot intermittent line.

The first array pattern A and the second array pattern B both have the G filters that are the respective brightness system pixels placed at their 4 corners and center, so as to be placed along their two diagonals. Moreover, in the first array pattern A, the B filters are arrayed in the horizontal direction on each side of the central G filter, and the R filters are arrayed in the column direction on each side of the central G filter. However, in the second array pattern B, the R filters are arrayed in the row direction on each side of the central G filter, and the B filters are arrayed in the column direction on each side of the central G filter. Namely, the first array pattern A and the second array pattern B have reverse positional relationships to each other for the R filters and the B filters, but have the same placement otherwise.

Figure 5:
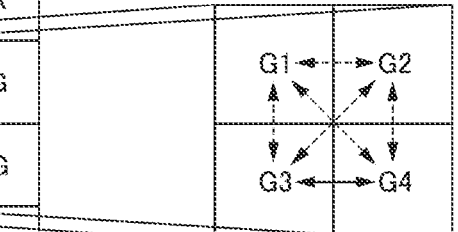
FIG. 5 is a diagram to accompany explanation of a method to determine correlation direction from pixel values of 2×2 pixels of G pixels included in the color filter illustrated in FIG. 4.

Due to the first array pattern A and the second array pattern B being alternately disposed along the row direction and the column direction, the four corner G filters of the first array pattern A and the second array pattern B form a square array of G filters corresponding to 2×2 pixels, such as the example illustrated in FIG. 5. By extracting the 2×2 pixels formed from the G filters as illustrated in the example in FIG. 5, the difference in absolute value of the pixel values of the G pixels in the row direction, the difference in absolute value of the pixel values of the G pixels in the column direction, and the difference in absolute value of the pixel values of the G pixels in the diagonal directions (sloping up to the right and sloping up to the left) are computed. Correlation can be determined in a direction having a small absolute value from out of the row direction, the column direction, and the diagonal directions. Namely, a direction having a high correlation from out of the row direction, the column direction, and the diagonal directions is discriminated using data of the G pixels with the minimum pixel separation. This discrimination result can be employed in processing to interpolate from peripheral pixels (synchronization processing).

The placement in the basic array pattern C of the color filter 21 has point symmetry about the center of the basic array pattern C (the center of the 4 G filters). Moreover, the first array pattern A and the second array pattern B inside the basic array pattern C also each have respective point symmetry about the G filters at their respective centers, enabling the circuit scale of a later stage processing circuit to be made smaller or simplified, for example.

Figure 6:
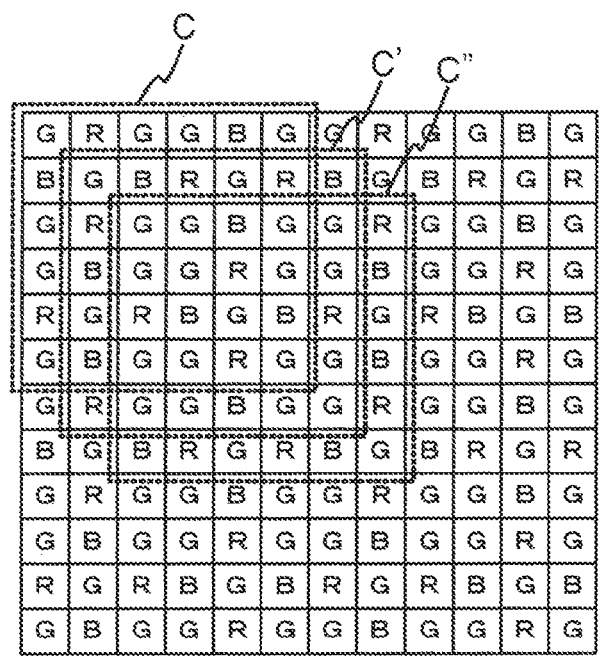
FIG. 6 is a diagram to explain the principle of a basic array pattern including the color filter illustrated in FIG. 4.

In the basic array pattern C illustrated as an example in FIG. 6, the color filter arrays of the first and third lines out of the first to sixth row direction lines are GRGGBG. The color filter array of the second line is BGBRGR. The color filter arrays of the fourth and sixth lines are GBGGRG. The color filter array of the fifth line is RGRBGB. In the example illustrated in FIG. 6, basic array patterns C, C', C" are illustrated. The basic array pattern C' is the basic array pattern C shifted respectively by 1 pixel each in the row direction and column direction. The basic array pattern C" is the basic array pattern C shifted respectively by 2 pixels each in the row direction and column direction. Thus in the color filter 21, the same color filter array results even if it is the basic array patterns C', C" that are repeatedly disposed along the row direction and column direction.

The imaging device 100 includes a phase difference AF function. The image pick-up device 20 includes plural phase difference detection pixels employed to operate the phase difference AF function. The plural phase difference detection pixels are arrayed in a predetermined pattern.

Figure 7:
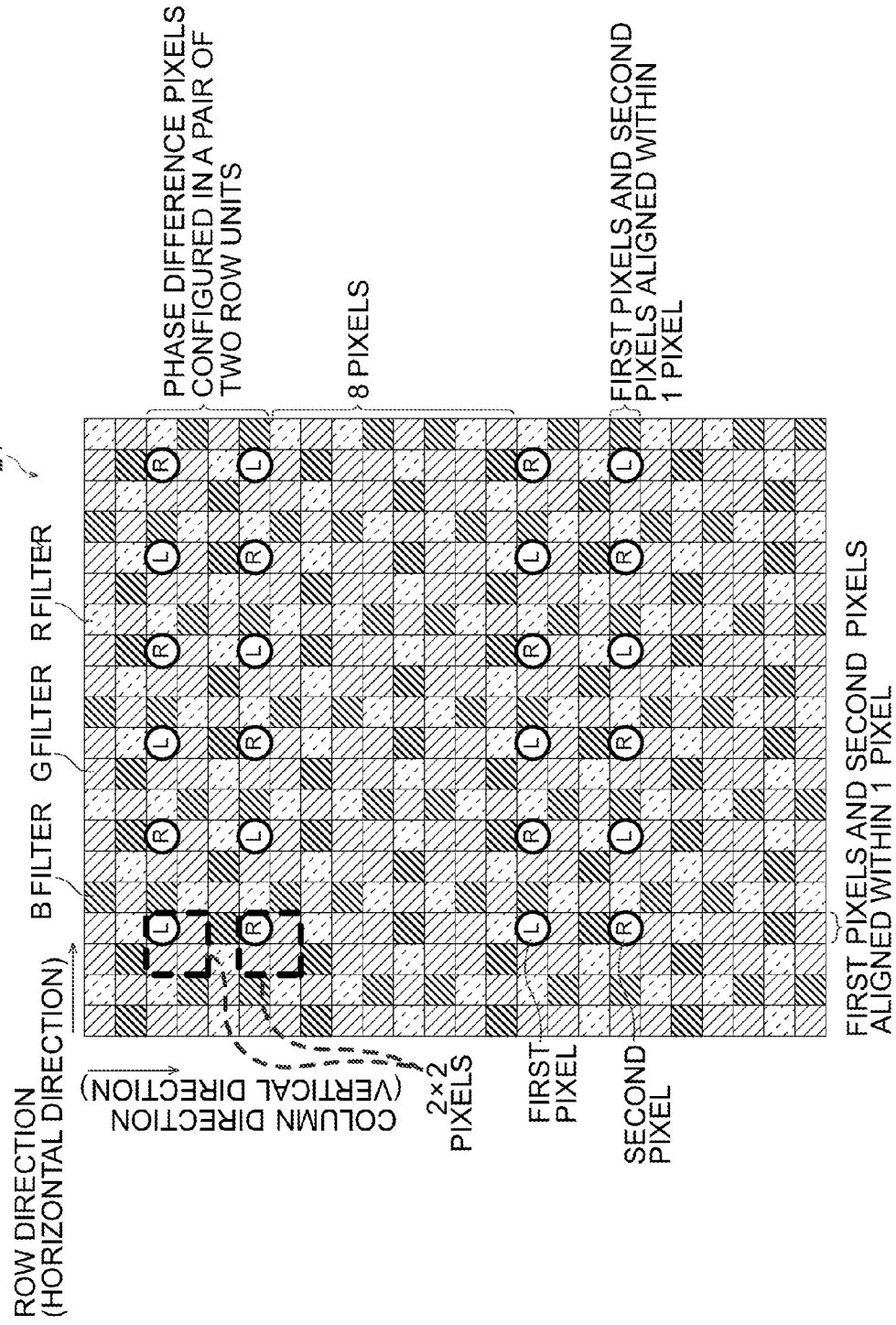
FIG. 7 is a schematic configuration diagram illustrating an example of placement of phase difference pixels in an image pick-up device included in an imaging device according to the first exemplary embodiment.

FIG. 7 is a schematic diagram of an example of correspondence relationships between a portion of the color filter 21, and pixels employed for phase difference detection of the portion. As illustrated in the example of FIG. 7, the pixels employed for phase difference detection are first pixels L having the left half portion in the row direction of the pixel blocked, or second pixels R having the right half portion in the row direction of the pixel blocked. When, in the following explanation, there is no need to discriminate between the first pixels L and the second pixels R, they are called "phase difference pixels".

Figure 8:
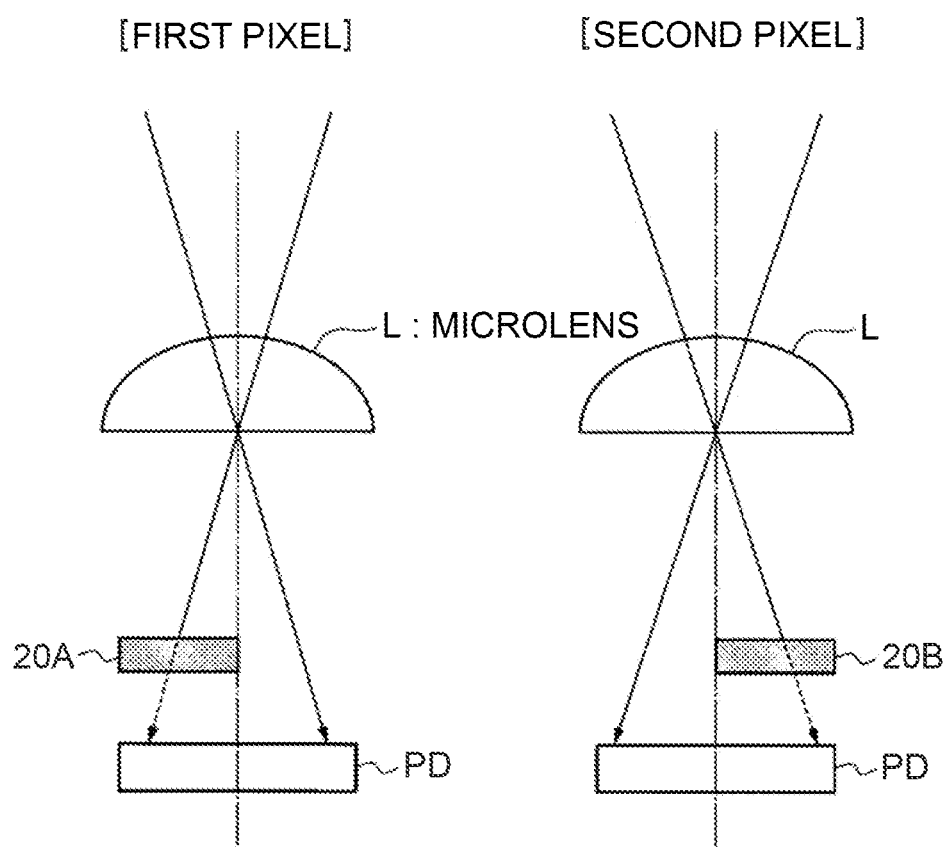
FIG. 8 is a schematic configuration diagram illustrating an example of a configuration of phase difference pixels (a first pixel and a second pixel) included in an image pick-up device of an imaging device according to the first exemplary embodiment.

An example of the first pixels L and the second pixels R placed in the image pick-up device 20 is illustrated in FIG. 8. The first pixels L illustrated in the example of FIG. 8 include light-blocking members 20A, and the second pixels R therein include light-blocking members 20B. The light-blocking members 20A are provided at the front face side of a photodiode PD (microlens L side), and block light to the left half of the light receiving faces. The light-blocking members 20B are provided at the front face side of a photodiode PD, and block light to the right half of the light receiving faces.

The microlens L and the light-blocking members 20A, 20B function as a pupil divider, and the first pixels L receive light only from light rays passing through an exit pupil of imaging lenses 16 on the left side of the optical axis, the second pixels R receive light only from light rays passing through the exit pupil of the imaging lenses 16 on the right side of the optical axis. Thus the light rays passing through the exit pupil are divided to the left and right by the microlens L and the light-blocking members 20A, 20B serving as a pupil divider, and are respectively incident to the first pixels L and the second pixels R.

Portions in-focus (in a focused state) out of the subject-image corresponding to the light rays of the left half and the subject-image corresponding to the light rays on the right half among the light rays passing through the exit pupil of the imaging lenses 16 are focused at the same position on the image pick-up device 20. Conversely, portions in front of focus or behind focus are incident to different respective positions on the image pick-up device 20 to each other (with displaced phase). This thereby enables a parallax image (left eye image, right eye image) to be acquired with different parallax for the subject-image corresponding to the light rays of the left half, and the subject-image corresponding to the light rays of the right half.

The imaging device 100 detects a phase displacement amount based on pixel values of the first pixels L and pixel values of the second pixels R by operating the phase difference AF function. The focal position of the imaging lens is then adjusted according to the detected phase displacement amount. Note that in the following, reference numerals are not appended when explanation does not need to discriminate between the light-blocking members 20A, 20B and they are referred to collectively as "light-blocking members".

The image pick-up device 20 is classified into a first pixel group, a second pixel group, and a third pixel group. The first pixel group indicates, for example, the plural first pixels L. The second pixel group indicates, for example, the plural second pixels R. The third pixel group indicates, for example, the plural normal pixels (an example of third pixels). Reference here to "normal pixels" means, for example, pixels other than the phase difference pixels (for example pixels without the light-blocking members 20A, 20B). In the following a RAW image output from the first pixel group is referred to as a "first image", a RAW image output from the second pixel group is referred to as a "second image", and a RAW image output from the third pixel group is referred to as a "third image".

Placement in the row direction for the first pixel group and the second pixel group positions is made so as to align at positions within 1 pixel of each other. Placement in the column direction for the first pixel group and the second pixel group positions is made so as to align at positions within 1 pixel of each other. In the example illustrated in FIG. 7, the first pixels L and the second pixels R are placed alternately to each other in a straight line shape along the row direction and the column direction, with a spacing of plural pixels worth between each other.

In the example illustrated in FIG. 7, the positions of each of the pixels contained in the first pixel group and the second pixel group are aligned at positions within 1 pixel of each other in both the row direction and the column direction, however the positions may be positioned so as to fall within a specific number of pixels (for example within 2 pixels) of each other in at least one of the row direction and the column direction. In order to suppress to the maximum extent the occurrence of image misalignment caused by factors other than misaligned focus, however, as illustrated in the example in FIG. 7, preferably the positions of each of the pixels contained in the first and second pixel groups are aligned at positions within 1 pixel of each other in both the row direction and the column direction.

The phase difference pixels are, as illustrated in the example in FIG. 7, provided to pixels of the square array of G filters corresponding to 2×2 pixels. Namely, in the example of FIG. 7, phase difference pixels are allocated to the pixels at the top right corner of the 2×2 pixels of G filters as viewed face-on in the diagrams. Normal pixels are also placed between the phase difference pixels, with normal pixels allocated to the remaining pixels in the 2×2 pixels of G filters. Moreover, in the example illustrated in FIG. 7, the rows of phase difference pixels of first pixels L and second pixels R alternately placed along the row direction are configured in pairs of 2-row units, placed such that there is a separation of a specific number of pixels between the pairs (8 pixels in the example in FIG. 7) in the column direction.

In this manner, in the color filter 21, the light-blocking members are provided to the pixels at the top right corner of the 2×2 pixels of G filters, with the phase difference pixels regularly placed along the column direction and the row direction with plural pixel separations therebetween. Thus, since there are comparatively many normal pixels placed at the periphery of the phase difference pixels, the interpolation precision can be raised in cases in which pixel values of the phase difference pixels are interpolated from the pixel values of the normal pixels. Moreover, each of the pixels contained in the first to the third pixel groups are placed so that each of the normal pixels employed for interpolation of phase difference pixels are not employed more than once, enabling a further improvement in interpolation precision to be expected.

Returning to FIG. 3, the image pick-up device 20 outputs the first image (digital signal representing the pixel values of each of the first pixels L) from the first pixel group, and outputs the second image (digital signal representing the pixel values of each of the second pixels R) from the second pixel group. The image pick-up device 20 outputs the third image (digital signal representing the pixel values of each of the normal pixels) from the third pixel group. The third image output from the third pixel group is a chromatic image, and is, for example, a color image with the same color array as the array of the normal pixels. The first image, the second image, and the third image output from the image pick-up device 20 are temporarily stored in the volatile storage region in the memory 26 through the interface section 24.

Figure 9:
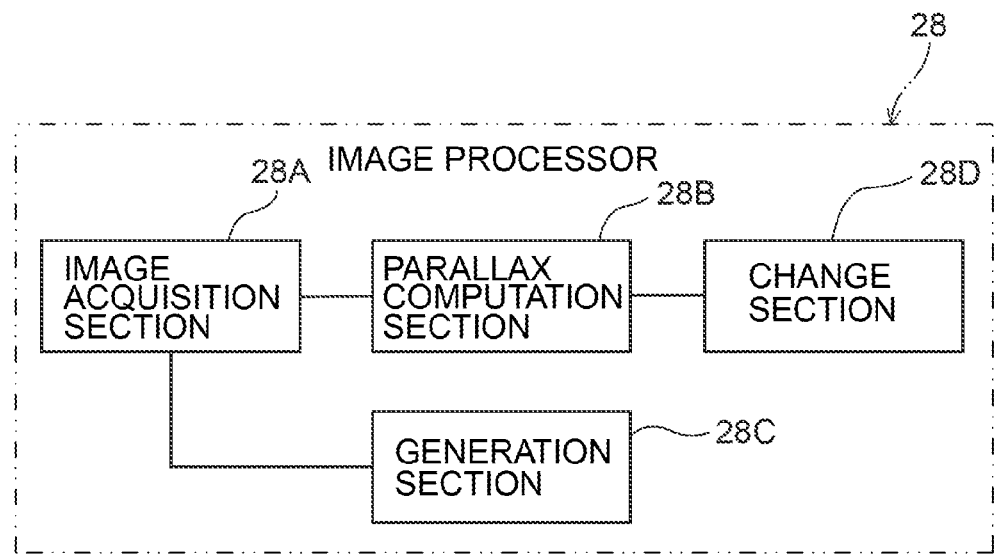
FIG. 9 is a functional block diagram illustrating an example of relevant functions of an image processor according to the first exemplary embodiment.

FIG. 9 illustrates an example of relevant functions related to the present invention from the plural functions contained in the image processor 28. As illustrated in FIG. 9, the image processor 28 includes an image acquisition section 28A, a parallax computation section 28B, a generation section 28C, and a change section 28D, and the circuits of plural functions related to image processing are collected together and implemented as an integrated circuit that is an Application Specific Integrated Circuit (ASIC). However, hardware configuration is not limited thereto, and, for example, configuration may be made with other hardware, such as a computer including a programmable logic device and CPU, ROM, and RAM.

The image acquisition section 28A acquires the first image and the second image output from the image pick-up device 20. The parallax computation section 28B computes the parallax indicated by the amount of displacement between each of the pixels of the first image and the corresponding pixels in the second image acquired by the image acquisition section 28A. The generation section 28C generates a first display image based on the third image output from the image pick-up device 20, and also generates a second display image employed in focus verification based on the first and second images acquired by the image acquisition section 28A.

According to the parallax computed by the parallax computation section 28B, the change section 28D changes the resolution of at least the second display image from out of the first display image and the second display image generated by the generation section 28C. For example, the number of output pixels of the image pick-up device 20 is changed by changing the method of driving the image pick-up device 20, thereby changing the resolution. Changing the number of output pixels means that the resolution is changed. The "number of output pixels" means, for example, pixels employed in imaging (the pixels actually used for output, which together with each other generate an image) from out of the pixels contained in the image pick-up device 20.

The pixels contained in the image pick-up device 20 are placed in a matrix formation, such as the example illustrated in FIG. 7, and the output pixels of the image pick-up device 20 are variable by pixel row unit. Thus the change section 28D changes the number of output pixels by changing the output pixels by row unit.

Moreover, the change section 28D enhances the resolution of at least the second display image, from out of the first display image and the second display image, according to the reduction in parallax. In cases in which the parallax computed by the parallax computation section 28B is a threshold value or lower, the change section 28D changes the number of output pixels by raising the density to a higher density than when the parallax computed by the parallax computation section 28B exceeds the threshold value. Reference here to "density" means the proportion of output pixels of the phase difference pixels with respect to the number of output pixels of the image pick-up device 20, namely the density of the output pixels of the phase difference pixels in the output pixels of the image pick-up device 20.

Moreover, in cases in which the parallax computed by the parallax computation section 28B is the threshold value or lower, the change section 28D also changes the number of output pixels by raising the density according to the reduction in parallax.

Moreover, when the parallax computed by the parallax computation section 28B exceeds a threshold value, the change section 28D changes the number of output pixels by reducing the density to less than the density when the parallax computed by the parallax computation section 28B is the threshold value or lower. Moreover, in cases in which the parallax computed by the parallax computation section 28B exceeds the threshold value, the change section 28D changes the number of output pixels by lowering the density according to the increase in parallax.

Figure 10A:
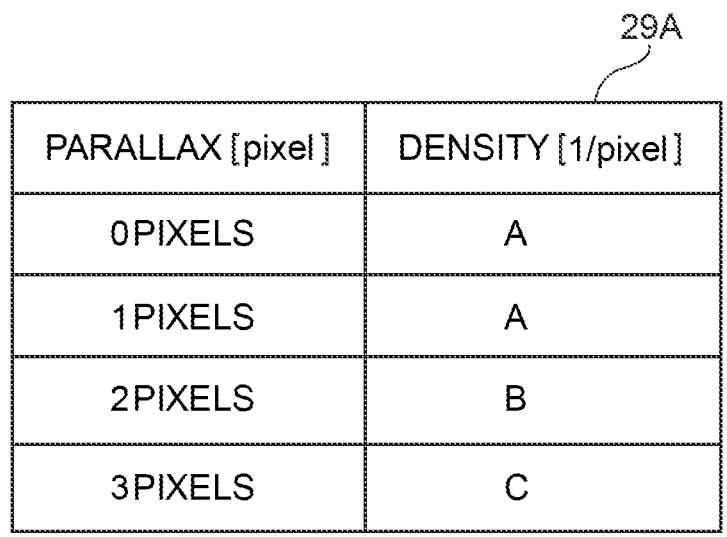
FIG. 10A is a schematic diagram illustrating an example of a configuration of a first output pixel determination table employed in an image processor according to the first exemplary embodiment.
Figure 10B:
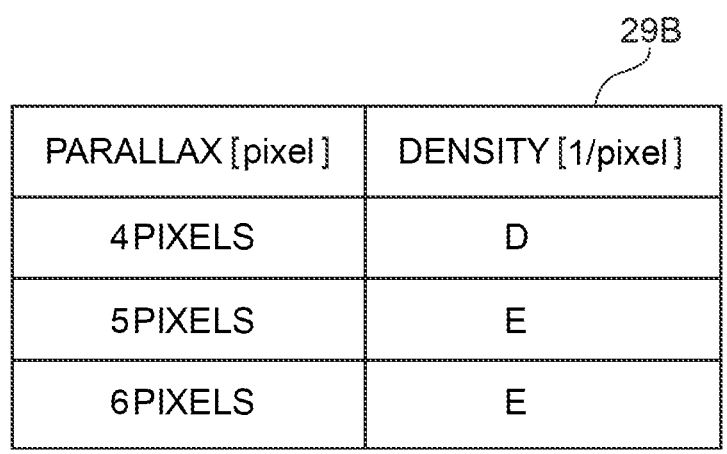
FIG. 10B is a schematic diagram illustrating an example of a configuration of a second output pixel determination table employed in an image processor according to the first exemplary embodiment.

The change section 28D changes the density by, for example, determining the output pixels by using a first output pixel determination table 29A as illustrated in FIG. 10A, and using a second output pixel determination table 29B as illustrated in FIG. 10B.

FIG. 10A schematically illustrates an example of a configuration of the first output pixel determination table 29A. The first output pixel determination table 29A as illustrated in FIG. 10A is employed in cases in which parallax computed by the parallax computation section 28B is the threshold value or lower. In the first exemplary embodiment, 3 pixels are employed as the "threshold value". The first output pixel determination table 29A associates density (1/pixels) with parallax (pixels). In the first output pixel determination table 29A, 0 to 3 pixels are employed as examples of parallax, and a density A is associated with a parallax of 0 pixels and 1 pixel, a density B is associated with a parallax of 2 pixels, and a density C is associated with a parallax of 3 pixels. The density A indicates, for example, the density in a case in which the output pixels are the pixels that appear in row units at 1 pixel for every 1 pixel in the column direction for all the pixels of the image pick-up device 20, namely the density in a case in which all the pixels contained in the image pick-up device 20 are output pixels. The density B indicates, for example, the density in a case in which the output pixels are the pixels that appear in row units at 1 pixel for every 2 pixels in the column direction from all the pixels of the image pick-up device 20. The density C indicates, for example, the density in a case in which the output pixels are the pixels that appear in row units at 1 pixel for every 3 pixels in the column direction from all the pixels of the image pick-up device 20.

FIG. 10B schematically illustrates an example of a configuration of the second output pixel determination table 29B. The second output pixel determination table 29B illustrated in FIG. 10B is employed in cases in which the parallax computed by the parallax computation section 28B exceeds the threshold value. Similarly to the first output pixel determination table 29A, the second output pixel determination table 29B also associates density (1/pixels) with parallax (pixels). In the second output pixel determination table 29B, 4 to 6 pixels are employed as examples of parallax. In the first exemplary embodiment, the upper limit to the computable range of parallax by the parallax computation section 28B is 6 pixels, and so the upper limit to the parallax employed in the second output pixel determination table 29B is also 6 pixels.

In the second output pixel determination table 29B, a density D is associated with a parallax of 4 pixels, and a density E is associated with a parallax of 5 pixels and 6 pixels. The density D indicates, for example, a density in cases in which the output pixels are the pixels that appear in row units at 1 pixel for every 4 pixels in the column direction from all the pixels of the image pick-up device 20. The density E indicates, for example, a density in cases in which the output pixels are the pixels that appear in row units at 1 pixel for every 6 pixels in the column direction from all the pixels of the image pick-up device 20.

In the first exemplary embodiment, examples have been given of employing the first output pixel determination table 29A and the second output pixel determination table 29B in order to change the density, however there is no limitation thereto, and a computation equation may be employed. For example, in place of the first output pixel determination table 29A, a computation equation (function) may be employed having the parallaxes illustrated in the first output pixel determination table 29A as variables and having the densities illustrated in the first output pixel determination table 29A as solutions. In place of the second output pixel determination table 29B, a computation equation (function) may be employed having the parallaxes illustrated in the second output pixel determination table 29B as variables and having the densities illustrated in the second output pixel determination table 29B as solutions.

Figure 11:
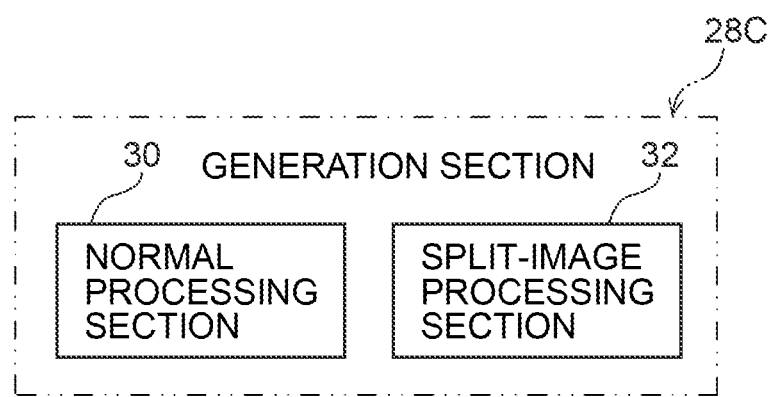
FIG. 11 is a functional block diagram illustrating an example of functions included in a generation section according to the first exemplary embodiment.

FIG. 11 illustrates an example of functions contained in the generation section 28C. As illustrated in FIG. 11, the generation section 28C includes a normal processing section 30 and a split-image processing section 32. The normal processing section 30 generates a chromatic normal image, serving as an example of a first display image, by processing the R, G B signals corresponding to the third pixel group. The split-image processing section 32 generates an achromatic split-image that is an example of a second display image by processing the G signals corresponding to the first pixel group and the second pixel group.

Returning to FIG. 3, the encoder 34 converts the input signal into a signal of another format and outputs the converted signal. The HYBRID FINDER 220 includes an LCD 247 that displays an electronic image. The number of pixels in a specific direction in the LCD 247 (for example the number of pixels in the row direction that is the parallax generation direction), is less than the number of pixels in the same direction of the display section 213. The display controller 36A is connected to the display section 213, the display controller 36B is connected to the LCD 247, and images are displayed on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus mode and an autofocus mode using the dial 212 (the focus mode switching section). When the one of the focus modes has been selected, the display controller 36 displays on the display devices a live-view image onto which the split-images have been synthesized. Moreover, when the autofocus mode has been selected by the dial 212, the CPU 12 operates as a phase difference detection section and an automatic focus adjusting section. The phase difference detection section detects the phase difference between the first image output from the first pixel group and the second image output from the second pixel group. The automatic focus adjusting section controls a lens drive section (not illustrated in the drawings) from the device controller 22 through the mounts 256, 346, based on the detected phase displacement, to move the focal position of the imaging lenses 16 such that the defocus amount of the imaging lenses 16 becomes zero. The "defocus amount" referred to above indicates, for example, a phase displacement amount between the first image and the second image.

The eyepiece detection section 37 detects each time a person (for example a photographer) looks into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to a communication network, such as a Local Area Network (LAN) or the internet, and transmission and reception of various data between external devices (for example a printer) and the CPU 12 is achieved through the communication network. When connected to a printer as an external device, the imaging device 100 is accordingly capable of outputting captured still images to a printer and printing. When connected to a display as an external device, the imaging device 100 is capable of outputting captured still images and live-view images to a display, and displaying thereon.

Figure 12:
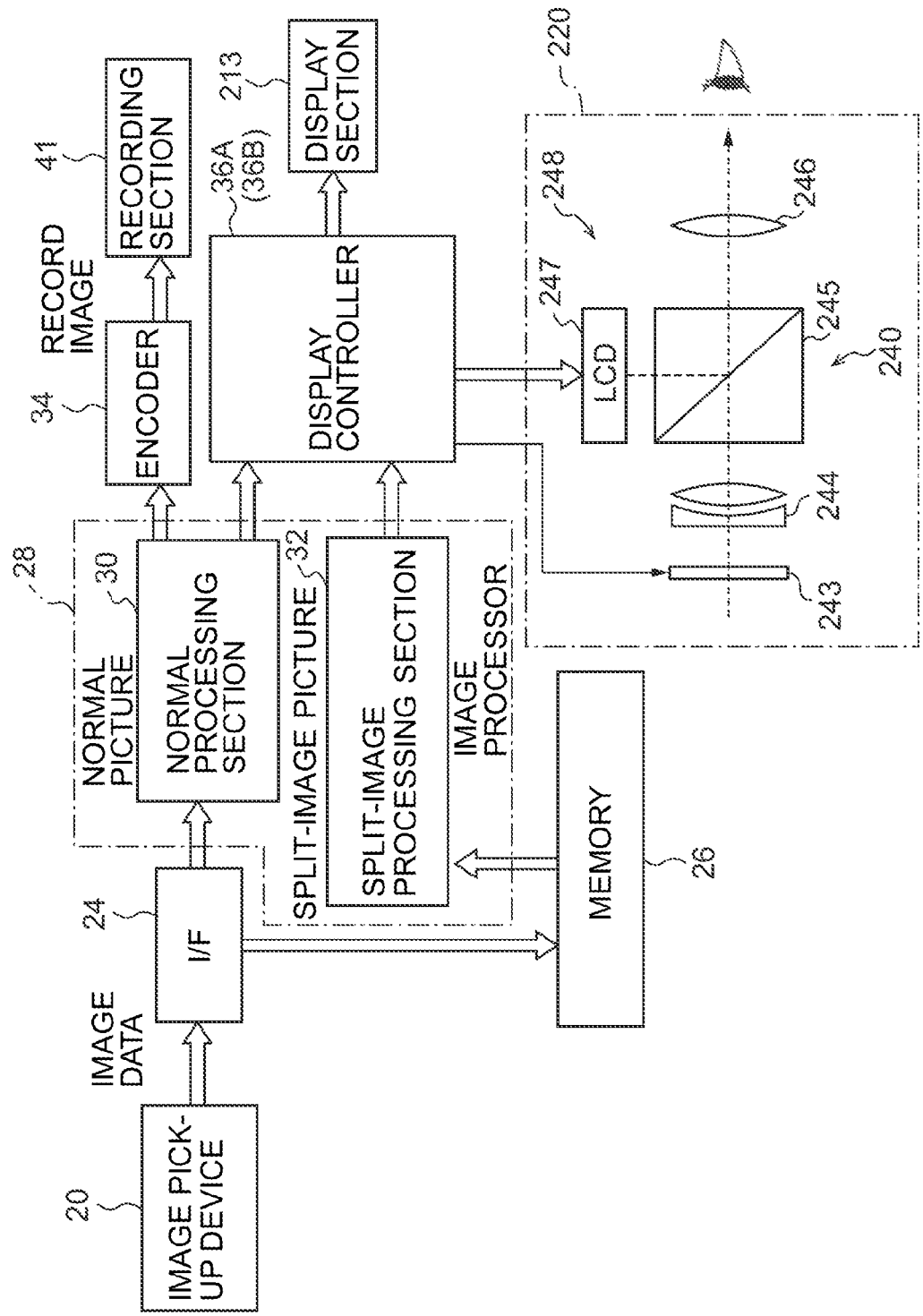
FIG. 12 is a block diagram illustrating an example of relevant functions of an imaging device according to the first exemplary embodiment.

FIG. 12 is a functional block diagram illustrating an example of relevant functions of the imaging device 100 according to the first exemplary embodiment. Common portions to the block diagram illustrated in FIG. 3 are appended with the same reference numerals.

The normal processing section 30 and the split-image processing section 32 each include a WB gain section, a gamma correction section, and a synchronization processing section (not illustrated in the drawings), and perform serial signal processing in each of the processing sections on the digital signals (RAW images) originally temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processing section performs color interpolation processing corresponding to the color filter array of the image pick-up device 20, and generates synchronized R, G, B signals. The normal processing section 30 and the split-image processing section 32 perform parallel image processing on the RAW images each time one screen's worth of RAW image is acquired by the image pick-up device 20.

Figure 13:
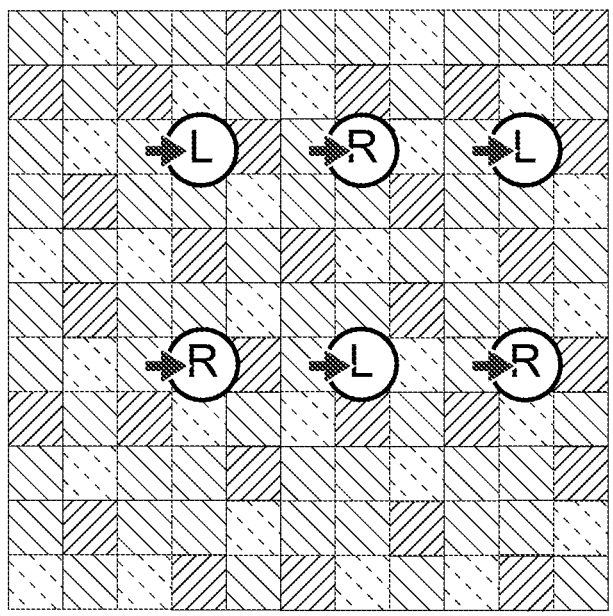
FIG. 13 is a schematic diagram illustrating an example of interpolation of phase difference pixels using normal pixels in an image pick-up device included in an imaging device according to the first exemplary embodiment.

The normal processing section 30 is input with the R, G, B RAW images from the interface section 24, and, as illustrated in the example in FIG. 13, generates the R, G, B pixels of the third pixel group by interpolation using peripheral pixels of the same color in the first pixel group and the second pixel group (for example the adjacent G pixels). This thereby enables a normal image for recording to be generated based on the third image output from the third pixel group.

The normal processing section 30 outputs image data of the generated normal image for recording to the encoder 34. The R, G, B signals processed by the normal processing section 30 are converted (encoded) by the encoder 34 into a recording signal and recorded in a recording section 41.

Moreover, a normal image for display that is an image based on the third image processed by the normal processing section 30 is output to the display controller 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and is thereby capable of acquiring images with different exposure conditions at the same time. Consequently, the image processor 28 is capable of generating images over a wide dynamic range based on the images with different exposure conditions. Moreover, due to being able to acquire plural images under the same exposure conditions at the same time, adding these images together enables a high sensitivity image with little noise to be generated, or a high resolution image to be generated.

The split-image processing section 32 extracts the G signals of the first pixel group and the second pixel group from the RAW image temporarily stored in the memory 26, and generates an achromatic split-image based on the G signals of the first pixel group and the second pixel group. Each of the first pixel group and the second pixel group extracted from the RAW image are pixel groups from the G filter pixels as described above. The split-image processing section 32 is accordingly able to generate an achromatic left parallax image and an achromatic right parallax image based on the G signals of the first pixel group and the second pixel group. In the following, for convenience of explanation, the above "achromatic left parallax image" is referred to as the "left eye image", and the above "achromatic right parallax image" is referred to above the "right eye image".

The split-image processing section 32 synthesizes the left eye image based on the first image output from the first pixel group together with the right eye image based on the second image output from the second pixel group to generate a split-image. Image data of the generated split-image is output to the display controller 36.

The display controller 36 generates image data for display based on the image data for recording corresponding to the third pixel group input from the normal processing section 30, and image data of the split-image corresponding to the first and second pixel groups input from the split-image processing section 32. For example, the display controller 36 synthesizes a split-image displayed by image data input from the split-image processing section 32 onto a display region of a normal image displayed by image data for recording corresponding to the third pixel group input from the normal processing section 30. The obtained synthesized image data is output to the display devices. Namely, the display controller 36A outputs image data to the display section 213, and the display controller 36B outputs image data to the LCD 247.

Figure 14A:
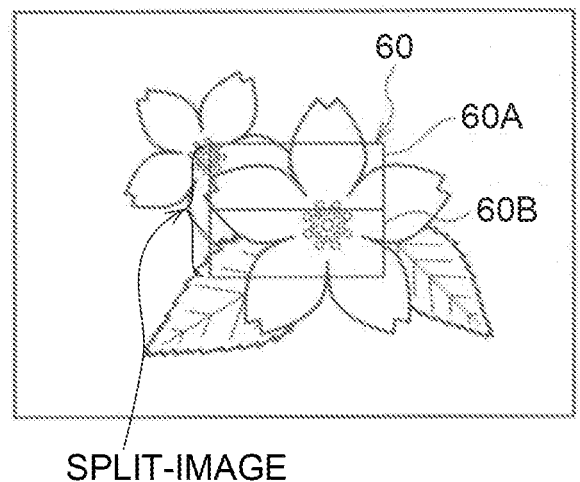
FIG. 14A is a screen shot diagram illustrating an example of a live-view image displayed on a display device of an imaging device according to first exemplary embodiment, when the live-view image is in a non-focused state.
Figure 14B:
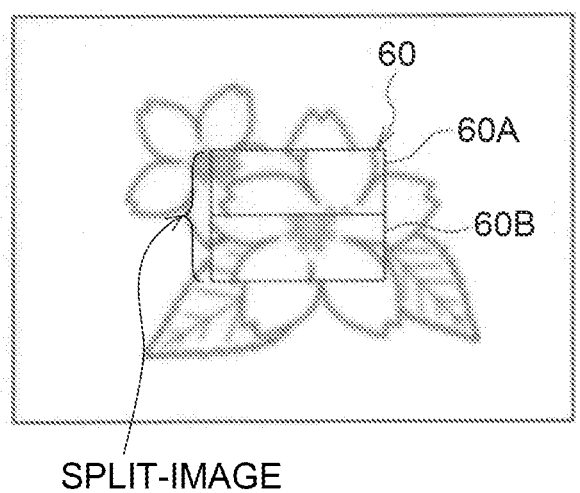
FIG. 14B is a screen shot diagram illustrating an example of a live-view image displayed on a display device of an imaging device according to first exemplary embodiment, when the live-view image is in a focused state.

The split-image generated by the split-image processing section 32 is a multi-section image synthesized from one section of a left eye image and one section of a right eye image. Examples of what is referred to here as a "multi-section image" are the split-images illustrated in FIG. 14A and FIG. 14B. The split-image illustrated in FIG. 14 are split-images of images synthesized from the top half image from the left eye image, and from the bottom half image from the right eye image, and are images in which the 2 sections of the image divided in 2 in the up-down direction are displaced with respect to each other in a specific direction (for example the parallax generation direction) according to the state of focus. The mode of the split-image is not limited to those of the examples in FIG. 14A, and FIG. 14B, and may be an image synthesized from one section of the left eye image and one section of the right eye image at a position corresponding to the position of a specific region of the display section 213. In such cases, for example, 4 sections of an image divided in 4 in the up-down direction may be displaced with respect to each other in a specific direction (for example the parallax generation direction) according to the state of focus.

The method for synthesizing the split-image onto the normal image is not limited to the synthesis method in which the split-image is fitted in place of an image of a portion of a normal image. For example, a synthesis method may be employed in which the split-image is superimposed on the normal image. Moreover, when superimposing the split-image, a synthesis method may be employed in which transparencies, of the image of a portion of a normal image onto which the split-image is to be superimposed and of the split-image, are appropriately adjusted for superimposition. In this manner the live-view image illustrating the imaging subject that is successively captured is displayed on the screen of the display device, and the displayed live-view image is an image in which the split-image is displayed within a display region of the normal image.

The HYBRID FINDER 220 includes an OVF 240 and an EVF 248. The OVF 240 is a reverse Galileo finder including an object lens 244 and an eyepiece lens 246, and the EVF 248 includes the LCD 247, a prism 245, and the eyepiece lens 246.

A liquid crystal shutter 243 is overlaid at the front of the object lens 244, and the liquid crystal shutter 243 blocks light such that the optical image is not incident to the object lens 244 while the EVF 248 is being used.

The prism 245 reflects the electronic image or various data displayed on the LCD 247 and guides these toward the eyepiece lens 246, and synthesizes an optical image together with information (electronic image, various types of data) displayed on the LCD 247.

When the finder switching lever 214 is turned in the arrow SW direction illustrated in FIG. 1, switching is made between the OVF mode that enables a visual check to be made on an optical image using the OVF 240 at each turn, and the EVF mode that enables a visual check to be made on the electronic image using the EVF 248.

In the OVF mode, the display controller 36B controls so that the liquid crystal shutter 243 is in a non-light blocking state, enabling a visual check to be made on an optical image through the eyepiece section. Moreover, only the split-image is displayed on the LCD 247. This thereby enables a finder image in which the split-image is superimposed on a portion of the optical image to be displayed.

In the EVF mode, the display controller 36B controls so that the liquid crystal shutter 243 is in a light blocking state, enabling a visual check to be made on an electronic image displayed alone on the LCD 247 from the eyepiece section. Similar image data to the image data synthesized with the split-image for output on the display section 213 is input to the LCD 247, thereby enabling the electronic image synthesized with the split-image to be displayed on a portion of the normal image, similarly to with the display section 213.

Figure 15:
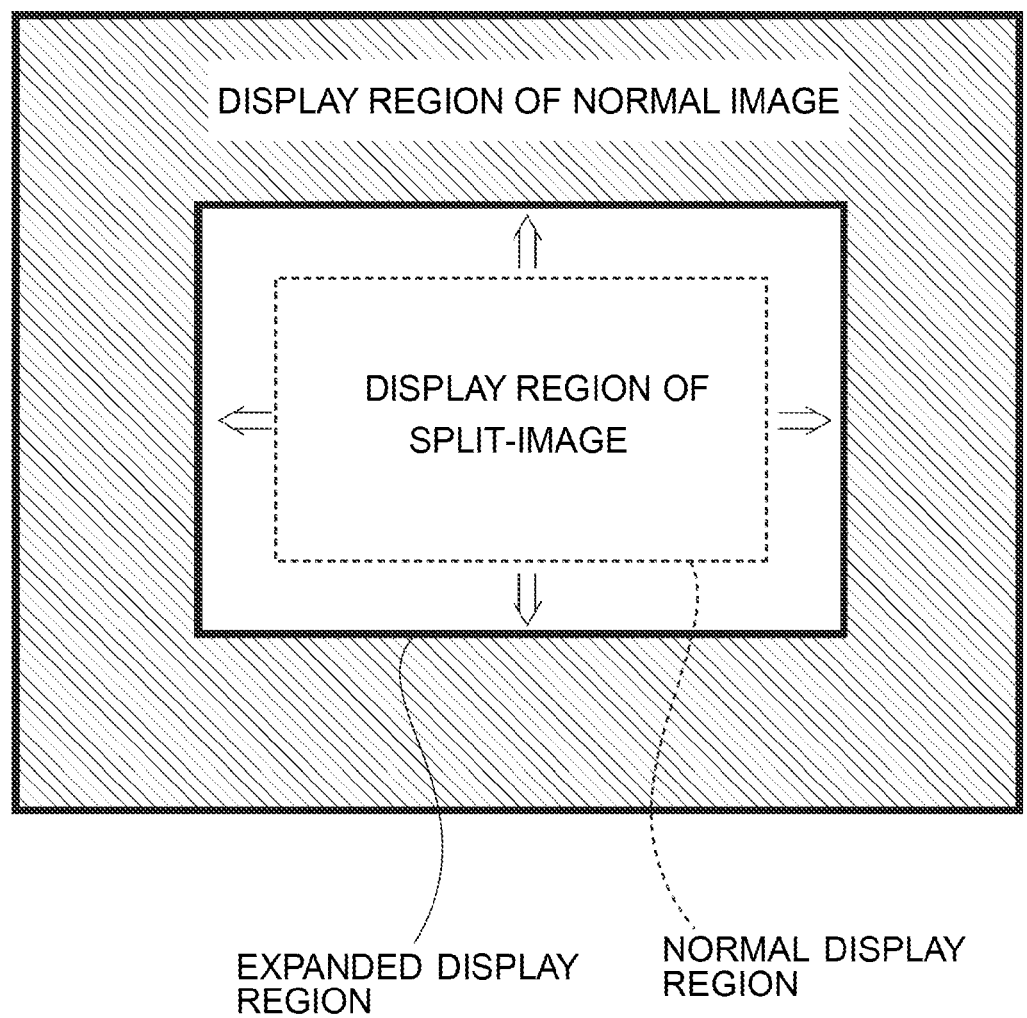
FIG. 15 is a schematic diagram illustrating an example of positions of a display region for a split-image and a display region for a normal image in a display device included in an imaging device according to the first exemplary embodiment.

FIG. 15 illustrates an example of respective display regions of a normal image and a split-image on a display device. As an example, as illustrated in FIG. 15, when input with a normal image and a split-image, the display device displays the input split-image in the solid line rectangular frame at the center of the screen, or in the intermittent line rectangular frame at the inside of the solid line rectangular frame (a split-image display region). The display device displays the input normal image in the outer peripheral region of the split-image (a display region of a normal image). The split-image is displayed in the intermittent line rectangular frame (referred to below as the "normal display region") when the parallax computed by the parallax computation section 28B exceeds the threshold value. Display is made in the solid line rectangular frame (referred to below as the "expanded display region") when the parallax computed by the parallax computation section 28B is the threshold value or lower. The line indicating the outer edge of the expanded display region at the center portion of the screen and the line indicating the outer edge of the normal display region in FIG. 15 are not actually displayed, however for ease of explanation they are indicated in FIG. 15.

Figure 16:
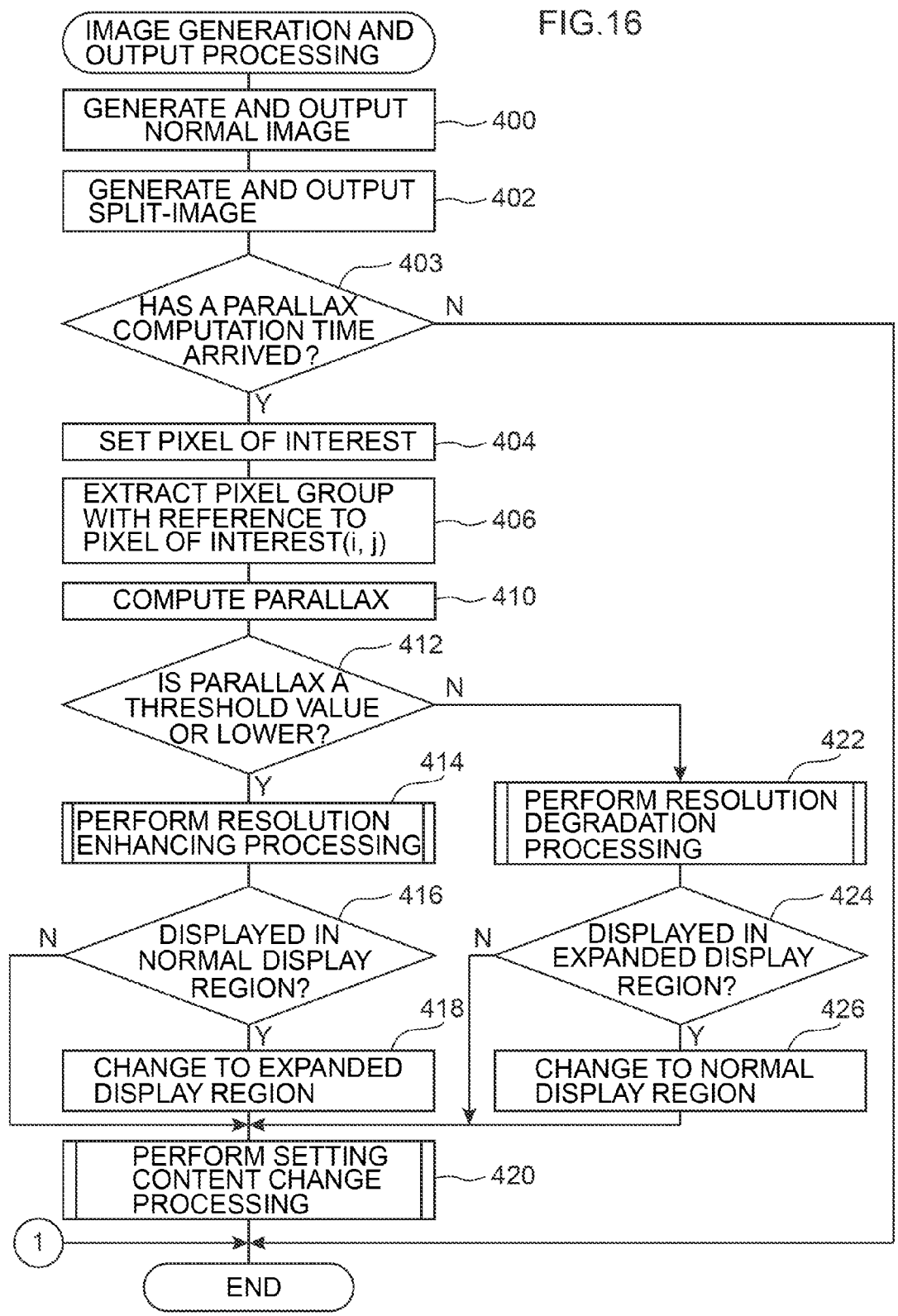
FIG. 16 is a flowchart illustrating an example of flow of image generation and output processing according to the first exemplary embodiment.

Explanation next follows regarding operation of the first exemplary embodiment, and regarding image generation and output processing performed by the image processor 28 each time the first to third images are input, with reference to FIG. 16. Note that in the example here, the image generation and output processing is performed by the image processor 28, however the present invention is not limited thereto, and, for example, the image generation and output processing may be performed in the imaging device 100 by the CPU 12 executing an image generation and output processing program.

At step 400 in FIG. 16, a normal image is generated by the generation section 28C based on the input third image, and output to a specific storage region (for example the memory 26) and to the display controller 36.

At the next step 402, first the first and second images are acquired by the image acquisition section 28A. Then a left eye image and a right eye image are generated by the generation section 28C based on the first and second images, a split-image generated based on the generated left eye image and right eye image, and the split-image is output to the display controller 36. When the display controller 36 has been input with the normal image output at step 400, and the split-image output at step 402, the display controller 36 controls to display the normal image on a display device, and to display the split-image within the display region of the normal image.

Thus when the steps 400, 402 have been performed by the generation section 28C, live view images are displayed on the display section 213 and the HYBRID FINDER 220 as illustrated in the examples in FIG. 14A and FIG. 14B. In the examples in FIG. 14A and FIG. 14B, the split-image is displayed in the region inside a frame 60 at the center of the screen, corresponding to the split-image display region illustrated as an example in FIG. 15, and the normal image is displayed in the region outside the frame 60, corresponding to the normal image display region.

Namely, the first and second pixel groups are set according to the size of the frame 60. The split-image is broadly divided into an image (parallax image) of an upper half 60A of the frame 60 of a left eye image corresponding to the first image output from the first pixel group, and an image (parallax image) of a lower half 60B of the frame 60 of a right eye image corresponding to the second image output from the second pixel group.

In cases in which the imaging subject corresponding to the image in the frame 60 is not in focus in the imaging lenses 16, the image is displaced in the parallax generation direction (for example the row direction) at a boundary between the parallax image of the upper half 60A and the parallax image of the lower half 60B in the split-image, as illustrated in FIG. 14A. The image is also displaced in the parallax generation direction at the boundary between the normal image and the split-image. This shows that phase difference is occurring, and a photographer is able to visually discern that phase difference has occurred, and able to visually discern the parallax generation direction, using the split-image.

However, in cases in which the imaging subject corresponding to the image in the frame 60 is in focus in the imaging lenses 16, the image is aligned at the boundary between the parallax image of the upper half 60A and the parallax image of the lower half 60B in the split-image as illustrated in FIG. 14B. The image is also aligned at the boundary between the normal image and the split-image. This shows that phase difference has not occurred, and a photographer is able to visually discern that phase difference has not occurred, using the split-image.

Thus the photographer is able to check the state of focus of the imaging lenses 16 using the split-image displayed on the display device. Moreover, in manual focus mode, the focus misalignment amount (defocus amount) can be made zero by manual operation of a focus ring 302 of the imaging lenses 16. Moreover, a color image can be displayed that does not have a mismatch in color between the normal image and split-image, enabling manual focusing adjustment by a photographer to be assisted by using a color split-image.

Then at step 403, determination is made by the parallax computation section 28B as to whether or not a parallax computation time has arrived. The parallax computation time is specified for each specific cycle (parallax computation cycle) for computing the parallax, and an example of the parallax computation cycle is, for example, every specific number (for example 100 times) of times the image generation and output processing is performed. There is, however, no limitation thereto, and the image generation and output processing may be performed at cycles of every specific period of time from when the image generation and output processing was last performed. Negative determination is made at step 403 in cases in which the parallax computation time has not yet arrived, and the image generation and output processing is ended. Affirmative determination is made at step 403 in cases in which the parallax computation time has arrived, and processing proceeds to step 404.

Then at step 404, a target pixel (pixels of interest (i, j)) for parallax computation is set by the parallax computation section 28B from within the split-image generated at step 402. In such cases, for example, in cases in which the size of the split-image is m×n pixels, the pixel of interest is transitioned sequentially each time step 404 is performed, from pixel (1, 1) to pixel (m, n).

At the next step 406, a pixel group of specific block size, (Cx×Cy) pixels, is extracted by the image processor 28B as a pixel group with reference to the pixels of interest (i, j) set at step 404.

Then at step 410, parallax is computed by the parallax computation section 28B as indicated by the displacement amount between each of the pixels in the left eye image extracted at step 406 and the corresponding respective pixels in the right eye image extracted at step 406.

At step 410, based on the pixel group of the left eye image first extracted at step 406, for example, the image processor 28, searches for a pixel group with matching characteristic points in the right eye image. Namely, degree of matching is evaluated between the pixel group (block) extracted from the left eye image, and, from out of the right eye image, blocks in the right eye image corresponding to the pixel group (block) extracted from the left eye image. Then, the pixel acting as a reference in the right eye image block when there is the maximum degree of matching between blocks is set as the corresponding point pixel of the right eye image, to correspond to the pixel of interest in the left eye image. In the block matching method of the first exemplary embodiment, the degree of matching is evaluated between blocks by, for example, employing the sum of squared difference (SSD) in brightness of the pixels in each of the blocks as a degree of matching evaluation function (an SSD block matching method).

In an SSD block matching method, the computation is performed according to the following equation on each of the pixels f (i, j), g (i, j) in the blocks of both comparison target images.

$$SSD \sum_i \sum_j \{f(i, j) - g(i, j)\}^2$$

The computation of Equation (1) is performed while moving the position of the block in the right eye image within a specific search region, and the pixel at the position in the search region with the minimum SSD value is set as the search target pixel. Then, the parallax representing the displacement amount between the pixel of interest in the left eye image and the corresponding pixel found in the right eye image is computed.

Then at step 412, determination is made by the change section 28D as to whether or not the parallax computed at step 410 is a threshold value or lower. In cases in which the parallax is the threshold value or lower, affirmative determination is made at step 412, and processing proceeds to step 414.

Figure 17:
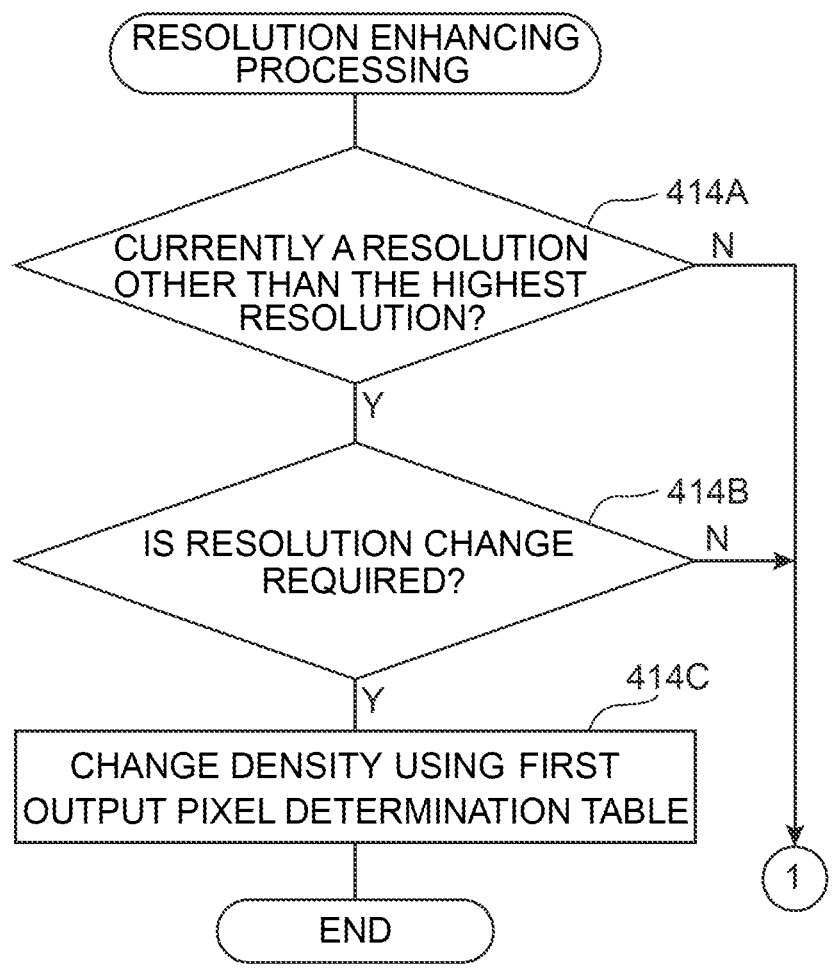
FIG. 17 is a flowchart illustrating an example of flow of resolution enhancing processing according to the first exemplary embodiment.

At step 414, resolution enhancing processing is performed by the change section 28D, and then processing proceeds to step 416. Resolution enhancing processing indicates processing that raises the resolution of the image displayed on the display device in comparison to the resolution of the image displayed on the display device when the parallax exceeds the threshold value. FIG. 17 illustrates an example of a flow of resolution enhancing processing. At step 414A illustrated in FIG. 17, determination is made by the change section 28D as to whether or not resolution currently being employed is a resolution other than the highest resolution. The "highest resolution" indicates, for example, the resolution when all of the pixels contained in the image pick-up device 20 are output pixels (when there is density A). When it is the highest resolution, negative determination is made at step 414A, and the resolution enhancing processing is ended, and the image generation and output processing is ended. When not the highest resolution, affirmative determination is made at step 414A, and processing proceeds to step 414B.

At step 414B, determination is made by the change section 28D as to whether or not a change in the resolution is required. For example, determination is made that a change in resolution is required in cases in which the parallax computed at step 410 is different from the parallax computed the previous time, and determination is made that a change in resolution is not required when the parallax computed at step 410 is the same as the parallax computed the previous time. Negative determination is made at step 414B when a change in resolution is not required, and the resolution enhancing processing is ended, and the image generation and output processing is ended. Affirmative determination is made at step 414B when a change in resolution is required, and processing proceeds to step 414C.

At step 414C, the density is changed by the change section 28D according to the first output pixel determination table 29A. When step 414C has been performed by the change section 28D, the resolution enhancing processing is ended. The change section 28D changes the density by controlling the image pick-up device 20 to selectively drive pixels contained in the image pick-up device 20 through the CPU 12 and the device controller 22.

Figure 18:
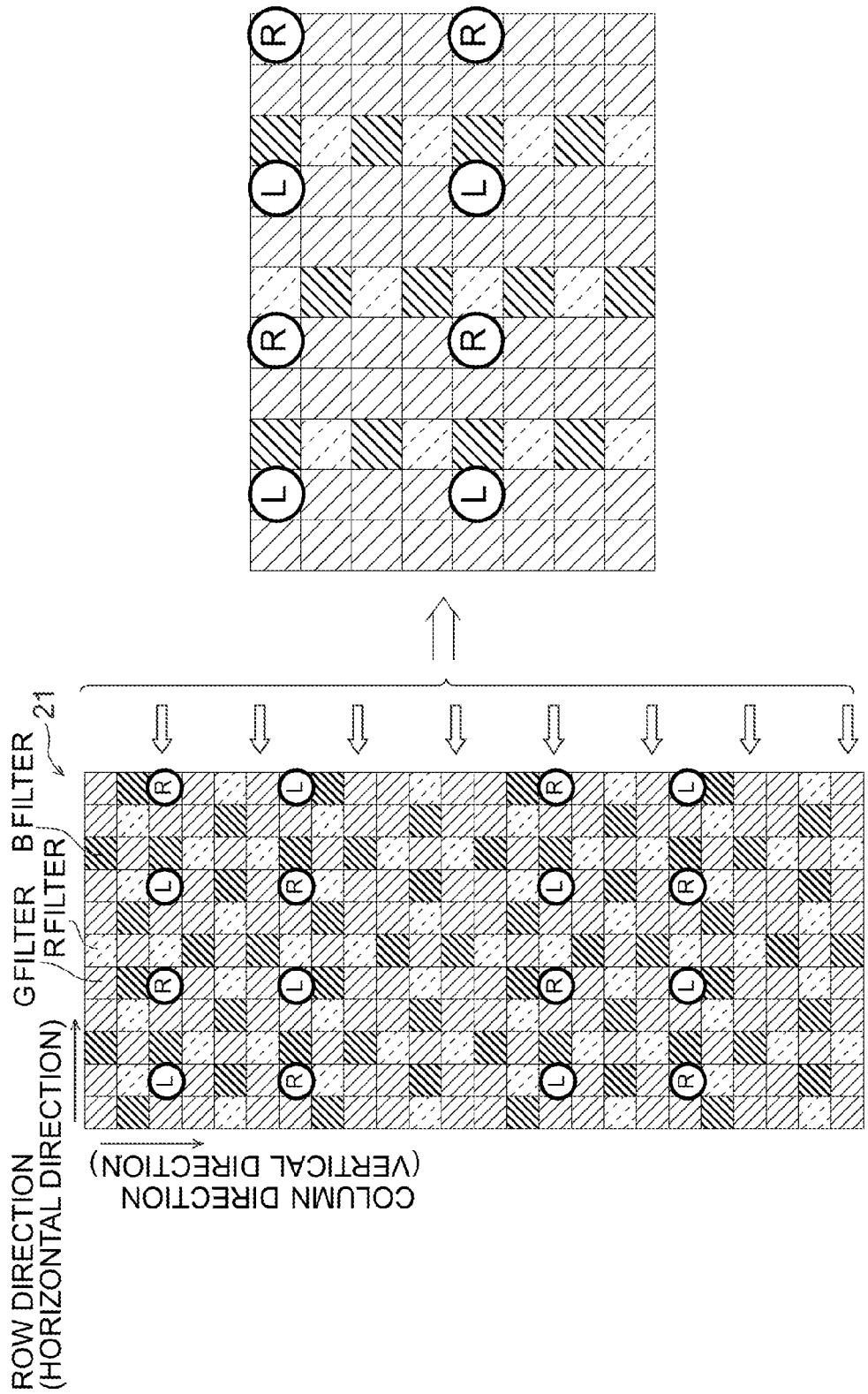
FIG. 18 is a schematic diagram illustrating an example of a method of specifying output pixels in a case in which parallax computed by a parallax computation section according to the first exemplary embodiment is 3 pixels.

FIG. 18 illustrates an example of placements of output pixels when the parallax is 3 pixels in the example illustrated in FIG. 10. As illustrated in FIG. 18, in cases in which the parallax computed at step 410 is 3 pixels, due to performing step 414C, the output pixels are the pixels that appear in row units every 3 pixels along the column direction from all the pixels contained in the image pick-up device 20. In such cases, the number of the phase difference pixels employed as output pixels is, as in the example illustrated in FIG. 18, ½ the number of the total phase difference pixels contained in the image pick-up device 20. In such a case, the number of output pixels also including normal pixels is one-third of the total number of pixels contained in the image pick-up device 20, and so the power consumption is reduced to approximately one-third of that when all the pixels contained in the image pick-up device 20 are output pixels.

Figure 19:
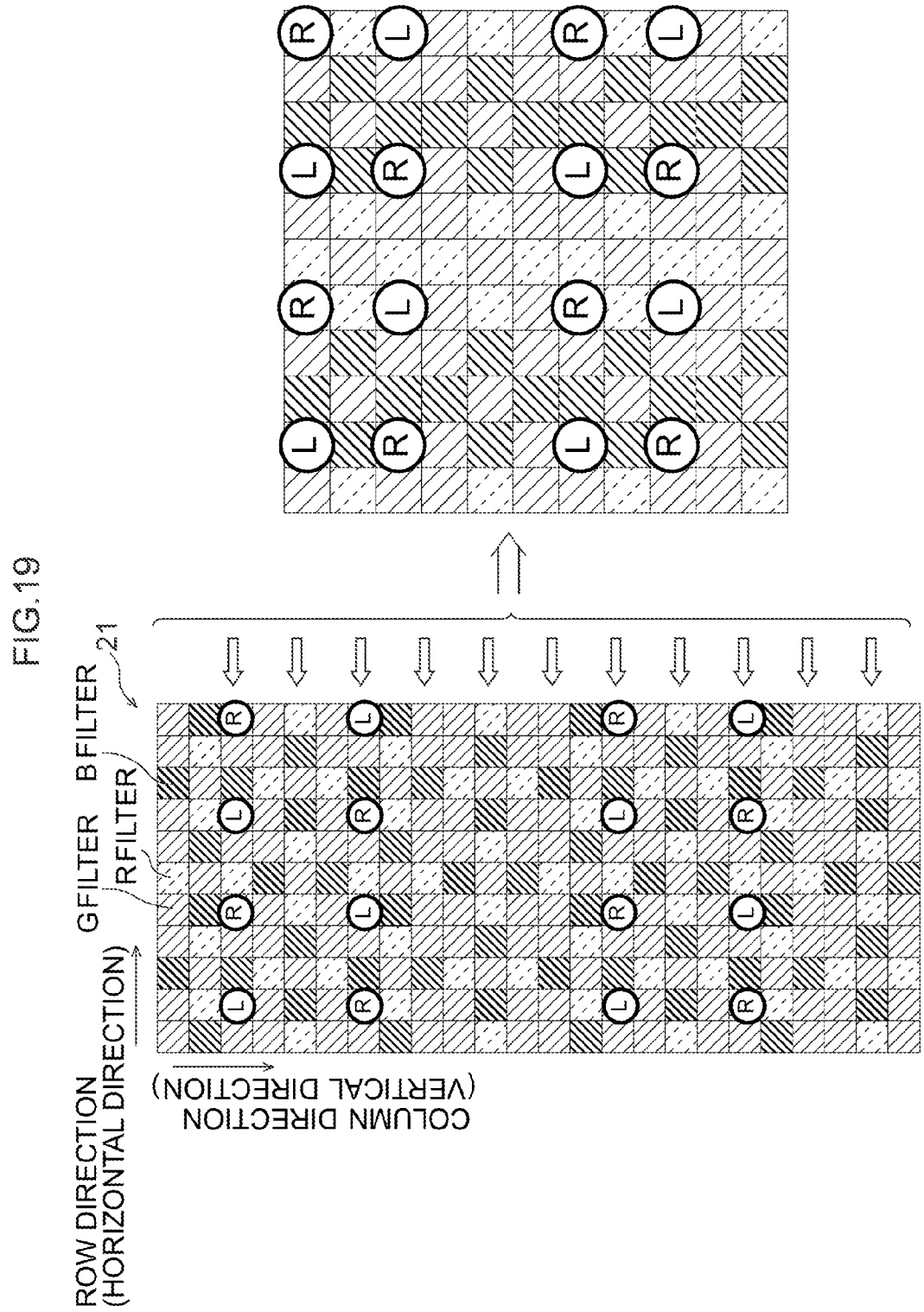
FIG. 19 is a schematic diagram illustrating an example of a method of specifying output pixels in a case in which parallax computed by a parallax computation section according to the first exemplary embodiment is 2 pixels.

FIG. 19 illustrates an example of placement of output pixels for a case in which the parallax in the example illustrated in FIG. 10 is 2 pixels. As illustrated in FIG. 19, in cases in which the parallax computed at step 410 is 2 pixels, due to performing step 414C, the output pixels are the pixels that appear in row units every 2 pixels along the column direction from all the pixels contained in the image pick-up device 20. In such cases, the number of the phase difference pixels employed as output pixels is, as in the example illustrated in FIG. 19, the total number the phase difference pixels contained in the image pick-up device 20. In other words, even though the output pixels are the pixels that appear in row units every 2 pixels in the column direction from all the pixels contained in the image pick-up device 20, the number of phase difference pixels is not decreased. The reason that the number of phase difference pixels does not decrease is because the phase difference pixels are pre-placed in the image pick-up device 20 such that the phase difference pixels do not decrease even when the output pixels are the pixels that appear in row units every 2 pixels in the column direction from all the pixels contained in the image pick-up device 20. In cases in which the output pixels are the pixels that appear in row units every 2 pixels in the column direction from all the pixels contained in the image pick-up device 20, the number of output pixels also including normal pixels is one-half of the total of number pixels contained in the image pick-up device 20. Therefore the power consumption is reduced to approximately one-half of that when all the pixels contained in the image pick-up device 20 are output pixels.

The number of phase difference pixels in cases in which all the pixels contained in the image pick-up device 20 are output pixels is the same in cases in which the output pixels are the pixels that appear in row units every 2 pixels in the column direction from all the pixels contained in the image pick-up device 20. However, the number of normal pixels is increased. Thus the density when all the pixels contained in the image pick-up device 20 are output pixels is lower than in cases in which the output pixels are the pixels that appear in row units every 2 pixels in the column direction from all the pixels contained in the image pick-up device 20. The resolution in such cases in which all the pixels contained in the image pick-up device 20 are output pixels is higher for the normal image than the resolution in cases in which the output pixels are the pixels that appear in row units every 2 pixels in the column direction from all the pixels, even though there is no change in the split-image.

Returning to FIG. 16, at step 416, determination is made as to whether or not the split-image is currently displayed in the normal display region. Reference here to "displayed in the normal display region" indicates, for example, that the split-image is displayed using the entire region of the normal display region illustrated in FIG. 15. In contrast, "not displayed in the normal display region" indicates, for example, that the split-image is displayed using the entire region of the expanded display region illustrated in FIG. 15. Affirmative determination is made at step 416 when the split-image is being displayed in the normal display region, and processing proceeds to step 418. Negative determination is made at step 416 when the split-image is not being displayed in the normal display region, and processing proceeds to step 420.

At step 418, the region for displaying the split-image is changed by the change section 28D from the normal display region to the expanded display region, then processing proceeds to step 420. When step 418 has been performed, the split-image is displayed in the expanded display region, and the display region of the normal image is contracted by the amount by which the display region of the split-image is expanded.

However, in cases in which the parallax computed at step 410 is not the threshold value or lower (cases in which the parallax exceeds the threshold value), negative determination is made at step 412, and processing proceeds to step 422.

Figure 20:
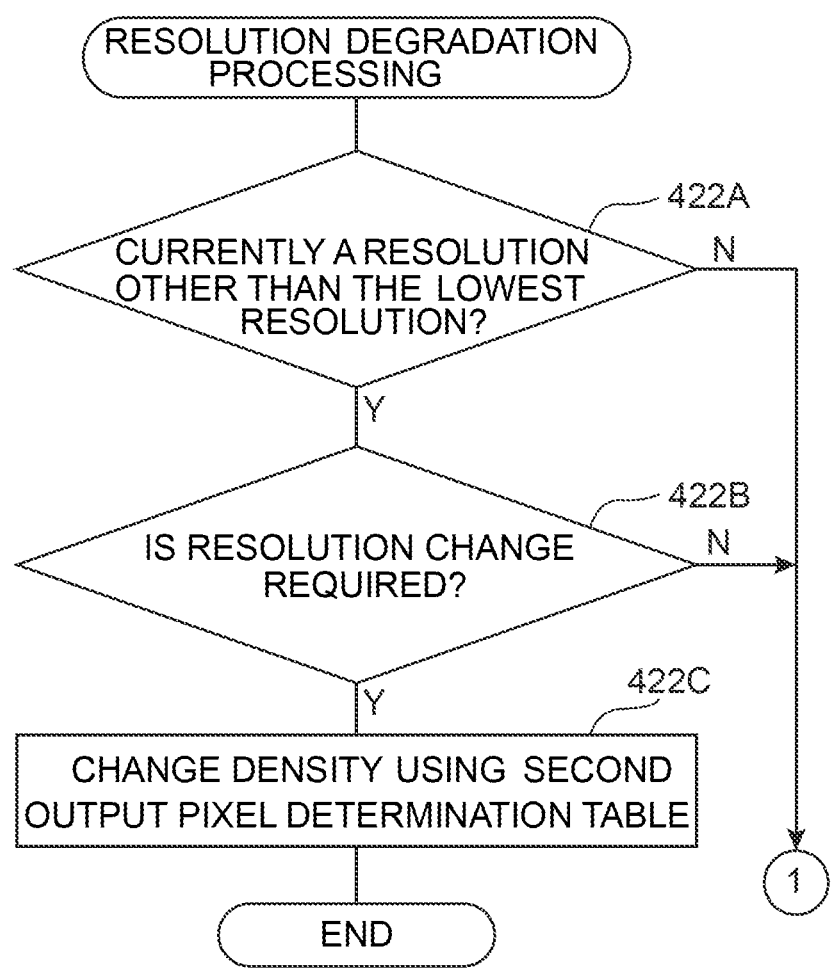
FIG. 20 is a flowchart illustrating an example of flow of resolution degradation processing according to the first exemplary embodiment.

At step 422, resolution degradation processing is performed by the change section 28D, then processing proceeds to step 424. The resolution degradation processing indicates processing to lower the resolution of the image displayed on the display device compared to the resolution of the image displayed on the display device in cases in which the parallax is the threshold value or lower. At step 422A illustrated in FIG. 20, determination is made by the change section 28D as to whether or not the resolution currently employed is a resolution other than the lowest resolution. Reference here to the "lowest resolution" indicates the resolution that is the lowest from out of resolutions subject to change by the resolution degradation processing and is, for example, resolution in a case in which the output pixels are the pixels that appear in row units every 4 pixels in the column direction from all the pixels contained in the image pick-up device 20 (a case of density D). Negative determination is made at step 422A when the resolution is the lowest resolution, and the resolution degradation processing is ended, and the image generation and output processing is ended. Affirmative determination is made at step 422 when the resolution is resolution other than the lowest resolution, and processing proceeds to step 422B.

At step 422B, determination is made by the change section 28D as to whether or not a change in the resolution is required. For example, determination is made that a change in resolution is required in cases in which the parallax computed at step 410 is different from the parallax computed the previous time, and determination is made that a change in resolution is not required in cases in which the parallax computed at step 410 is the same as the parallax computed the previous time. Negative determination is made at step 422B when a change in resolution is not required, and the resolution degradation processing is ended, and the image generation and output processing is ended. Affirmative determination is made at step 422B when a change in resolution is required, and processing proceeds to step 422C.

At step 422C, the density is changed by the change section 28D according to the second output pixel determination table 29B. When step 422C has been performed by the change section 28D, the resolution degradation processing is ended.

Figure 21:
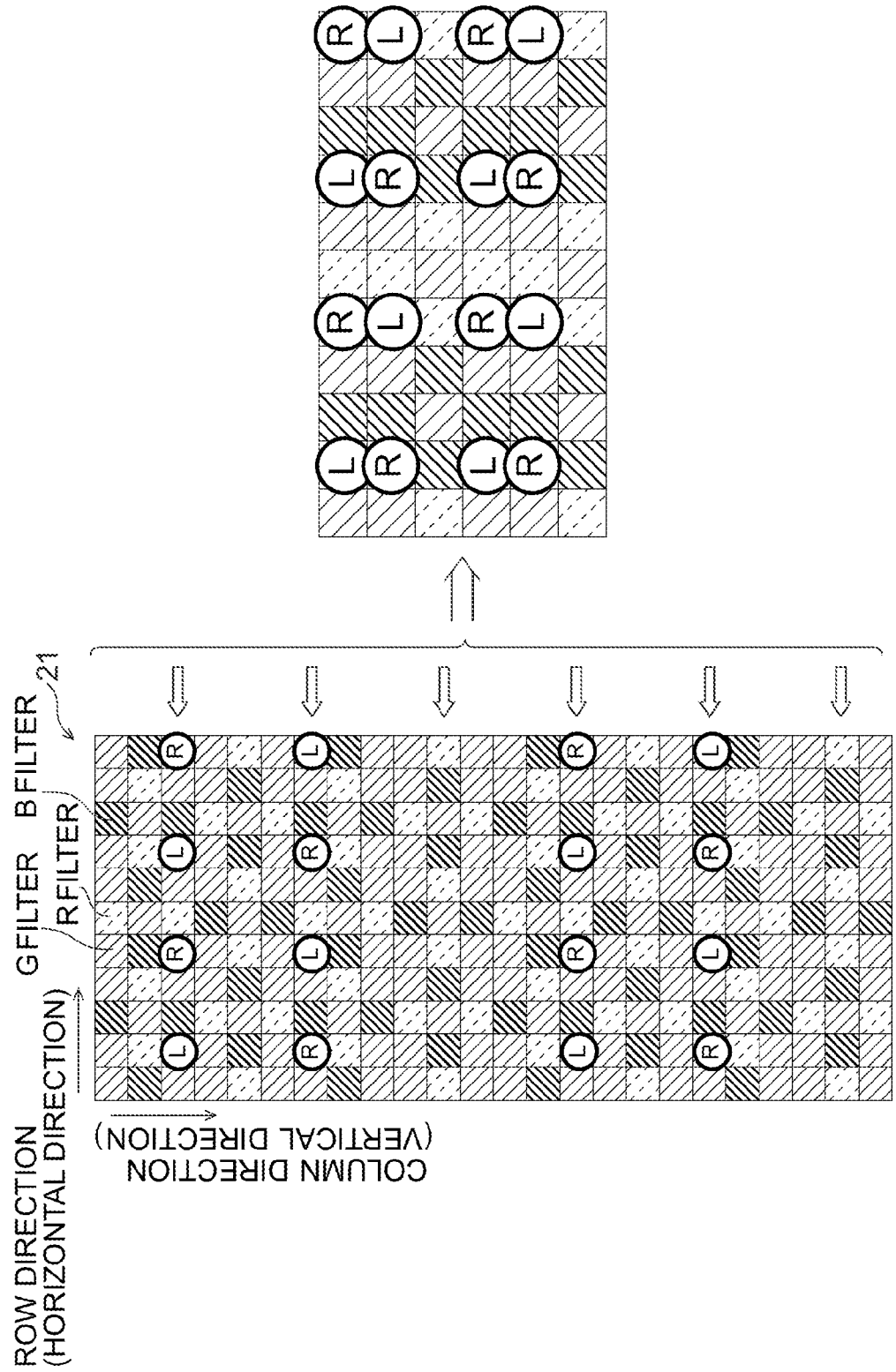
FIG. 21 is a schematic diagram illustrating an example of a method of specifying output pixels in a case in which parallax computed by a parallax computation section according to the first exemplary embodiment is 4 pixels.

FIG. 21 illustrates an example of a placement of output pixels for a case in which the parallax in the example illustrated in FIG. 10 is 4 pixels. As illustrated in FIG. 21, in cases in which the parallax computed at step 410 is 4 pixels, due to performing step 422C, the output pixels are the pixels that appear in row units every 4 pixels in the column direction from all the pixels contained in the image pick-up device 20. In such cases, the number of phase difference pixels that are employed as output pixels is the total number of the phase difference pixels contained in the image pick-up device 20 as illustrated in the example in FIG. 21. In other words, the number of phase difference pixels does not decrease even though the output pixels are the pixels that appear in row units every 4 pixels in the column direction from all the pixels contained in the image pick-up device 20. The reason that the number of phase difference pixels does not decrease is because the phase difference pixels are pre-placed in the image pick-up device 20 such that the phase difference pixels do not decrease even when the output pixels are the pixels that appear in row units every 4 pixels in the column direction from all the pixels contained in the image pick-up device 20. In cases in which the output pixels are the pixels that appear in row units every 4 pixels in the column direction from all the pixels contained in the image pick-up device 20, the number of output pixels including normal pixels is also ¼ the total number pixels contained in the image pick-up device 20. Therefore the power consumption is reduced to approximately ¼ that when all the pixels contained in the image pick-up device 20 are output pixels.

Figure 22:
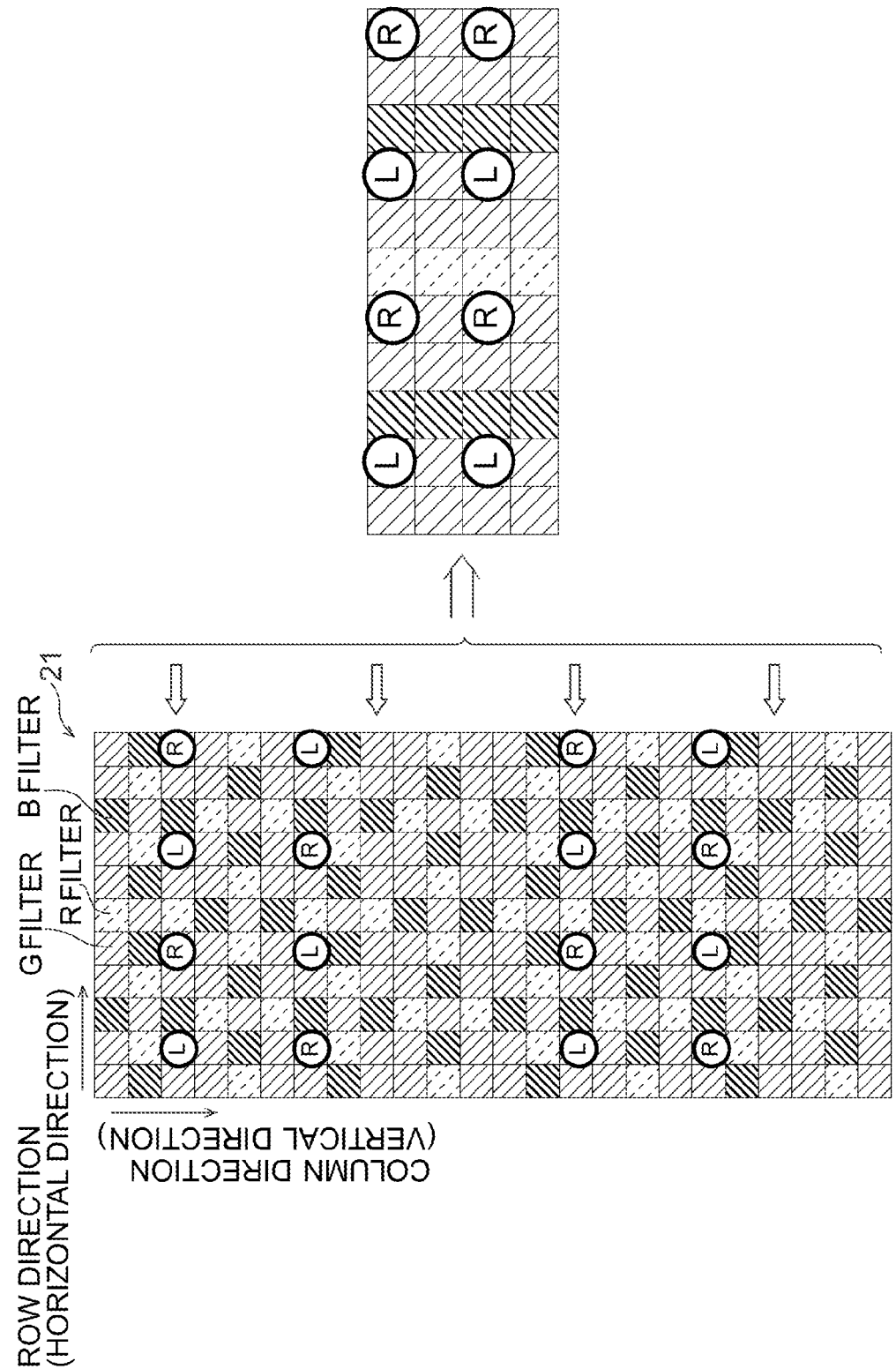
FIG. 22 is a schematic diagram illustrating an example of a method of specifying output pixels in a case in which parallax computed by a parallax computation section according to the first exemplary embodiment is 6 pixels.

FIG. 22 illustrates an example of a placement of output pixels for a case in which the parallax in the example illustrated in FIG. 10 is 6 pixels. As illustrated in FIG. 22, in cases in which the parallax computed at step 410 is 6 pixels, due to performing step 422C, the output pixels are the pixels that appear in row units every 6 pixels in the column direction from all the pixels contained in the image pick-up device 20. In such cases, the number of phase difference pixels that are employed as output pixels is ½ the total number of the phase difference pixels contained in the image pick-up device 20 as illustrated in the example in FIG. 22. In such cases, the number of output pixels including normal pixels is also ⅙ the total number pixels contained in the image pick-up device 20. Therefore the power consumption is reduced to approximately ⅙ that when all the pixels contained in the image pick-up device 20 are output pixels.

In cases in which the parallax computed at step 410 is 5 pixels, due to performing step 422C, the output pixels are the pixels that appear in row units every 5 pixels in the column direction from all the pixels contained in the image pick-up device 20. In such cases, the number of phase difference pixels that are employed as output pixels is ½ the total number of the phase difference pixels contained in the image pick-up device 20. In such cases, the number of output pixels including normal pixels is also ⅕ the total number pixels contained in the image pick-up device 20. Therefore the power consumption is reduced to approximately ⅕ that when all the pixels contained in the image pick-up device 20 are output pixels.

Returning to FIG. 16, at step 424, determination is made by the change section 28D as to whether or not the split-image is currently being displayed in the expanded display region. Reference here to "being displayed in the expanded display region" indicates, for example, that the split-image is being displayed using the entire region of the expanded display region illustrated in FIG. 15. In contrast, reference here to "not being displayed in the expanded display region" indicates, for example, that the split-image is being displayed using the entire region of the normal display region illustrated in FIG. 15. Determination is affirmative at step 424 in cases in which the split-image is displayed in the expanded display region, and processing proceeds to step 426.

At step 426, the region in which the split-image is displayed is changed by the change section 28D from the expanded display region to the normal display region, and then processing proceeds to step 420. When step 426 has been performed, the split-image is displayed in the normal display region, and the display region for the normal image is expanded by the amount by which the display region for the split-image has been contracted.

At step 420, setting content change processing is performed by the generation section 28C, and then processing proceeds to step 422. The setting content change processing indicates processing that changes the content of setting for the imaging device 100.

Figure 23:
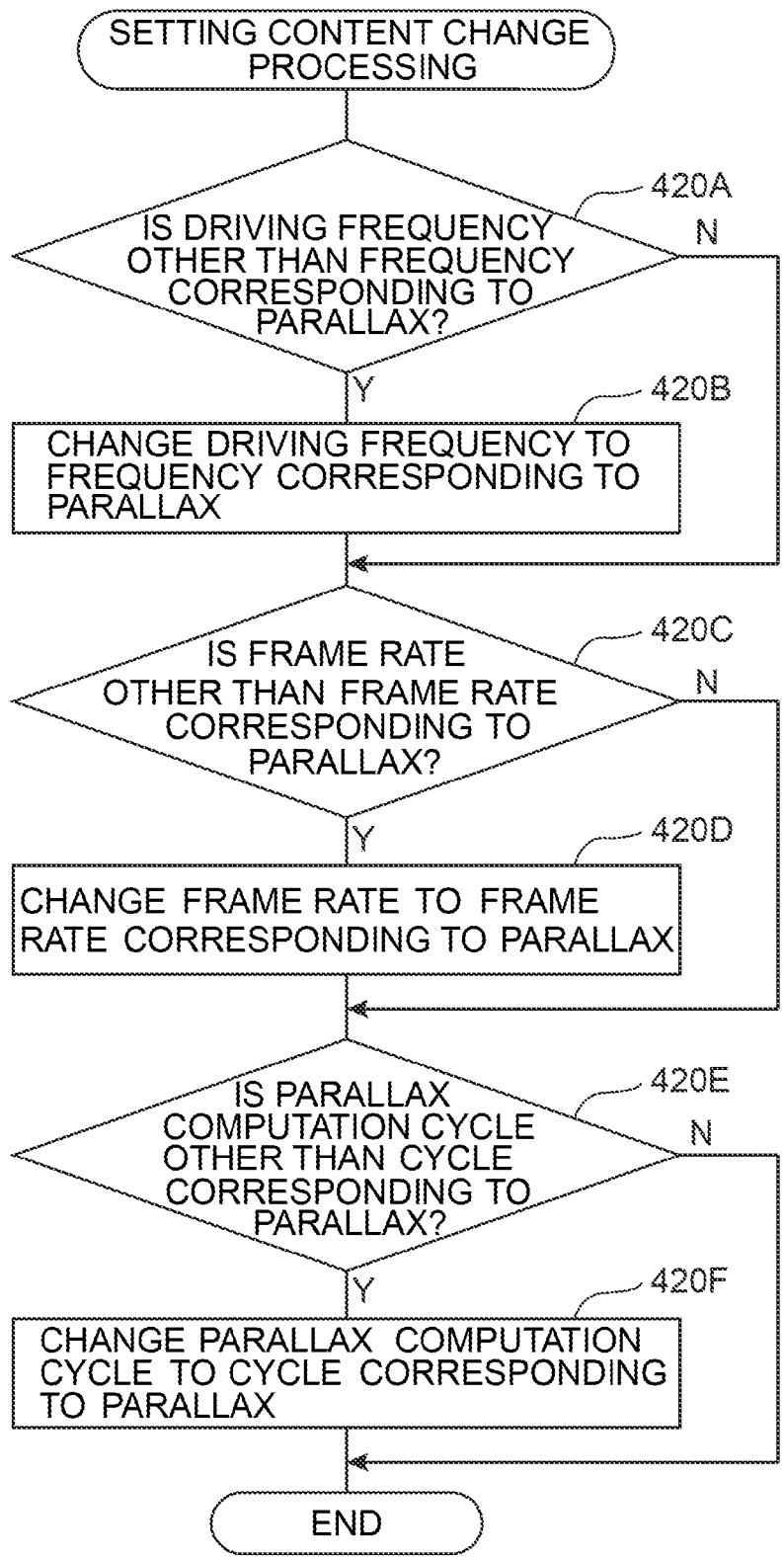
FIG. 23 is a flowchart illustrating an example of a flow of setting content change processing according to the first exemplary embodiment.

FIG. 23 illustrates an example of flow of setting content change processing. In the setting content change processing illustrated in FIG. 23, first determination is made at step 420A by the change section 28D as to whether or not the driving frequency currently set in the image pick-up device 20 is a driving frequency corresponding to the latest parallax computed by the parallax computation section 28B. Reference here to the "latest parallax" indicates, for example, the parallax most recently computed at step 410. Negative determination is made at step 420A when the driving frequency of the image pick-up device 20 is not the driving frequency corresponding to the latest parallax computed by the parallax computation section 28B, and processing proceeds to step 420C. Affirmative determination is made at step 420A when the driving frequency of the image pick-up device 20 is the driving frequency corresponding to the latest parallax computed by the parallax computation section 28B, and processing proceeds to step 420B.

At step 420B, the driving frequency currently set as the driving frequency for the image pick-up device 20 is changed by the change section 28D to the driving frequency corresponding to the latest parallax computed by the parallax computation section 28B. When this is performed, the larger the parallax computed by the parallax computation section 28B, the higher the driving frequency that is set. Relationships between parallaxes and driving frequencies are pre-prepared as a table, the driving frequency is derived according to the table, and the derived driving frequency set. In place of the table, a computation equation may be employed that has the solution of the driving frequency and uses the parallax as a variable so as to compute the driving frequency.

At the next step 420C, determination is made by the change section 28D as to whether or not the frame rate currently set is a frame rate that corresponds to the latest parallax computed by the parallax computation section 28B. Reference here to "the latest parallax" indicates, for example, the newest parallax computed at step 410. Negative determination is made at step 420C when the frame rate is not a frame rate corresponding to the latest parallax computed by the parallax computation section 28B, and processing proceeds to step 420E. Affirmative determination is made at step 420C when the frame rate is a frame rate corresponding to the latest parallax computed by the parallax computation section 28B, and processing proceeds to step 420D.

At step 420D, the current frame rate of the image subject to display on the display device (in this example the normal image and the split-image) is changed by the change section 28D to the frame rate corresponding to the latest parallax computed by the parallax computation section 28B. When this is performed, the smaller the parallax computed by the parallax computation section 28B, the higher the frame rate that is set. Moreover, the relationships between parallax and frame rate are pre-prepared as a table, the frame rate derived according to the table, and the derived frame rate set. In place of the table, a computation equation may be employed that has the solution of the frame rate and uses the parallax as a variable, so as to compute the frame rate.

At the next step 420E, determination is made by the change section 28D as to whether or not the parallax computation cycle is a parallax computation cycle that corresponds to the latest parallax computed by the parallax computation section 28B. Reference here to "the latest parallax" indicates, for example, the newest parallax computed at step 410. Negative determination is made at step 420E when the parallax computation cycle is not a parallax computation cycle corresponding to the latest parallax computed by the parallax computation section 28B and the setting content change processing is ended. Affirmative determination is made at step 420E when the parallax computation cycle is a parallax computation cycle corresponding to the latest parallax computed by the parallax computation section 28B, and processing proceeds to step 420F.

At step 420F, the current parallax computation cycle is changed by the change section 28D to the parallax computation cycle corresponding to the latest parallax computed by the parallax computation section 28B, and then the setting content change processing is ended. The larger the parallax computed by the parallax computation section 28B, the longer the parallax computation cycle set. In other words, the parallax computation cycle is shorter, the smaller the parallax computed by the parallax computation section 28B. When this is performed, relationships between the parallax and the parallax computation cycle are pre-prepared as a table, the parallax computation cycle derived according to the table, and the derived parallax computation cycle set. In place of the table, a computation equation may be employed that has the solution of the parallax computation cycle and uses the parallax as a variable, so as to compute the parallax computation cycle.

As explained above, in the imaging device 100 according to the first exemplary embodiment, the resolution of the normal image and the resolution of the split-image generated by the generation section 28C are changed according to the parallax computed by the parallax computation section 28B. Thus in the imaging device 100 according to the first exemplary embodiment, the processing speed and resolution can be set according to the degree of focus, more so than in cases lacking the present configuration. Moreover, a state in which the resolution of the normal image and the resolution of the split-image are excessive or insufficient can be suppressed from occurring.

In the imaging device 100 according to the first exemplary embodiment, the resolution is enhanced as the parallax decreases. Thus in the imaging device 100 according to the first exemplary embodiment, in comparison to cases lacking the present configuration, an increase in processing speed can be achieved for processing (for example processing to read output pixels) as the degree of focus gets smaller, and resolution can be enhanced as the degree of focus gets larger.

In the imaging device 100 of the first exemplary embodiment, the resolution of the normal image and the resolution of the split-image is changed by changing the number of output pixels through changing the method of driving the image pick-up device 20. Thus in the imaging device 100 according to the first exemplary embodiment, the resolution can be changed with simpler control than cases lacking the present configuration. Moreover, by simple control it is possible to suppress the occurrence of a state in which the resolution of the normal image and the resolution of the split-image is excessive, or insufficient, more so than in cases lacking the present configuration.

In the imaging device 100 according to the first exemplary embodiment, the output pixels of the image pick-up device 20 are changeable in row units from all the pixels contained in the image pick-up device 20, and the resolution is changed by the output pixels being changed in row units by the change section 28D. Thus the imaging device 100 according to the first exemplary embodiment enables the resolution to be changed with simpler control than cases lacking the present configuration.

Moreover, in the imaging device 100 according to the first exemplary embodiment, the output pixels are changed in row units at a first specific interval in the column direction when changing the output pixels by row unit. The imaging device 100 according to the first exemplary embodiment is accordingly able to simplify control for the control related to changing the output pixels compared to cases lacking the present configuration.

In the imaging device 100 according to the first exemplary embodiment, as the first specific interval, an interval is adopted to change the number of output pixels contained in the first and second pixel groups by row unit. Thus the imaging device 100 according to the first exemplary embodiment changes the resolution of the split-image with simpler control than cases lacking the present configuration.

In the imaging device 100 according to the first exemplary embodiment, the first specific interval is made narrower as the parallax decreases. The imaging device 100 according to the first exemplary embodiment is accordingly capable of suppressing a drop in the visibility of the second display image caused by a decrease in parallax, more so than in cases lacking the present configuration.

In the imaging device 100 according to the first exemplary embodiment, the number of output pixels is changed by changing the density of the output pixels of the first and second pixel groups in the output pixels of the image pick-up device 20. The imaging device 100 according to the first exemplary embodiment is accordingly capable of setting the processing speed and the resolution of the split-image according to the degree of focus by more simple control than in cases lacking the present configuration. Moreover, it is capable of suppressing the occurrence of a state in which the resolution of the split-image is excessive, or insufficient, with simpler control than in cases lacking the present configuration.

In the imaging device 100 according to the first exemplary embodiment, in cases in which the parallax computed by the parallax computation section 28B is the threshold value or lower, the number of output pixels is changed by making the density higher than in cases in which the parallax computed by the parallax computation section 28B exceeds the threshold value. The imaging device 100 according to the first exemplary embodiment is accordingly capable of suppressing the occurrence of a state in which the resolution of the split-image is insufficient when the parallax is the threshold value or lower, more so than in cases lacking the present configuration.

Moreover, the imaging device 100 according to the first exemplary embodiment raises the density according to the decrease in parallax when the parallax computed by the parallax computation section 28B is the threshold value or lower. The imaging device 100 according to the first exemplary embodiment is according capable of suppressing the occurrence of a state in which the split-image resolution is insufficient when the parallax is the threshold value or lower, more precisely than in cases lacking the present configuration.

In the imaging device 100 according to the first exemplary embodiment, when the parallax computed by the parallax computation section 28B exceeds the threshold value, the number of output pixels is changed by making the density lower than the density when the parallax computed by the parallax computation section 28B is the threshold value or lower. The imaging device 100 according to the first exemplary embodiment is thereby capable of suppressing the occurrence of a state in which the split-image resolution is excessive when the parallax exceeds the threshold value, more so than in cases lacking the present configuration.

In the imaging device 100 according to the first exemplary embodiment, the density is lowered according to the increase in parallax when the parallax computed by the parallax computation section 28B exceeds the threshold value. The imaging device 100 according to the first exemplary embodiment is accordingly capable of suppressing the occurrence of a state in which the split-image resolution is excessive when the parallax exceeds the threshold value, more precisely than in cases lacking the present configuration.

In the imaging device 100 according to the first exemplary embodiment, a change is made from the normal display region to the expanded display region when the resolution is enhanced to exceed a specific value. The imaging device 100 according to the first exemplary embodiment is accordingly capable of raising the visibility of the split-image, more so than in cases lacking the present configuration. In the first exemplary embodiment, the resolution realized by applying a density corresponding to the parallax equivalent to the threshold value is applied as the "specific value", however there is no limitation thereto, and another value may be employed. For example, a resolution may be realized by applying a density corresponding to a predetermined parallax from out of parallaxes of 2 to 4 pixels.

In the imaging device 100 according to the first exemplary embodiment, in cases in which the resolution has been degraded to a specific value or lower in a state in which the display region of the split-image has been expanded, the size of the display region of the split-image is returned to the normal size. The imaging device 100 according to the first exemplary embodiment is accordingly capable of suppressing the visibility of the split-image from deteriorating, more so than in cases lacking the present configuration.

Moreover, the imaging device 100 according to the first exemplary embodiment changes the frame rate of the image subject to display according to the parallax computed by the parallax computation section 28B. The imaging device 100 according to the first exemplary embodiment is accordingly capable of setting the frame rate according to the degree of focus, more so than in cases lacking the present configuration. This thereby enables the occurrence of a state in which the frame rate is excessive or insufficient to be suppressed, more so than in cases lacking the present configuration.

In the imaging device 100 according to the first exemplary embodiment, the frequency of computation of the parallax by the parallax computation section 28B is changed according to the parallax computed by the parallax computation section 28B. The imaging device 100 according to the first exemplary embodiment is accordingly capable of making the frequency of computation correspond to the degree of focus better than in cases lacking the present configuration. This thereby enables the occurrence of a state in which the computation frequency is excessive or insufficient to be suppressed, more so than in cases lacking the present configuration.

In the imaging device 100 according to the first exemplary embodiment, the driving frequency of the image pick-up device 20 is changed according to the parallax computed by the parallax computation section 28B. The imaging device 100 according to the first exemplary embodiment is accordingly capable of setting the driving frequency of the image pick-up device 20 to a driving frequency according to the degree of focus, more so than in cases lacking the present configuration. This thereby enables the occurrence of a state in which the driving frequency of the image pick-up device 20 is excessive or insufficient to be suppressed, more so than in cases lacking the present configuration.

Figure 24:
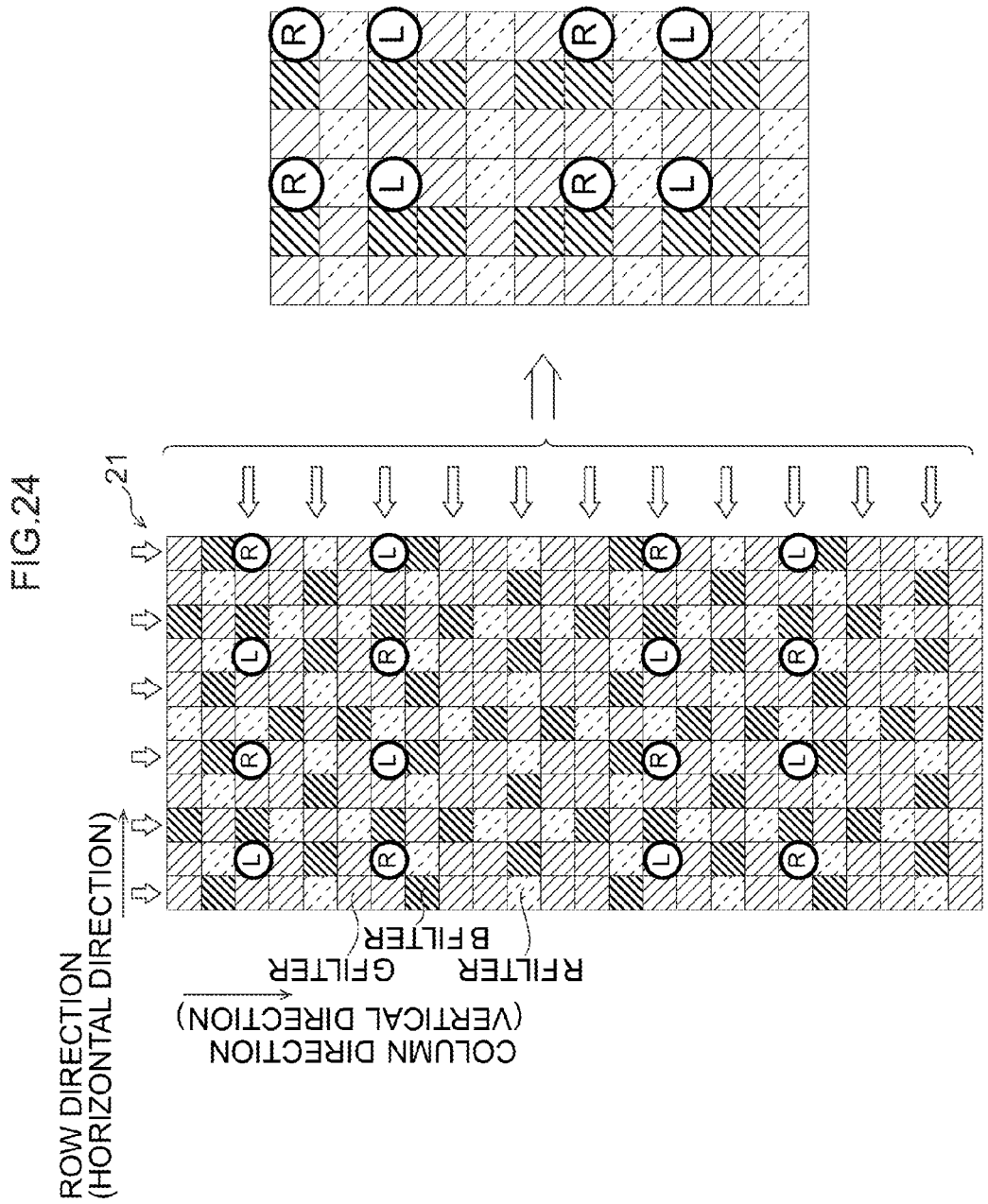
FIG. 24 is a schematic diagram illustrating a first modified example of a method of specifying output pixels according to the first exemplary embodiment, illustrating an example of a method in which output pixels are specified in both the row direction and the column direction.

In the first exemplary embodiment, an example is given in which the output pixels are pixels that appear in row units at 1 pixel for every 4 pixels in the column direction from out of all the pixels contained in the image pick-up device 20 (see FIG. 21); however the same density as the example in FIG. 21 may be realized by specifying the output pixels by row unit and column unit. In such cases, for example as illustrated in FIG. 24, output pixels may be defined as the pixels that appear in row units at 1 pixel for every 2 pixels in the column direction from out of all the pixels contained in the image pick-up device 20, and the output pixels may be pixels that appear in column units at 1 pixel for every 2 pixels in the row direction from out of all the pixels contained in the image pick-up device 20. This thereby enables the same density as the example illustrated in FIG. 21 to be realized. In the state in which the output pixels illustrated in FIG. 24 are employed, specific output pixels are made non-operative when a parallax of 2 pixels is computed by the parallax computation section 28B. Namely, the output pixels defined by column unit are made non-operative in the row direction from out of all the pixels contained in the image pick-up device 20. A density the same as the example illustrated in FIG. 19 is accordingly realized. Reference here to "non-operative" indicates that output pixels are not employed in a captured image (such that they are not subject to output, and do not contribute to image generation).

Figure 25:
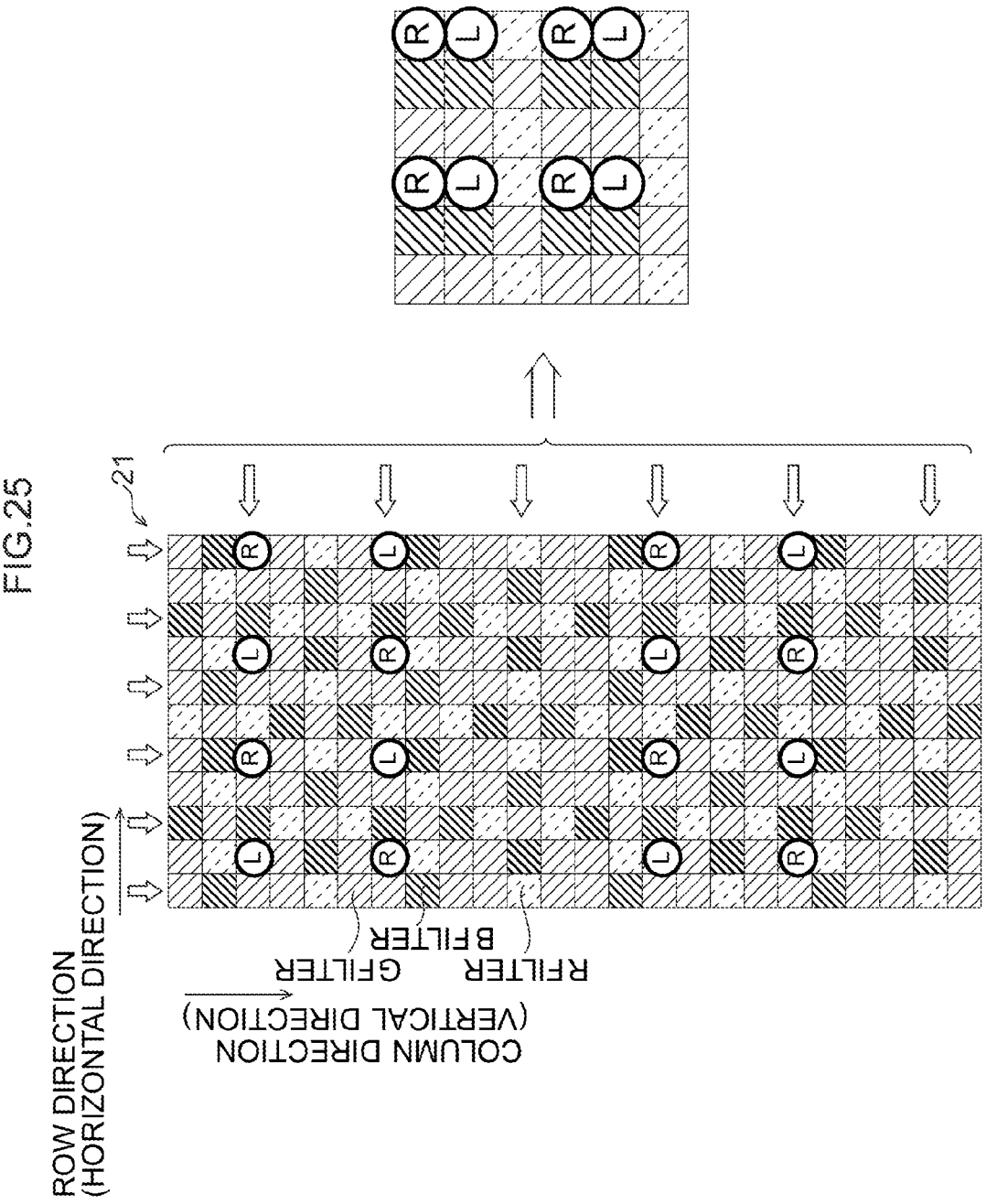
FIG. 25 is a schematic diagram illustrating a second modified example of a method of specifying output pixels according to the first exemplary embodiment, illustrating an example of a method in which output pixels are specified in both the row direction and the column direction.

In the first exemplary embodiment, the upper limit of the parallax computable range of the parallax computation section 28B is 6 pixels, however a number of pixels exceeding 6 pixels may be adopted as the upper limit of the parallax computable range. In such cases too, the breadth of density can be widened by specifying the output pixels by row unit and column unit. For example, in the example illustrated in FIG. 25, the output pixels are the pixels that appear in row units at 1 pixel for every 4 pixels in the column direction from out of all the pixels contained in the image pick-up device 20, and the output pixels are the pixels that appear in column units at 1 pixel for every 2 pixels in the row direction from out of all the pixels contained in the image pick-up device 20. This thereby enables a lower density to be realized than a density in cases in which output pixels are the pixels that appear in row units at 1 pixel for every 6 pixels in the column direction from out of all the pixels contained in the image pick-up device 20.

In the first exemplary embodiment, explanation has been given of an example of a case in which row units of output pixels are changed along the column direction from out of all the pixels contained in the image pick-up device 20; however there is no limitation thereto, and the column units of output pixels may be changed along the row direction from out of all the pixels contained in the image pick-up device 20. In such cases, obviously in order to display the split-image, the phase difference pixels are pre-placed at specific positions such that the phase difference pixels are contained in the column units of the output pixels. There are similarities to the first exemplary embodiment from the viewpoint of raising the density according to the decrease in the parallax. The density may be achieved by specifying the output pixels to be those at each specific number of pixels in a specific direction that is unrelated to the row units and the column units. In such cases too, in order to display the split-image, obviously the phase difference pixels are pre-placed at specific positions such that the phase difference pixels are contained in the output pixels.

Figure 26:
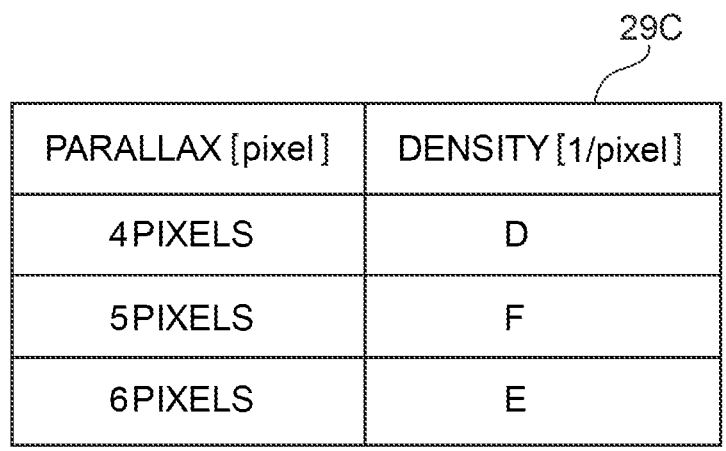
FIG. 26 is a schematic diagram illustrating a modified example of a second output pixel determination table employed in an image processor according to the first exemplary embodiment.

In the first exemplary embodiment, the same density (density E) is applied when the parallax computed by the parallax computation section 28B is 5 pixels and 6 pixels; however there is no limitation thereto and the density may be changed between when the parallax is 5 pixels and when it is 6 pixels. In such cases, in place of the second output pixel determination table 29B illustrated in FIG. 10B, a second output pixel determination table 29C as illustrated in the example in FIG. 26 may be employed. The second output pixel determination table 29C illustrated in FIG. 26 differs from the second output pixel determination table 29B illustrated in FIG. 10B in that a density F is associated with a parallax of 5 pixels. The density F indicates, for example, the density for a case in which the output pixels are the pixels that appear in row units at 1 pixel for every 5 pixels in the column direction from out of all the pixels contained in the image pick-up device 20. However, in cases in which all of the phase difference pixels are corresponded to G filters and priority is given to achieving detection precision, then preferably the second output pixel determination table 29B is employed rather than the second output pixel determination table 29C. In cases in which the resolution of the normal image is made as fine as possible, and priority is given to gradual adjustment, then the second output pixel determination table 29C is preferably employed rather than the second output pixel determination table 29B.

Figure 27:
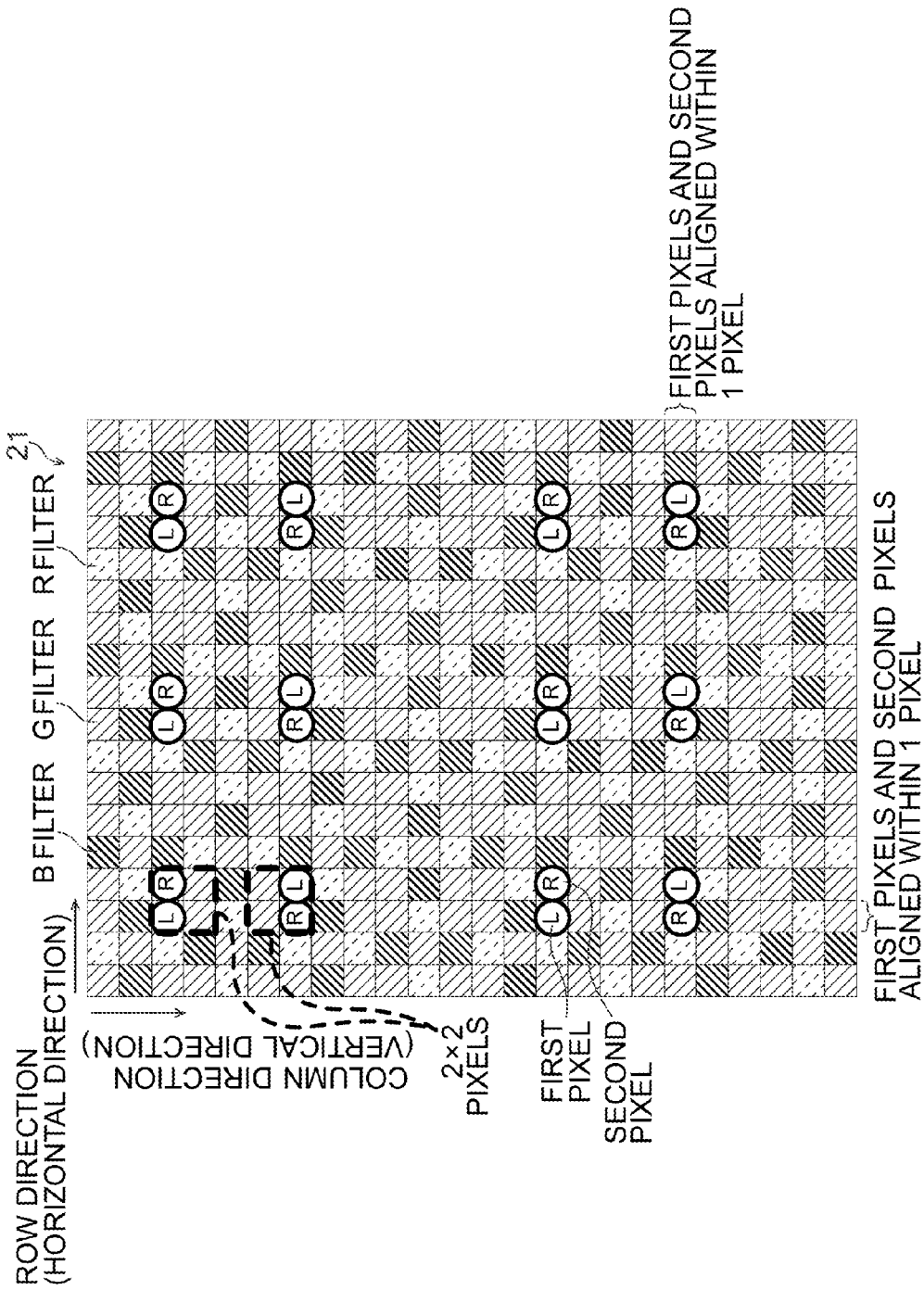
FIG. 27 is a schematic configuration diagram illustrating a first modified example of placement of phase difference pixels in an image pick-up device according to the first exemplary embodiment.
Figure 28:
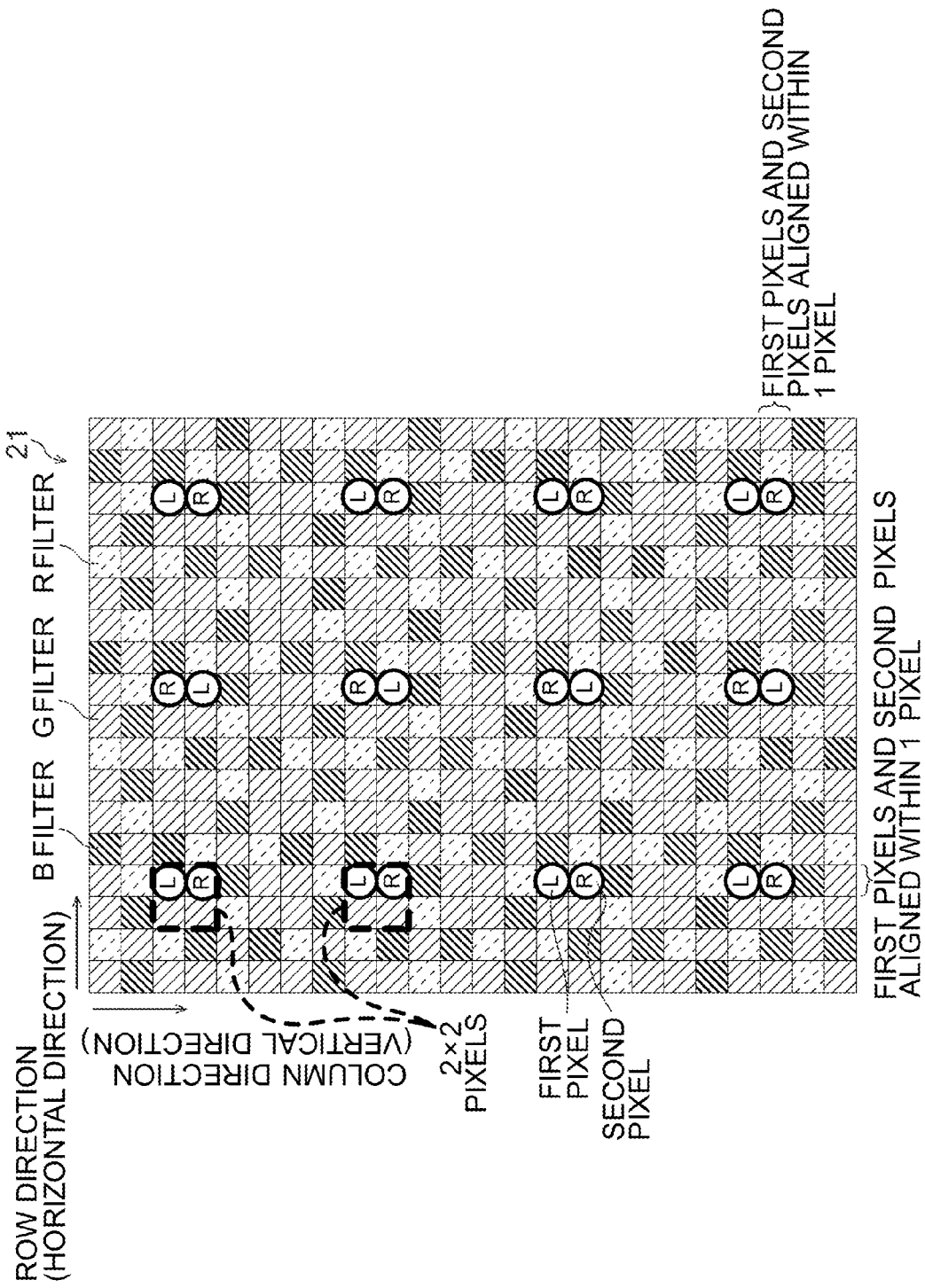
FIG. 28 is a schematic configuration diagram illustrating a second modified example of placement of phase difference pixels in an image pick-up device according to the first exemplary embodiment.

Moreover, in the first exemplary embodiment, although explanation has been given of an embodiment in which a single phase difference pixel is placed on 2×2 pixel G filters, there is no limitation thereto, and, for example, a pair of a first pixel L and a second pixel R may be placed on 2×2 pixel G filters. For example, as illustrated in FIG. 27, a pair of a first pixel L and a second pixel R may be placed on 2×2 pixel G filters so as to be adjacent in the row direction. Moreover, as illustrated in FIG. 28, a pair of a first pixel L and a second pixel R may be placed on 2×2 pixel G filters so as to be adjacent in the column direction. In either of these cases, as explained with reference to the first exemplary embodiment, the positions of the first pixel L and the second pixel R are preferably arranged such that the separation between the first pixel group and the second pixel group is within a specific number of pixels in at least one of the column direction or the row direction. FIG. 27 and FIG. 28 illustrate examples in which the first pixel L and the second pixel R are placed such that the separation between the first pixel group and the second pixel group is within 1 pixel in the column direction or the row direction, respectively.

In the first exemplary embodiment, an example has been given in which the color filter 21 includes the basic array pattern C, however the present invention is not limited thereto. For example, as illustrated in FIGS. 29 to 32, the array of the primary color filters (R filter, G filter, B filter) may be a Bayer array. In the examples illustrated in FIGS. 29 to 31, phase difference pixels are placed on G filters.

Figure 29:
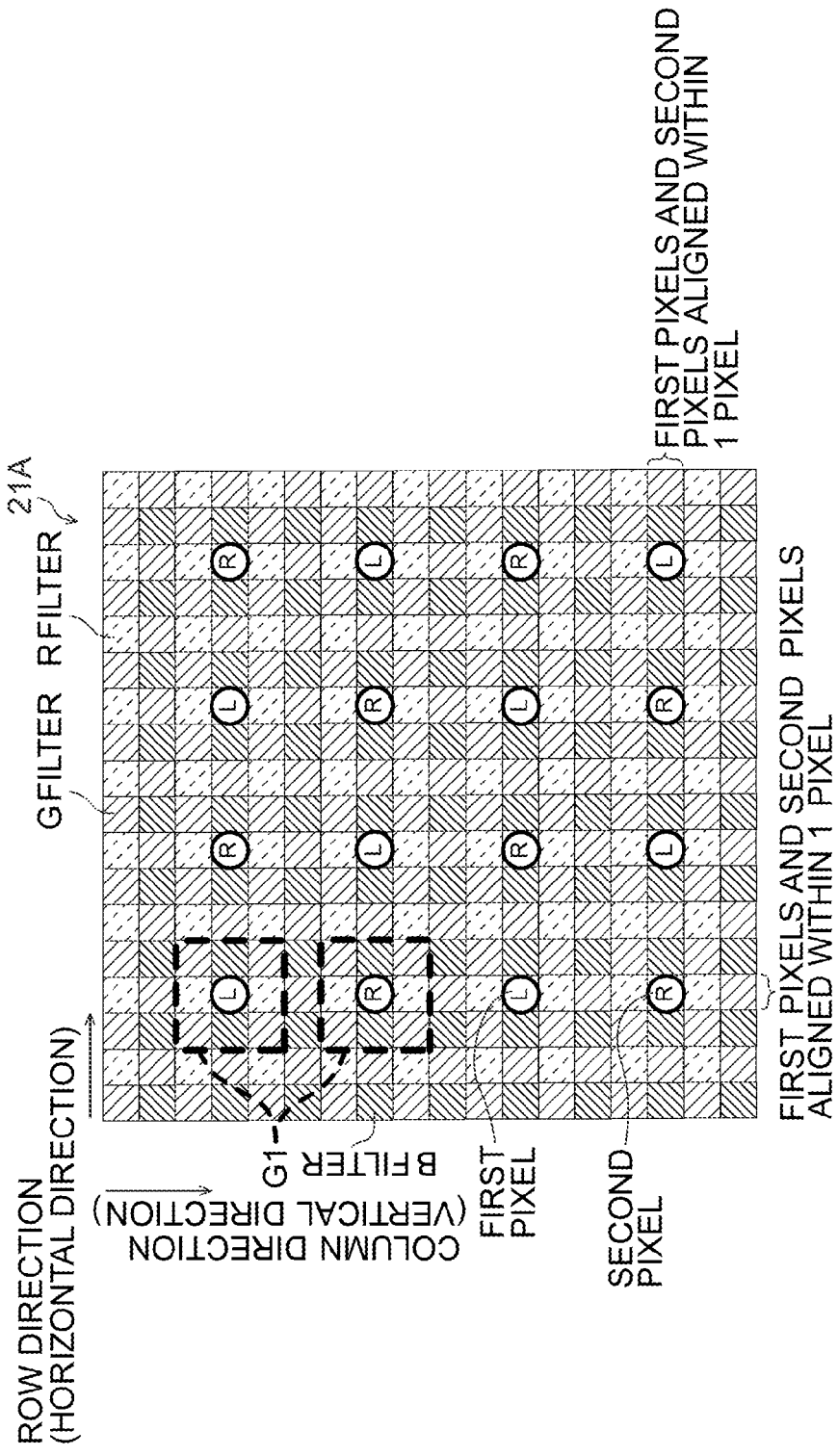
FIG. 29 is a third modified example of placement of phase difference pixels in an image pick-up device according to the first exemplary embodiment, and is a schematic configuration diagram illustrating a modified example of phase difference pixel placement in a case in which the array of primary colors in a color filter applied to the image pick-up device is a Bayer array.

In a color filter 21A illustrated as an example in FIG. 29, the phase difference pixel is placed at the center of an array pattern G1 that has G filters placed on at four corners and center of a 3×3 pixel square array. Moreover, the first pixel L and the second pixel R are placed alternately to each other on every other 1 pixel worth of G filter in both the row direction and the column direction (with 1 pixel worth of G filter placed in between). The first pixel L and the second pixel R are each placed at positions such that the first pixel group and the second pixel group are aligned with each other within 1 pixel in both the column direction and the row direction. Thus an image based on the phase difference pixels at the center of the array pattern G1 can be interpolated using an image based on the normal pixels at the four corners of the array pattern G1, enabling an improvement in interpolation precision to be achieved over cases lacking the present configuration.

Further, positions of each of the array patterns G1 do not overlap with each other. Namely, the first pixel L and the second pixel R are placed in positions such that each of the pixels contained in the first and second images, which are interpolated using a third image configured from pixels contained in a third pixel group adjacent to each of the pixels of the first and second pixel groups, do not overlap with each other at the pixel unit level. This thereby enables a situation to be avoided in which an image based on phase difference pixels is interpolated using an image based on normal pixels that have already been employed for interpolating an image based on other phase difference pixels. Thus a further improvement in interpolation precision can be expected.

Figure 30:
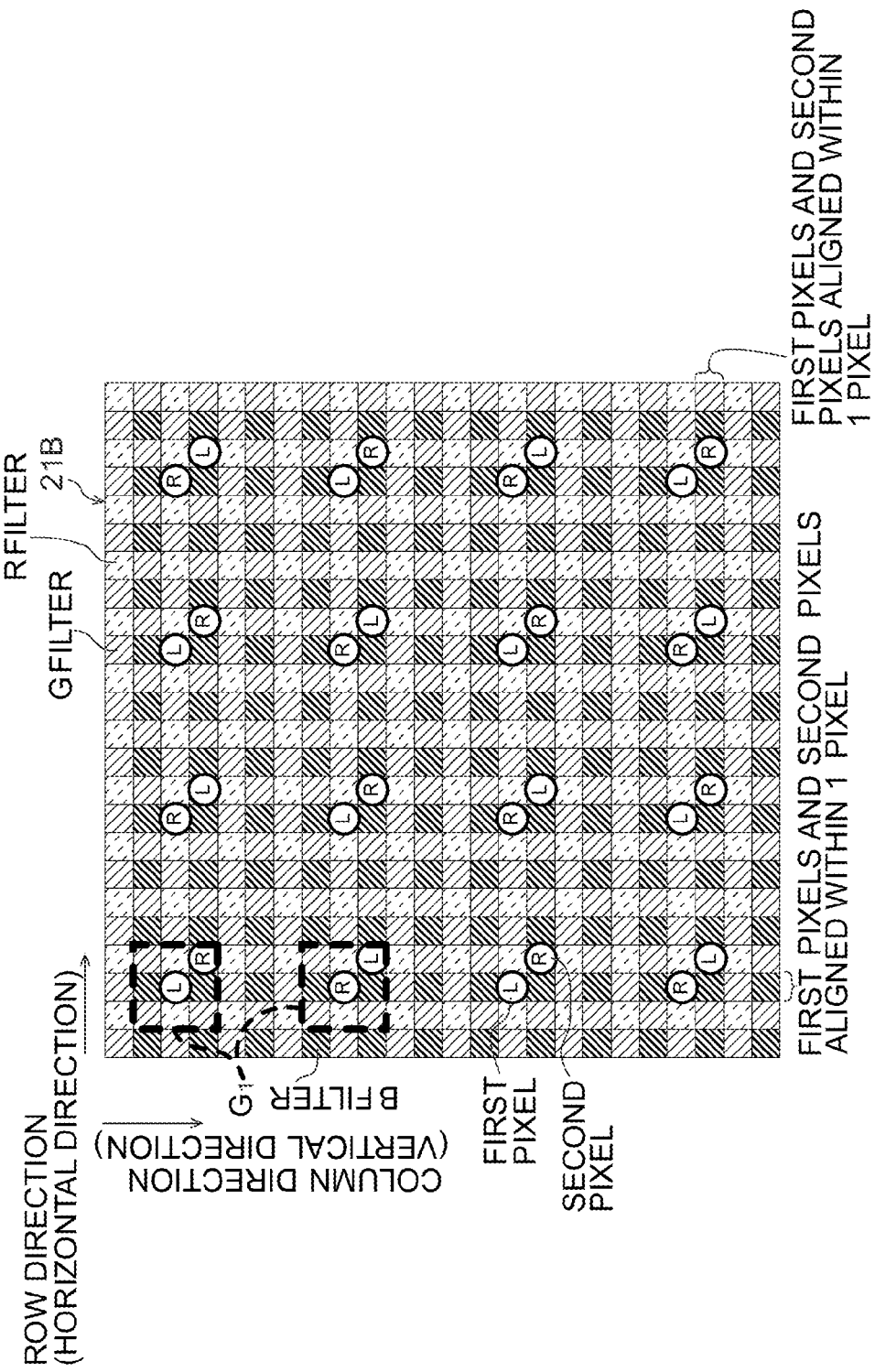
FIG. 30 is a fourth modified example of placement of phase difference pixels in an image pick-up device according to the first exemplary embodiment, and is a schematic configuration diagram illustrating a modified example of phase difference pixel placement in a case in which the array of primary colors in a color filter applied to the image pick-up device is a Bayer array.

A color filter 21B illustrated as an example in FIG. 30 has the phase difference pixels placed at the center of an array pattern G1, and lower right corner thereof in the drawing as viewed face-on. The first pixel L and the second pixel R are placed alternately to each other, while skipping 2 pixels of G filter in between, in both the row direction and the column direction (with 2 pixels of G filter placed in between). This thereby enables the first pixel L and the second pixel R to each be placed at positions such that the first pixel group and the second pixel group are aligned with each other at positions within 1 pixel in both the column direction and the row direction, such that the first pixel L and the second pixel R can be made adjacent to each other. This thereby enables occurrences of image displacement caused by factors other than misaligned focus to be suppressed.

Moreover, there are normal pixels provided with filters of the same color (G filters) adjacent to each of the phase difference pixels, thereby enabling interpolation precision to be raised. Moreover, the positions of each of the array patterns G1 do not overlap with each other. Namely, the first pixel L and the second pixel R are placed in positions such that the pixels contained in the first and second images, which are interpolated using a third image configured from pixels contained in a third pixel group adjacent to each of the pixels contained in the first and second pixel groups, do not overlap with each other in pixel pair units. Reference here to "pixel pairs" indicates, for example, the first pixel L and the second pixel R (the phase difference pixel pair) contained in each of the array patterns G1. This thereby enables a situation to be avoided in which an image based on a phase difference pixel pair is interpolated using an image based on normal pixels that have already been employed for interpolating an image based on another phase difference pixel pair. Thus a further improvement in interpolation precision can be expected.

Figure 31:
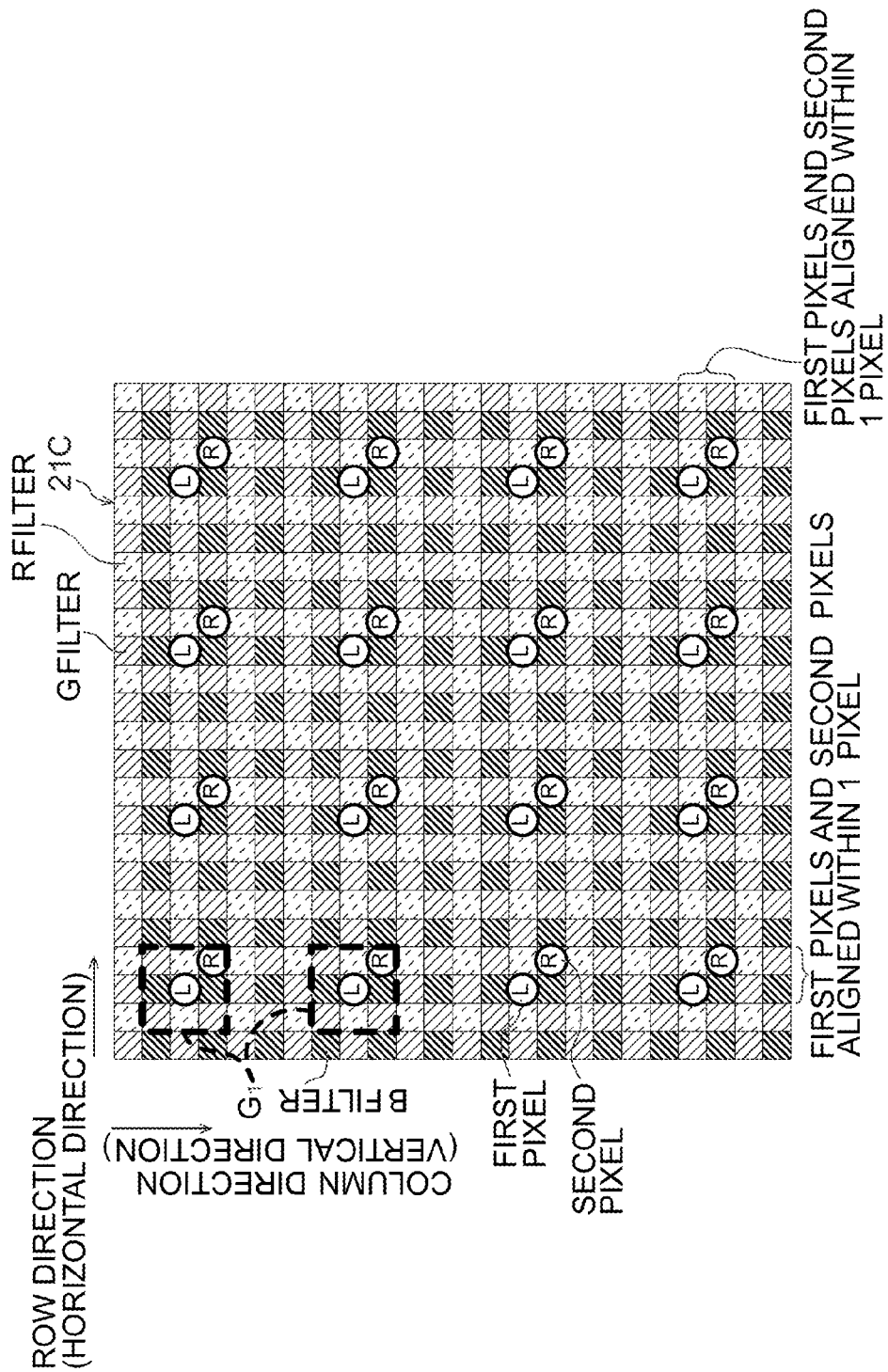
FIG. 31 is a fifth modified example of placement of phase difference pixels in an image pick-up device according to the first exemplary embodiment, and is a schematic configuration diagram illustrating a modified example of phase difference pixel placement in a case in which the array of primary colors in a color filter applied to the image pick-up device is a Bayer array.

A color filter 21C illustrated as an example in FIG. 31 has the first pixel L placed at the center of the array pattern G1, and the second pixel R placed at the lower right corner thereof in the drawing as viewed face-on. The first pixels L are placed alternately to each other, while skipping 2 pixels of G filter in between, in both the row direction and the column direction, and the second pixels R are placed alternately to each other, while skipping 2 pixels of G filter in between, in both the row direction and the column direction. This thereby enables the first pixel L and the second pixel R to each be placed at positions such that the first pixel group and the second pixel group are aligned with each other at positions within 2 pixels in both the column direction and the row direction, and for the first pixel L and the second pixel R to be placed adjacent to each other. This thereby enables occurrences of image displacement caused by factors other than misaligned focus to be suppressed.

Moreover, similarly to the example illustrated in FIG. 30, in the example illustrated in FIG. 31 the positions of each of the array patterns G1 do not overlap with each other. This thereby enables a situation to be avoided in which an image based on a phase difference pixel is interpolated using an image based on normal pixels that have already been employed for interpolating an image based on another phase difference pixel. Thus a further improvement in interpolation precision can be expected.

Figure 32:
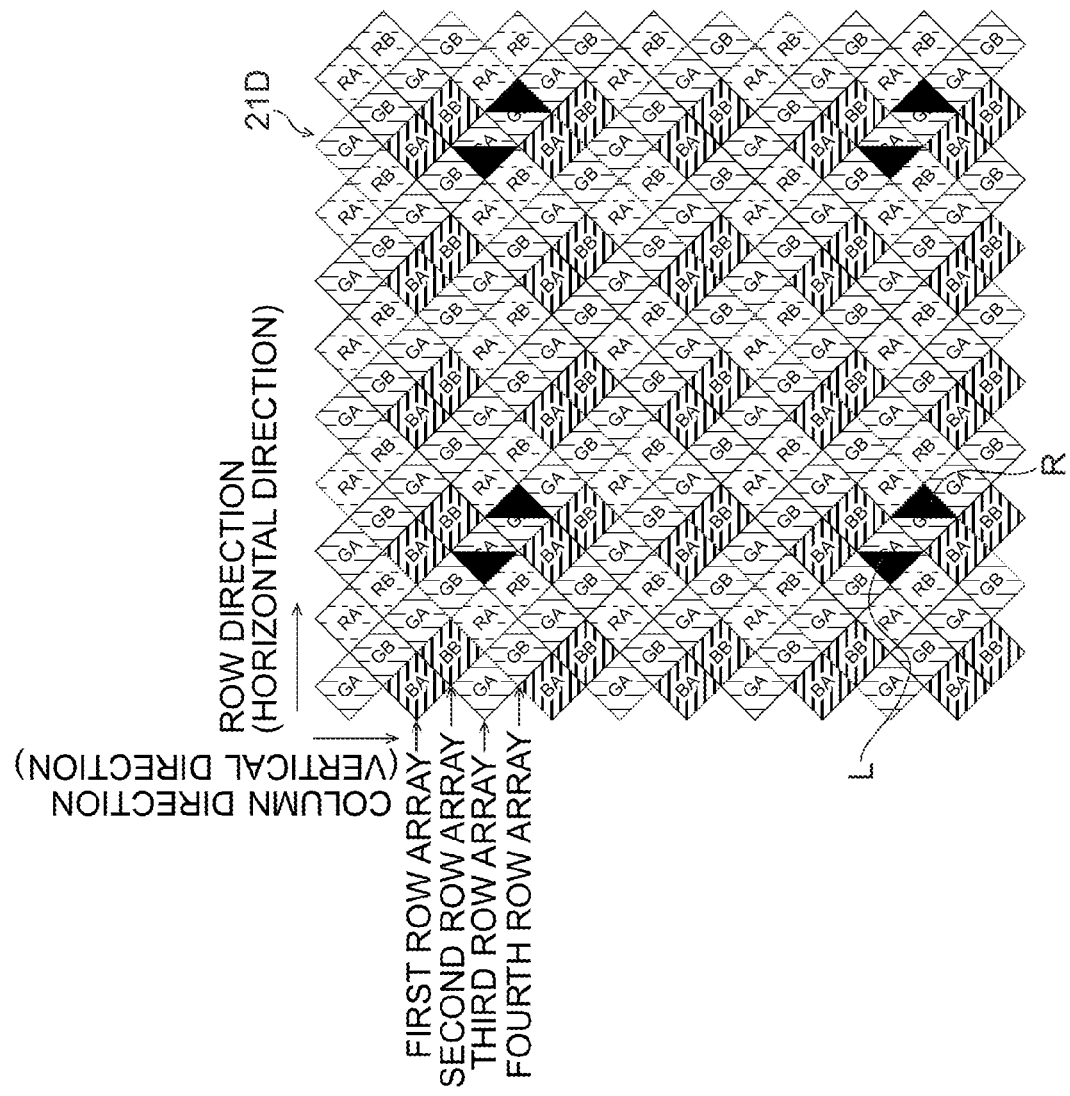
FIG. 32 is a schematic configuration diagram illustrating a sixth modified example of placement of phase difference pixels in an image pick-up device according to the first exemplary embodiment.

Another configuration example of a color filter is, for example, a color filter 21D illustrated in FIG. 32. FIG. 32 schematically illustrates an example of an array of the primary colors (R filter, G filter, B filter) of the color filter 21D, and of an array of light-blocking members, provided to the image pick-up device 20. In the color filter 21D illustrated in FIG. 32, first to fourth row arrays are repeatedly disposed along the column direction. The first row array indicates an array in which B filters and G filters are alternately placed along the row direction. The second row array indicates an array that is the first row array, displaced by half a pitch (half a pixel) in the row direction. The third row array indicates an array in which G filters and R filters are alternately placed along the row direction. The fourth row array indicates an array that is the third row array, displaced by half a pitch in the row direction.

The first row array and the second row array are displaced by half a pitch in the column direction and adjacent to each other. The second row array and the third row array are displaced by half a pitch in the column direction and adjacent to each other. The third row array and the fourth row array are displaced by half a pitch in the column direction and adjacent to each other. The fourth row array and the first row array are displaced by half a pitch in the column direction and adjacent to each other. Thus each of the first to fourth row arrays appear repeated every 2 pixels in the column direction.

As illustrated in the example in FIG. 32, the first pixel L and the second pixel R are allocated to the third and fourth row arrays. Namely, the first pixels L are allocated to the third row arrays, and the second pixels R are allocated to the fourth row arrays. The first pixel L and the second pixel R are placed so as to configure pairs adjacent to each other (minimum pitch). In the example illustrated in FIG. 32, the first pixels L are allocated to every 6th pixel in both the row direction and the column direction, and the second pixels R are allocated to every 6th pixel in both the row direction and the column direction. The phase difference between the first pixel group and the second pixel group is accordingly computed with higher precision than in cases lacking the present configuration.

Moreover, in the example illustrated in FIG. 32, G filters are allocated to the first pixel L and the second pixel R. Due to pixels provided with the G filters having better sensitivity than pixels provided with filters of other colors, the interpolation precision can be raised. Moreover, due to the G filters having better continuity that filters of other colors, the pixels allocated with the G filters are more readily interpolated than pixels allocated with filters of other colors.

Moreover, although in the first exemplary embodiment an example has been given in which the split-images are divided in two along the up-down direction, there is no limitation thereto, and a split-image configuration may be applied of an image divided into plural divisions along the left-right direction or a diagonal direction.

Figure 33:
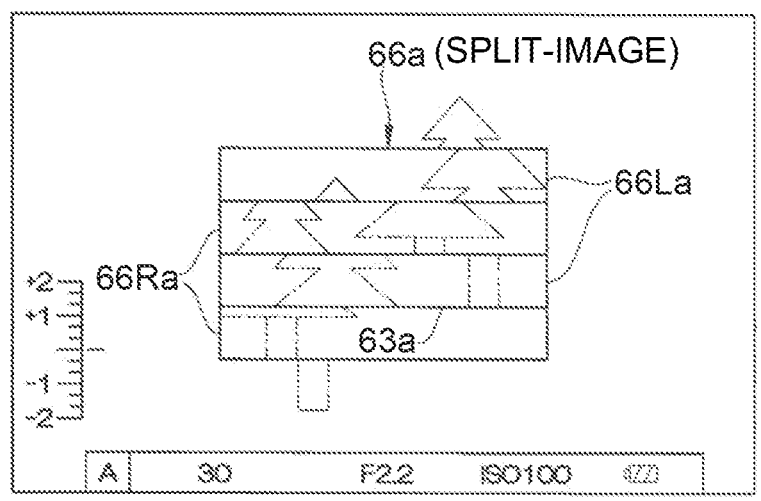
FIG. 33 is a schematic diagram illustrating a modified example of a split-image according to the first exemplary embodiment, in which the split-image is formed by dividing a first image and a second image into alternately arranged odd-numbered lines and even-numbered lines.

A split-image 66a illustrated in the example in FIG. 33 is divided into odd numbered lines and even numbered lines by plural dividing lines 63a parallel to the row direction. In the split-image 66a, line shaped (for example strip shaped) phase difference images 66La generated based on the output signal output from the first pixel group are displayed on the odd numbered lines (or on the even numbered lines). Line shaped (for example strip shaped) phase difference images 66Ra generated based on the output signal output from the second pixel group are displayed on the even numbered lines.

Figure 34:
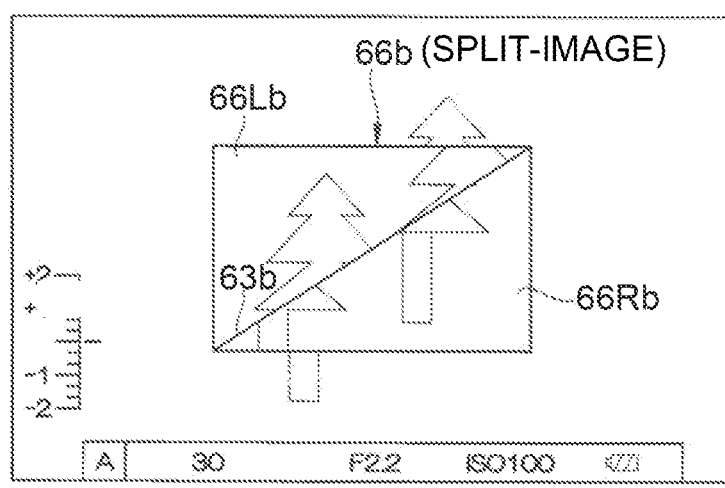
FIG. 34 is a schematic diagram illustrating a modified example of a split-image according to the first exemplary embodiment, in which the split-image is divided by a dividing line with a slope angled with respect to the row direction.

A split-image 66b illustrated in FIG. 34 is divided into two by a dividing line 63b with slope angled with respect to the row direction (for example a diagonal line of the split-image 66b). In the split-image 66b, a phase difference image 66Lb generated based on the output signal output from the first pixel group is displayed in one region. A phase difference image 66Rb generated based on the output signal output from the second pixel group is displayed in the other region.

Figure 35A:
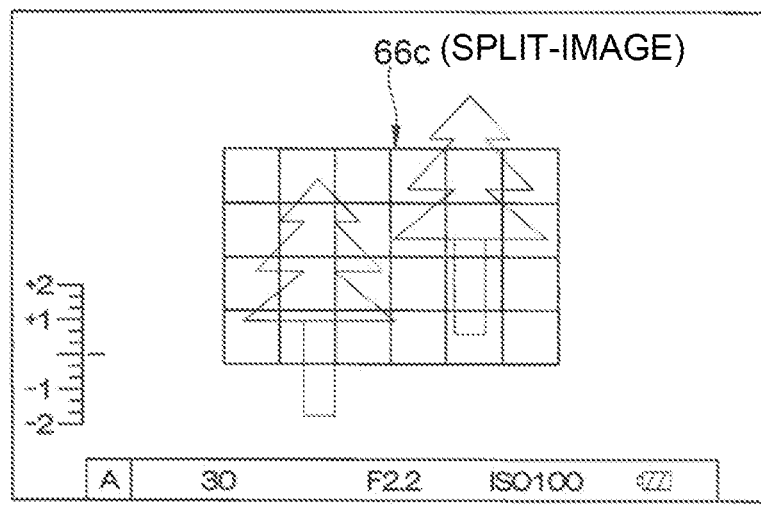
FIG. 35A is a schematic diagram illustrating a modified example of a split-image according to the first exemplary embodiment, in which the split-image is divided by dividing lines in a lattice pattern.
Figure 35B:
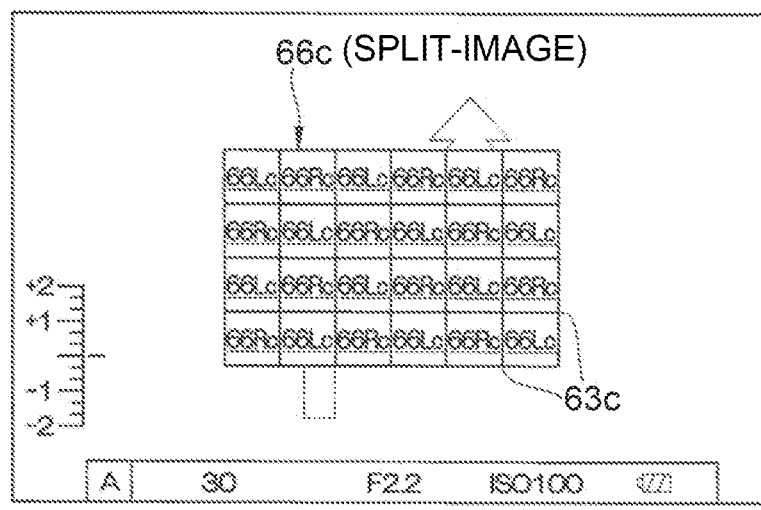
FIG. 35B is a schematic diagram illustrating a modified example of a split-image according to the first exemplary embodiment, in which the split-image is formed in a chess board pattern.

A split-image 66c illustrated in FIG. 35A and FIG. 35B is divided by lattice shaped dividing lines 63c parallel to the row direction and column direction, respectively. In the split-image 66c, a phase difference image 66Lc generated based on the output signals output from the first pixel group is displayed arranged in a chess board pattern (checkered pattern). A phase difference image 66Rc generated based on an output signal output from the second pixel group is also displayed arranged in a chess board pattern.

Moreover, there is no limitation to a split-image, and another focus verification image may be generated from the two phase difference images, and the focus verification image displayed. For example, the two phase difference images may be superimposed on each other in a synthesized display, so as to display as a double image when not in focus and display as a clear image when in a focused state.

The flow of the image generation and output processing explained in the first exemplary embodiment (see FIG. 16), the flow of resolution enhancing processing (see FIG. 17), the flow of resolution degradation processing (see FIG. 20), and the flow of setting content change processing (see FIG. 23) are merely examples thereof. Accordingly, it goes without saying that steps not required may be eliminated, new steps may be added, and the processing sequence may be rearranged within a range not departing from the spirit. Each type of the processing included in the image generation and output processing explained for the first exemplary embodiment may be realized by a software configuration utilizing a computer by executing a program, or may be realized by a hardware configuration. Implementation may also be made with a combination of a hardware configuration and a software configuration.

Note that in the image generation and output processing explained in the first exemplary embodiment, in cases in which implementation is by executing a program with a computer, the program may be pre-stored in a specific storage region (for example the memory 26). Initial storage in the memory 26 is not always necessary. For example, a program may first be stored on a freely selectable "portable storage medium" such as a Solid State Drive (SSD), CD-ROM, a DVD disk, a magneto optical disk, or an IC card, employed connected to a computer. A computer may then acquire and execute a program from such a portable storage medium. Each program may also be stored in advance on another computer, server device, or the like connected to a computer through the Internet, a Local Area Network (LAN), or the like, such that the computer acquires and executes such programs therefrom.

Second Exemplary Embodiment

In the first exemplary embodiment, an example is given of the imaging device 100, however modified examples of the imaging device 100 include mobile terminal devices such as, for example, mobile phones and smartphones including a camera function, personal digital assistants (PDAs), mobile gaming machines or the like. Detailed explanation follows in the second exemplary embodiment regarding an example of a smartphone, with reference to the drawings.

Figure 36:
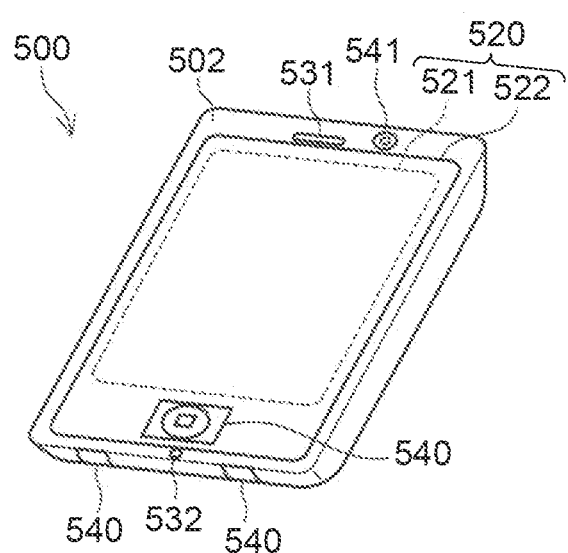
FIG. 36 is a perspective view of an example of an external appearance of a smartphone according to a fifth exemplary embodiment.

FIG. 36 is a perspective view illustrating an example of the external appearance of a smartphone 500. The smartphone 500 illustrated in FIG. 36 includes a flat plate shaped casing 502, and a display and input section 520 provided on one face of the casing 502 and integrating together a display panel 521 serving as a display section and an operation panel 522 serving as an input section. The casing 502 includes a speaker 531, a microphone 532, an operation section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 37:
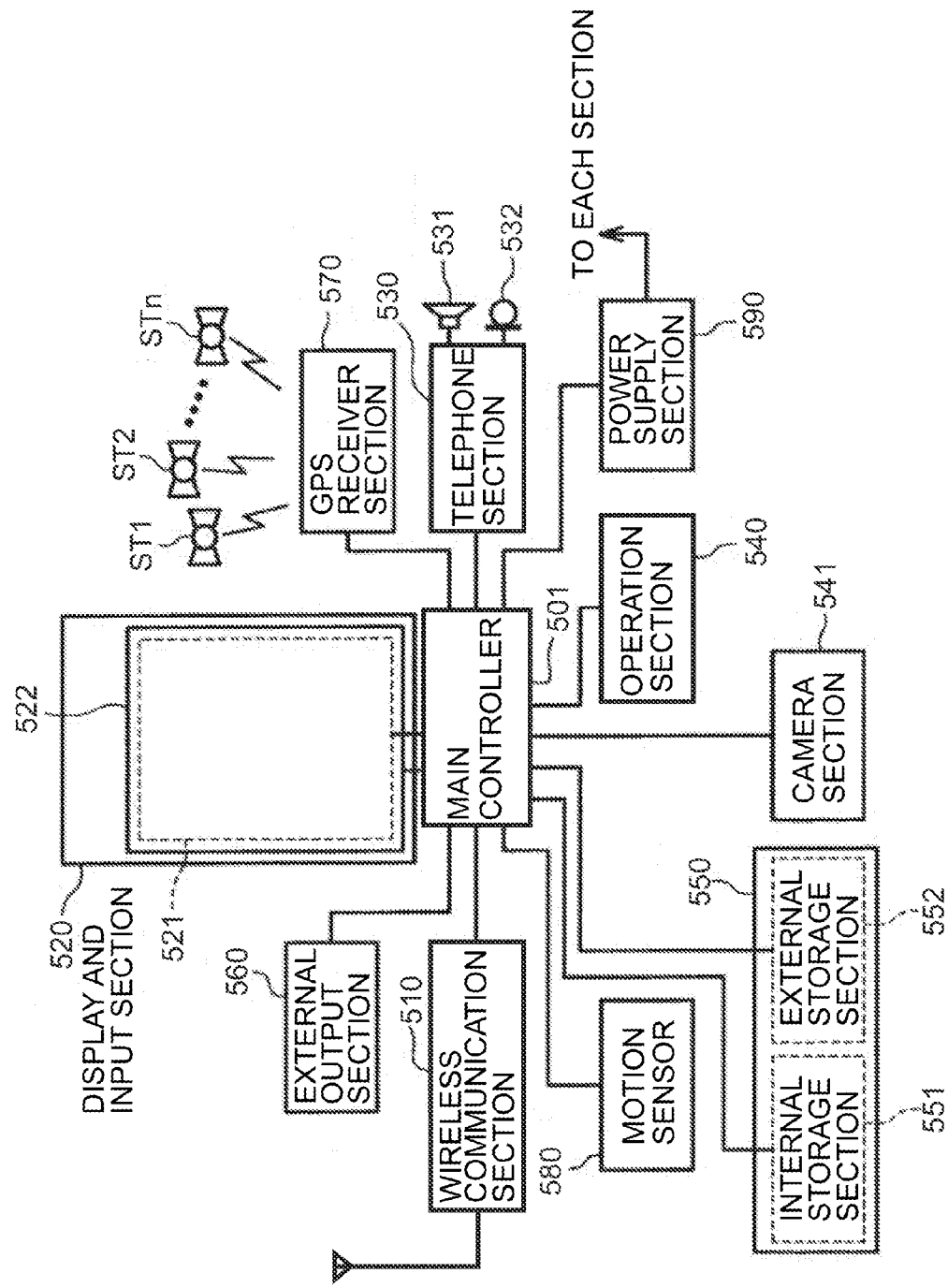
FIG. 37 is a block diagram illustrating an example of relevant configuration of an electrical system of a smartphone according to the fifth exemplary embodiment.

FIG. 37 is a block diagram illustrating an example of a configuration of the smartphone 500 illustrated in FIG. 36. As illustrated in FIG. 37, main configuration elements of the smartphone 500 include a wireless communication section 510, the display and input section 520, a telephone section 530, the operation section 540, the camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operating panel 522. Thus, according to control by the main controller 501, the display and input section 520 transmits information to a user visibly by displaying images (still images and video images), text data, and the like, and also detects user operation in response to the displayed information. The display panel 521 is preferably a 3D display panel in cases in which generated 3D is viewed.

The display panel 521 employs a display device such as an LCD, or an organic electroluminescence display (OELD). The operating panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 36, the display panel 521 and the operation panel 522 of the smartphone 500 are integrated together to configure the display and input section 520, and the operation panel 522 is disposed so as to entirely cover the display panel 521. In cases in which such a placement is adopted, the operation panel 522 may include a function to detect user operation even in a region outside of the display panel 521. In other words, the operation panel 522 may include a detection region for a superimposed section superimposed on the display panel 521 (referred to below as the display region), and a detection region for an outer edge section other than the above that is not superimposed on the display panel 521 (referred to below as the non-display region).

The size of the display region and the size of the display panel 521 may completely match each other, however they do not necessarily have to match each other. The operating panel 522 may include two sensitive regions, at an outer edge section and at an inside portion other than the outer edge section. The width of the outer edge section is appropriately designed according to the size of the casing 502 and the like. Moreover, as a position detection method employed in the operating panel 522, any of, for example, a matrix switch method, a resistance film method, a surface acoustic wave method, an infrared radiation method, an electromagnetic induction method, an electrostatic capacitance method, or the like may be adopted.

The telephone section 530 includes the speaker 531 and the microphone 532. The telephone section 530 converts user voice input through the microphone 532 into voice data capable of being processed by the main controller 501, then outputs this to the main controller 501. The telephone section 530 decodes voice data received by the wireless communication section 510 or by the external input-output section 560, and outputs the voice data from the speaker 531. As illustrated in FIG. 36, for example, the speaker 531 may be installed in the same face as the face at which the display and input section 520 is provided, and the microphone 532 may be installed in a side face of the casing 502.

The operation section 540 is a hardware key that employs a key switch or the like, and is a section that receives instructions from a user. For example, as illustrated in FIG. 36, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable external memory slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include, for example, a universal serial bus (USB), IEEE1394, or the like. Examples of networks include, for example, the internet, wireless LAN, BLUETOOTH (registered trademark), radio frequency identification (RFID), and infrared data association (IrDA: registered trademark) communication. Other examples of networks include ULTRA WIDEBAND (UWB: registered trademark), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, or earphones or the like may also be applied.

The external input-output section is capable of transmitting received data that was transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position in latitude, longitude, and altitude of the smartphone 500. The GPS receiver section 570 is also capable of detecting the position by using positional data when it is possible to acquire positional data from the wireless communication section 510 and the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (not illustrated in the drawings) to each of the sections of the smartphone 500 under instruction from the main controller 501.

The main controller 501 includes a microprocessor, and operates according to a control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counter-party device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540, and the operating panel 522.

By executing display control the main controller 501 displays icons to startup application software, and software keys such as scroll bars, or displays windows to generate emails. Scroll bars are software keys to receive instructions to move the display portion of an image such as large images that cannot be accommodated within the display region of the display panel 521.

By executing the operation detection control, the main controller 501 detects user operation through the operation section 540, and receives, through the operating panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operating panel 522 is in the superimposed section superimposed on the display panel 521 (display region), or in the other outer edge section not superimposed on the display panel 521 (non-display region). It also includes a touch panel control function to receive the determination result, and to control the display position of the sensitive region of the operating panel 522 and the display position of the software key.

The main controller 501 detects gesture operations to the operating panel 522, and is capable of executing a preset function according to the detected gesture operation. Gesture operation does not mean a simple conventional touch operation, and means tracing a track with a finger or the like, specifying plural positions at the same time, or combinations thereof, and means an operation to trace a track of at least one from plural positions.

The camera section 541 is a digital camera that captures an image using an image pick-up device such as a CMOS or CCD, and includes functions similar to those of the imaging device 100 as illustrated in FIG. 1 and the like.

The camera section 541 is capable of switching between a manual focus mode and an automatic focus mode. When the manual focus mode has been selected, focusing of the imaging lens of the camera section 541 can be performed by operating a focus icon button or the like displayed on the operation section 540 or the display and input section 520. Then during manual focus mode, a live-view image synthesized with a split-image is displayed on the display panel 521, thereby enabling the focus state to be checked during manual focus. The HYBRID FINDER 220 illustrated in FIG. 3 may be provided to the smartphone 500.

The camera section 541, under control of the main controller 501, converts image data obtained by photography into, for example, compressed image data such as joint photographic coding experts group (JPEG). Then the image data obtained by conversion can be stored in the storage section 550, and output through the input-output section 560 and the wireless communication section 510. In the smartphone 500 illustrated in FIG. 36, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 with image capture, or image capture may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operating panel 522. During position detection by the GPS receiver section 570, the position may be detected with reference to an image from the camera section 541. Moreover, the optical axis direction of the camera section 541 of the smartphone 500 may be determined and the present usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the input-output section 560 and the wireless communication section 510. Reference here to "various data" is, for example, positional data acquired by the GPS receiver section 570, and voice data acquired by the microphone 532 (which may be speech converted to text data arising from text conversion performed by the main controller or the like) for adding to image data of still images or video images). It may moreover be orientation data acquired by the motion sensor 580, and so on.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

Moreover, in each of the above exemplary embodiments, an example is given in which when the first to the third images have been input to the image processor 28, the normal image and the split-image are both displayed at the same time as each other on the same screen of the display device, however the present invention is not limited thereto. For example, configuration may be made such that the display controller 36 performs control to suppress display of the normal image on the display device, and to display the split-image on the display device. Reference here to "suppress display of the normal image" indicates, for example, a configuration such that the normal image is not displayed on the display device. More specifically, it indicates a configuration such that the normal image is not displayed on the display device by not outputting the normal image to the display device even though the normal image is generated, and configuration such that the normal image is not displayed on the display device due to not generating the normal image. The split-image may be displayed using the entire screen of the display device, or the split-image may be displayed utilizing the entire split-image display region illustrated as an example in FIG. 15. An example of reference here to a "split-image" indicates, in a case in which a specific pick-up device is employed, a split-image based on images that have been output from phase difference pixels (for example the first image output from the first pixel group and the second image output from the second pixel group). An example of a "case in which a specific pick-up device is employed" is, for example, a case in which a pick-up device is employed that is configured only from phase difference pixel group(s) (for example from the first pixel group and the second pixel group). Another example thereof is a case in which a pick-up device is employed in which phase difference pixels (for example the first pixel group and the second pixel group) are placed at a specific proportion with respect to the normal pixels.

Moreover, there are various conceivable conditions as conditions to suppress display of the normal image and to display the split-image. For example, the display controller 36 may perform control to display the split-image without displaying the normal image on the display device in cases in which a normal image display instruction is cancelled in a state in which display of a split-image is being instructed. Moreover, for example, the display controller 36 may perform control to display the split-image without displaying the normal image on the display device in cases in which a photographer is looking into the HYBRID FINDER. Moreover, for example, the display controller 36 may perform control to display the split-image without displaying the normal image on the display device in cases in which the release switch 211 is in a half pressed state. Moreover, for example, the display controller 36 may perform control to display the split-image without displaying the normal image on the display device in cases in which press operation of the release switch 211 is not being performed. Moreover, for example, the display controller 36 may perform control to display the split-image without displaying the normal image on the display device in cases in which a face recognition function has been activated to detect faces in an imaging subject.

Moreover, in each of the above exemplary embodiments, an example is given in which the normal display region or the expanded display region are selectively employed as the display region for the split-image, however there is no limitation thereto, and the size (surface area) of the display region for the split-image may be determined according to the magnitude of the parallax. Namely, the visibility of the split-image may be improved by making the display region larger as the parallax decreases, with a limit of a specific size to the display region.

Moreover, in each of the above exemplary embodiments, an example is given in which the frame rate of the image subject to display is changed under the premise that the resolution is changed, however the frame rate may be changed without changing the resolution. In such cases, in cases in which the parallax is the threshold value or lower, the image processor 28 may make the frame rate higher than the frame rate when the parallax exceeds the threshold value. Moreover, in cases in which the parallax is the threshold value or lower, the image processor 28 may make the frame rate higher according to the decrease in parallax. Moreover, in cases in which the parallax exceeds the threshold value, the image processor 28 may make the frame rate lower than the frame rate in cases in which the parallax is the threshold value or lower. Moreover, in cases in which the parallax exceeds the threshold value, the image processor 28 may make the frame rate lower by an amount according to the increase in parallax.

The invention claimed is:

1. An image processing device comprising:
an image acquisition section that acquires first and second images based on first and second image signals output from an image pick-up device including first and second pixel groups that output the first and second image signals from respective images formed by a pupil-divided subject-image that has passed through first and second regions of an imaging lens;
a parallax computation section that computes parallax indicating an amount of displacement between each of the pixels of the first image and corresponding pixels in the second image acquired by the image acquisition section;
a generation section that generates a first display image based on an image signal output from the image pick-up device, and that, based on the first and second images, generates a second display image that is used in focus verification;
a change section that, among the first display image and the second display image generated by the generation section, changes a resolution of at least the second display image in accordance with the parallax computed by the parallax computation section;
a display section that displays images; and
a display controller that controls the display section so as to display the first display image generated by the generation section, and to display the second display image generated by the generation section within a display region of the first display image.

2. An image processing device comprising:
an image acquisition section that acquires first and second images based on first and second image signals output from an image pick-up device including first and second pixel groups that output the first and second image signals from respective images formed by a pupil-divided subject-image that has passed through first and second regions of an imaging lens;
a parallax computation section that computes parallax indicating an amount of displacement between each of the pixels of the first image and corresponding pixels in the second image acquired by the image acquisition section;
a generation section that generates a first display image based on an image signal output from the image pick-up device, and that, based on the first and second images, generates a second display image that is used in focus verification;
a change section that, among the first display image and the second display image generated by the generation section, changes a resolution of at least the second display image in accordance with the parallax computed by the parallax computation section;
a display section that displays images; and
a display controller that effect controls so as to suppress display by the display section of the first display image generated by the generation section, and controls the display section so as to display the second display image generated by the generation section.

3. The image processing device of claim 1, wherein the change section enhances the resolution as the parallax decreases.

4. The image processing device of claim 1, wherein the change section changes the resolution by changing a number of output pixels of the image pick-up device by changing a method of driving the image pick-up device.

5. The image processing device of claim 4, wherein:
the pixels included in the image pick-up device are arrayed in a matrix formation;
the output pixels of the image pick-up device are variable in units of row of the pixels; and
the change section changes the resolution by changing the output pixels in units of rows.

6. The image processing device of claim 5, wherein:
the output pixels of the image pick-up device are further variable in units of columns of pixels; and
the change section further changes the resolution by changing the output pixels in units of columns.

7. The image processing device of claim 4, wherein:
the pixels included in the image pick-up device are arrayed in a matrix formation;
the output pixels of the image pick-up device are variable in units of columns of the pixels; and
the change section changes the resolution by changing the output pixels in units of columns.

8. The image processing device of claim 4, wherein the change section changes the number of output pixels by changing the density of the output pixels of the first and second pixel groups in the output pixels included in the image pick-up device.

9. The image processing device of claim 8, wherein the change section changes the number of output pixels by, in a case in which the parallax computed by the parallax computation section is a threshold value or lower, making the density higher than the density in a case in which the parallax computed by the parallax computation section exceeds the threshold value.

10. The image processing device of claim 9, wherein the change section changes the number of output pixels by, in a case in which the parallax computed by the parallax computation section is a threshold value or lower, making the density higher than the density in a case in which the parallax computed by the parallax computation section exceeds the threshold value, and by making the density higher in accordance with a decrease in parallax.

11. The image processing device of claim 8, wherein the change section changes the number of output pixels by, in a case in which the parallax computed by the parallax computation section exceeds a threshold value, making the density lower than the density in a case in which the parallax computed by the parallax computation section is the threshold value or lower.

12. The image processing device of claim 11, wherein the change section changes the number of output pixels by, in a case in which the parallax computed by the parallax computation section exceeds a threshold value, making the density lower than the density in a case in which the parallax computed by the parallax computation section is the threshold value or lower, and by making the density lower in accordance with an increase in parallax.

13. The image processing device of claim 1, wherein, in a case in which the resolution has been enhanced by the change section so as to exceed a specific value, the display controller further effects control to expand a display region of the second display image on the display section to wider than normal.

14. The image processing device of claim 13, wherein, in a case in which the resolution has been degraded to the specific value or lower by the change section in an expanded state of the display region, the display controller further effects control to return the display region to a normal size.

15. The image processing device of claim 1, wherein the change section further changes a frame rate of an image subject for display on the display section in accordance with the parallax computed by the parallax computation section.

16. The image processing device of claim 1, wherein the change section further changes a computation frequency by the parallax computation section in accordance with the parallax computed by the parallax computation section.

17. The image processing device of claim 1, wherein the change section further changes a driving frequency of the image pick-up device in accordance with the parallax computed by the parallax computation section.

18. The image processing device of claim 1, wherein:
the image pick-up device further includes a third image group that outputs a third image formed without pupil-dividing a subject-image that has passed through the imaging lens; and
the generation section generates the first display image based on the third image output from the third pixel group.

19. An imaging device, comprising:
the image processing device of claim 1;
the image pick-up device including the first and second pixel groups; and
a storage section that stores an image generated based on an image signal output from the image pick-up device.

20. An image processing method comprising:
acquiring first and second images based on first and second image signals output from an image pick-up device including first and second pixel groups that output the first and second image signals from respective images formed by a pupil-divided subject-image that has passed through first and second regions of an imaging lens;
computing parallax indicating an amount of displacement between each of the pixels of the acquired first image and corresponding pixels in the acquired second image;
generating a first display image based on an image signal output from the image pick-up device;
generating a second display image that is used in focus verification, based on the first and second images;
changing the resolution of at least the second display image among the generated first display image and the generated second display image in accordance with the computed parallax; and
controlling a display section that displays images so as to display the generated first display image, and to display the generated second display image within a display region of the first display image.

21. An image processing method, comprising:
acquiring first and second images based on first and second image signals output from an image pick-up device including first and second pixel groups that output the first and second image signals from respective images formed by a pupil-divided subject-image that has passed through first and second regions of an imaging lens;
computing parallax indicating an amount of displacement between each of the pixels of the acquired first image and the corresponding pixels in the acquired second image;
generating a first display image based on an image signal output from the image pick-up device;
generating a second display image that is used in focus verification, based on the first and second images;
changing the resolution of at least the second display image among the generated first display image and the second display image, in accordance with the computed parallax; and
effecting control so as to suppress display by a display section of the generated first display image, and controlling the display section so as to display the generated second display image.

22. A non-transitory computer-readable storage medium storing a program for causing a computer to function as;
the image acquisition section, the parallax computation section, the generation section, the change section, and the display controller of the image processing device of claim 1.

* * * * *